(12) United States Patent
Austin

(10) Patent No.: US 11,873,384 B2
(45) Date of Patent: Jan. 16, 2024

(54) ANTIOXIDANT STABILIZER IN POLYMERS

(71) Applicant: Renmatix, Inc., King of Prussia, PA (US)

(72) Inventor: Jeremy Roland Austin, Malvern, PA (US)

(73) Assignee: Renmatix, Inc., Wayne, PA (US)

(*) Notice: Subject to any disclaimer, the term of this patent is extended or adjusted under 35 U.S.C. 154(b) by 295 days.

(21) Appl. No.: 16/649,085

(22) PCT Filed: Sep. 7, 2018

(86) PCT No.: PCT/US2018/049885
§ 371 (c)(1),
(2) Date: Mar. 19, 2020

(87) PCT Pub. No.: WO2019/051183
PCT Pub. Date: Mar. 14, 2019

(65) Prior Publication Data
US 2020/0270418 A1    Aug. 27, 2020

Related U.S. Application Data

(60) Provisional application No. 62/555,642, filed on Sep. 7, 2017.

(51) Int. Cl.
    C08K 5/00      (2006.01)
    C08J 5/18      (2006.01)
    C09D 123/12    (2006.01)

(52) U.S. Cl.
    CPC ............... C08K 5/005 (2013.01); C08J 5/18 (2013.01); C09D 123/12 (2013.01); C08J 2323/12 (2013.01); C08J 2401/02 (2013.01); C08J 2405/14 (2013.01); C08K 2201/005 (2013.01)

(58) Field of Classification Search
CPC ...... C08K 5/005; C08K 2201/005; C08J 5/18; C08J 2401/02; C08J 2323/12; C08J 2405/14; C09D 123/12
USPC .......................................................... 524/76
See application file for complete search history.

(56) References Cited

U.S. PATENT DOCUMENTS

| | | | |
|---|---|---|---|
| 5,321,065 A | 6/1994 | Bono et al. | |
| 2005/0058909 A1* | 3/2005 | Navarrete | H01M 50/411 429/255 |
| 2010/0305241 A1* | 12/2010 | Balakshin | C08K 5/13 524/72 |
| 2012/0282467 A1* | 11/2012 | Iyer | C08H 8/00 530/500 |
| 2014/0171379 A1* | 6/2014 | Jansen | C08K 13/02 523/447 |
| 2014/0275501 A1* | 9/2014 | Capanema | C07G 1/00 530/500 |
| 2016/0002466 A1 | 1/2016 | Erdmann et al. | |
| 2016/0374935 A1* | 12/2016 | Massey-Brooker | A61K 8/9794 424/58 |

FOREIGN PATENT DOCUMENTS

| | | |
|---|---|---|
| JP | 2005-041969 A | 2/2005 |
| JP | 2011-219716 A | 11/2011 |
| WO | WO 2012/151509 A2 | 3/2013 |
| WO | WO 2014/144746 A1 | 9/2014 |
| WO | WO 2015/147615 A1 | 10/2015 |
| WO | WO 2016/104634 A1 | 6/2016 |
| WO | WO 2019/051183 | 3/2019 |

OTHER PUBLICATIONS

Toriz et al., Polymer Composites, 23, 5, 806-813, 2002. (Year: 2002).*
Rencoret et al., Plant Physiology, 155, 667-682, 2011. (Year: 2011).*
Sadeghifar et al., ACS Sustainable Chem. Eng., 3, 349-356, 2015. (Year: 2015).*
Chodak et al., Chem. Papers, 40(4), 461-470, 1986. (Year: 1986).*
Chodak, et al. (1986) "Blends of polypropylene with lignin I. Influence of a lignin addition on crosslinking and thermal oxidation stability of polypropylene." Chemical Papers 40(4): 461-470.
Rencoret, et al. (2010) "Lignin Composition and Structure in Young versus Adult Eucalyptus globulus Plants." Plant Physiology 155: 667-682.
Sadeghifar, et al. (2015) "Correlations of the Antioxidant Properties of Softwood Kraft Lignin Fractions with the Thermal Stability of its Blends with Polyethylene." ACS Sustainable Chemistry & Engineering 3: 349-356.
Toriz, et al. (2002) "Lignin-Polypropylene Composites. Part 1: Composites From Unmodified Lignin and Polypropylene." Polymer Composites 23(5); 806-813.
International Search Report and Written Opinion dated Mar. 14, 2019 by the International Searching Authority for International Application No. PCT/US2018/049885, filed on Sep. 7, 2018 and published as WO 2019/051183 on Mar. 14, 2019 (Applicant-Renmatix, Inc.) (14 Pages).
International Preliminary Report on Patentability dated Oct. 3, 2020 by the International Searching Authority for International Application No. PCT/US2018/049885, filed on Sep. 7, 2018 and published as WO 2019/051183 on Mar. 14, 2019 (Applicant-Renmatix, Inc.) (8 Pages).
U.S. Appl. No. 62/555,642, filed Sep. 7, 2017, Jeremy Roland Austin.
PCT, PCT/US2018/049885 (WO 2019/051183), Sep. 7, 2018 (Mar. 14, 2019), Renmatix, Inc.

* cited by examiner

*Primary Examiner* — Hui H Chin
(74) *Attorney, Agent, or Firm* — Ballard Spahr LLP

(57) ABSTRACT

The present invention relates to the use of a hardwood lignin, a softwood lignin, and/or a grass lignin as an antioxidant stabilizer in polymers or polymer compositions, such as, for example, thermoplastics, thermoplastic composites, thermosets, coatings, films, adhesives, personal care compositions, or any combination thereof.

16 Claims, 23 Drawing Sheets

ANTIOXIDANT STABILIZER IN POLYMERS

CROSS-REFERENCE TO RELATED APPLICATIONS

This application is a national stage filing under 35 U.S.C. § 371 of International Application No. PCT/US2018/049885, filed on Sep. 7, 2018, which claims the benefit of U.S. Provisional Application No. 62/555,642, filed on Sep. 7, 2017, the contents of which are incorporated herein by reference in their entireties.

FIELD OF THE INVENTION

The present invention relates to the use of a grass lignin and/or a hardwood lignin as an antioxidant in polymers or polymer compositions. In particular, disclosed herein is the use of a grass lignin and/or a hardwood lignin as an antioxidant stabilizer in polymers or polymer compositions, such as thermoplastics, thermoplastic composites, thermosets, coatings, films, adhesives, personal care compositions, or any combination thereof.

BACKGROUND

It has long been recognized that most polymers (e.g., thermoplastics) are susceptible to oxidative degradation over time due to the direct or indirect effects of heat and ultraviolet light. Although oxidative degradation may occur as early as the compounding and processing of the polymer, it is more commonly recognized in the final product where deterioration of properties can be more apparent causing discoloration, and loss of strength, flexibility, stiffness, resistance to scratching, or gloss. Detailed mechanisms of degradation are complex, but generally thought to be free radical in nature, starting with an initiation step such as loss of a hydrogen atom (H·) from the polymer chain and leaving a reactive and unstable polymer free radical (R·). Propagation of the free radical reaction can involve a variety of reactions including polymer free radical reaction with an oxygen molecule to form a peroxy radical (ROO·), which may then remove a hydrogen atom from another polymer chain to form a hydroperoxide (ROOH) and generate another polymer free radical (R·). The hydroperoxide may then split into two new free radicals, (RO·) and (·OH), which will continue to propagate the reaction to other polymer molecules. Further reactions to adjacent polymer chains can result in branching and crosslinking. Termination of the reactions may occur naturally by combining free radicals, but significant polymer degradation may occur during this timeframe. The art has developed the use of additives designed to "mop up" the free radicals during the degradation process and thereby effect termination of the radical reactions more rapidly. Such additives are usually referred to as antioxidant stabilizers. Polymers stabilized include, but are not limited to, polypropylene, polyethylene, polyvinyl chloride (PVC), polyvinyl acetate (PVA), chlorinated polyethylene, polystyrene, acrylonitrile-butadiene-styrene (ABS) copolymers, ethylene-vinyl acetate copolymers, PVC/ABS blends, polyethylene terephthalate (PET), polycarbonate, polyurethanes, acrylics, styrene-acrylics, polyamides, nylon, elastomers, etc.

Known antioxidant stabilizers have included heavy metal salts, organometallic compounds and complexes, including such metals as lead, barium, cadmium, tin, and more recently zinc, calcium, magnesium and aluminum, but most of these have been (or are being) phased out due to environmental and/or toxicological concerns. Other antioxidant stabilizers include organo-phosphites and -phosphonites, sterically hindered phenols, amines and thioesters.

In addition to stabilizing free radicals (terminating the degradation reactions) and having a favorable environmental and toxicological profile, the stabilizers must show good compatibility with the polymer as well as resistance to migration out of the polymer via diffusion or leaching. The latter issue (migration and blooming of antioxidant additives) is especially troublesome for small molecule additives, particularly if the compatibility with the polymer is poor. Many of the commercial stabilizer additives are deficient in one or more of these properties. What is needed is an economical stabilizer additive that provides all of these properties.

The methods and compositions of the present invention are directed toward these, as well as other, important ends.

SUMMARY OF THE INVENTION

In an embodiment, provided is a composition comprising a thermoplastic polymer and a biomass, wherein the biomass comprises a lignin, and wherein the composition comprises cellulose and/or hemicellulose in an amount no greater than 20% based on the weight of the biomass.

In an embodiment, provided is a polymer or polymer composition comprising one or more of a hardwood lignin, a softwood lignin, and a grass lignin. In certain embodiments, the polymer or polymer composition can further comprise acridine orange (AO). Thus, in an embodiment provided is a polymer or polymer composition comprising hardwood lignin. In a further embodiment, provided is a polymer or polymer composition comprising a softwood lignin. In a still further embodiment, provided is a polymer or polymer composition comprising a grass lignin.

In certain embodiments, provided is a thermoplastic, a thermoset, a composite, a coating, a film, an adhesive, a personal care composition, or any combination thereof, comprising a disclosed polymer or polymer composition. Thus, for example, a disclosed thermoplastic, thermoset, composite, coating, film, adhesive, personal care composition, or combination thereof can be formed from or made of a disclosed polymer or polymer composition.

In certain embodiments, the oxidation onset temperature of the polymer or polymer composition comprising a grass lignin is at least 10° C. higher than an otherwise identical polymer or polymer composition containing Kraft lignin or hardwood lignin instead of the grass lignin.

In certain embodiments, the polymer or polymer composition comprising a grass lignin has an oxidation onset temperature of about 232° C. to about 250° C. In one such embodiment, the polymer is polypropylene. In one such embodiment, the grass lignin is switchgrass lignin.

In certain embodiments, the polymer is a thermoplastic.

In certain embodiments, the thermoplastic comprises polyethylene, polypropylene, or a combination thereof.

In certain embodiments, the grass lignin is switchgrass lignin.

Additional advantages will be set forth in part in the description which follows, and in part will be obvious from the description, or can be learned by practice of the invention. The advantages will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated in and constitute a part of this specification, illustrate several aspects and together with the description serve to explain the principles of the invention.

DETAILED DESCRIPTION

Figure 1:
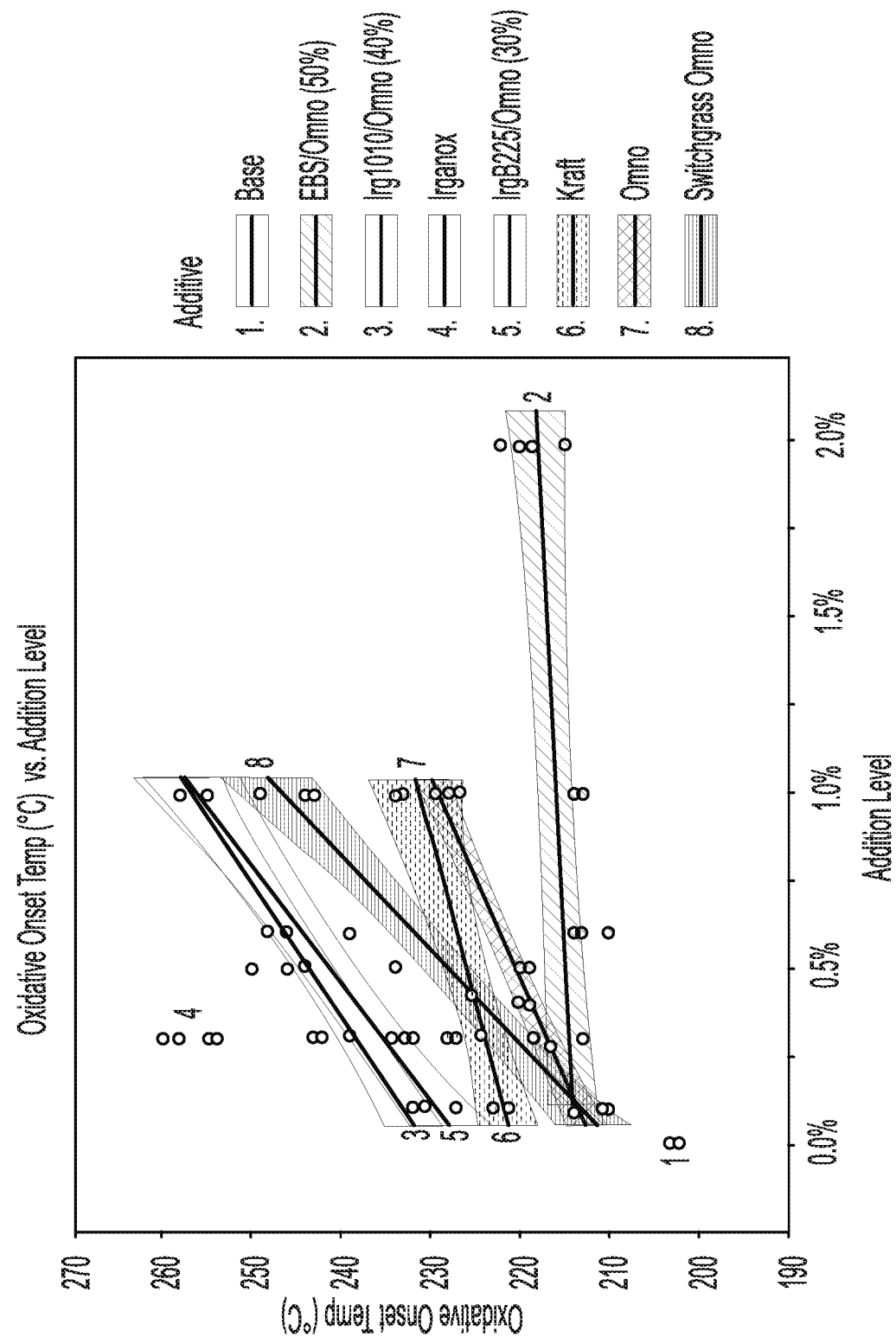
FIG. 1 shows the Oxidation Onset Temperature, OOT, (° C.) obtained at each antioxidant addition level for various antioxidants added to polypropylene.

The present invention relates to the use of lignin, particularly a grass lignin, as an antioxidant stabilizer in polymers or polymer composites or polymer compositions; especially in thermoplastics, thermoplastic composites, thermosets, coatings, films, adhesives, personal care compositions, or any combination thereof.

The invention, however, is not limited to the use of the lignin as an antioxidant additive for polymers, but may include the use of the grass lignin as a filler in a polymer or polymer composition (e.g., a polymer composite), wherein the filler additionally provides protection from degradation resulting from the action of heat or light on the polymer composite.

The present invention can be understood more readily by reference to the following detailed description, examples, and claims, and their previous and following description. However, it is to be understood that this invention is not limited to the specific compositions, articles, devices, systems, and/or methods disclosed unless otherwise specified, and as such, of course, can vary. While aspects of the present invention can be described and claimed in a particular statutory class, such as the composition of matter statutory class, this is for convenience only and one of skill in the art will understand that each aspect of the present invention can be described and claimed in any statutory class.

The following description of the invention is also provided as an enabling teaching of the invention in its best, currently known aspect. To this end, those of ordinary skill in the relevant art will recognize and appreciate that changes and modifications may be made to the various aspects of the invention described herein, while still obtaining the beneficial results of the present invention. It will also be apparent that some of the benefits of the present invention may be obtained by selecting some of the features of the present invention without utilizing other features. Accordingly, those of ordinary skill in the relevant art will recognize that many modifications and adaptations to the present invention are possible and may even be desirable in certain circumstances, and are thus also a part of the present invention.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same heading or portion of the disclosure, or under any other heading or other portion of the disclosure.

Any combination of the elements described herein in all possible variations thereof is encompassed by the invention unless otherwise indicated herein or otherwise clearly contradicted by context.

All publications mentioned herein are incorporated herein by reference to disclose and describe the methods and/or materials in connection with which the publications are cited.

It is to be understood that the terminology used herein is for the purpose of describing particular aspects only and is not intended to be limiting. Unless defined otherwise, all technical and scientific terms used herein have the same meaning as commonly understood by one of ordinary skill in the art to which this invention belongs. In this specification and in the claims that follow, reference will be made to a number of terms which are defined herein.

A. DEFINITIONS

As employed above and throughout the disclosure, the following terms, unless otherwise indicated, shall be understood to have the following meanings.

As used in the specification and the appended claims, the singular forms "a," "an" and "the" include plural referents unless the context clearly dictates otherwise.

As used herein, the terms "optional" or "optionally" mean that the subsequently described event, condition, component, or circumstance may or may not occur, and that the description includes instances where said event, condition, component, or circumstance occurs and instances where it does not.

As used herein, the phrase "sufficient to" (e.g., "conditions sufficient to" or "sufficient for") refers to such a value or a condition that is capable of performing the function or property for which such value or condition is expressed. As will be pointed out below, the exact value or particular condition required may vary from one embodiment to another, depending on recognized variables, such as the materials employed and/or the processing conditions.

The term "by weight," when used in conjunction with a component, unless specifically stated to the contrary, is based on the total weight of the formulation or composition in which the component is included. For example, if a particular element or component in a composition or article is said to be present in an amount of 8% by weight, it is understood that this percentage is in relation to a total compositional percentage of 100%. In some instances, the weight percent of a component is based on the total weight of the composition "on a dry basis," which indicates the weight of the composition without water (e.g., less than about 1%, less than about 0.5%, less than about 0.1%, less than about 0.05%, or about 0% of water by weight, based on the total weight of the composition).

The use of numerical values in the various quantitative values specified in this application, unless expressly indicated otherwise, are additionally stated, in the alternative, as approximations as though the minimum and maximum values within the stated ranges were both preceded by the word "about." In this manner, slight variations from a stated value may be used to achieve substantially the same results as the stated value. Also, the disclosure of ranges is intended as a continuous range including every value between the minimum and maximum values recited as well as any ranges that may be formed by such values. For example, a disclosure that a component may be present in an amount of from 2% to 10% would include, among others from 2% to 9%, 2% to 8%, 3% to 10%, 3% to 9%, 4% to 5%, etc. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

When disclosing numerical values herein, for example, 1, 2, 3, 4, 5, 6, 7, 8, 9, 10, the following sentence may follow such numerical values: "Each of the foregoing numbers can be preceded by the term 'about,' 'at least about,' or 'less than about,' and any of the foregoing numbers can be used singly to describe an open-ended range or in combination to describe a closed-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "less than about" (e.g., less than about 7), or used in any combination with or without any of the prefatory words or phrases to define a range (e.g., 2 to 9, about 1 to 4, 8 to about 9, about 1 to about 10, and so on). Moreover, when a range is described as "about X or less" (where X is a number), this phrase is the same as a range that is a combination of "about X" and "less than about X" in the alternative. For example, "about 10 or less" is the same as "about 10, or less than about 10." Such interchangeable range descriptions are contemplated herein. Other range formats are disclosed herein, but the difference in formats should not be construed to imply that there is a difference in sub stance.

As used herein, the term "substantially free of" refers to a composition having less than about 1% by weight, e.g., less than about 0.5% by weight, less than about 0.1% by weight, less than about 0.05% by weight, or less than about 0.01% by weight of the stated material, based on the total weight of the composition.

As used herein, the term "substantially" (when not used in the phrase "substantially free of" when used in reference to a composition, refers to at least about 60% by weight, e.g., at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight, based on the total weight of the composition, of a specified feature or component.

As used herein, "continuous" indicates a process which is uninterrupted for its duration, or interrupted, paused or suspended only momentarily relative to the duration of the process. A process is "continuous" when the starting material (cellulose-containing composite) is fed into the apparatus without interruption or without a substantial interruption, or processing of the composite is not done in a batch process.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. At or above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is defined herein as near-critical or sub-critical water, or at any temperature at least about 50° C. (preferably, at least about 100° C., at least about 150° C., at least about 200° C., at least about 250° C., at least about 300° C., or at least about 350° C.) but less than supercritical (e.g., less than about 374° C.), and at pressures such that the water (e.g., all of the water) is in a liquid state.

As used herein, a fluid which is "supercritical" (e.g., supercritical water, supercritical CO2, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g., water and ethanol, water and CO2, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether any supercritical phase contains water and regardless of whether the water phase contains any carbon dioxide. For example, a mixture of sub-critical water and supercritical CO2 may have a temperature of about 250° C. to about 280° C. and a pressure of at least about 225 bar.

The term "supercritical hydrolysis" refers to a hydrolysis reaction effected by one or more fluids under supercritical conditions (i.e., a supercritical fluid).

All pressures disclosed herein are gauge pressures, unless clearly contradicted by context.

Herein, a "fluid" means a vapor or a liquid or both.

Herein, a "slurry" refers to a flowable or pumpable mixture of an insoluble, or partially soluble, solid with a fluid, such as, for example, suspended pieces or particles of biomass in water.

Herein, a "grass lignin" is a lignin derived from a grass biomass. Grass biomasses include switchgrass, *Miscanthus* (silvergrass), lawn grasses, ornamental grasses, and cereal grains such as sorghum, barley, wheat, etc. Grass lignin is composed of three monolignols (lignin syringyl-S, lignin guaiacyl-G and lignin hydroxyphenyl-H subunits) and normally has more H subunits (more coumaryl derivatives) than in non-grasses. Grass lignin is further differentiated by a large quantity of hydroxycinnamic acid units such as ferulic acid and p-coumaric acid, which are ether linked to the lignin.

Herein "composite" is an article or material made from two or more constituent components in which the constituent components have different physical or chemical properties. The term "composite" as used herein includes lignin-containing composite such as polymer-lignin composite.

"Synthetic polymer" refers to polymers that are not natural polymers, but instead are made through artificial means, e.g., they are human-made or machine-made; examples of synthetic polymers include homopolymers such as polyethylene, polypropylene, etc., as well as copolymers such as ethylene-vinyl acetate, styrene-butadiene, etc. Herein, the use of the term synthetic polymer includes any or all of the various types of such polymers, such as thermoset polymers and thermoplastic polymers, or structural forms of synthetic polymers (e.g. isotactic, syndiotactic, atactic) as well as polymers differentiated as being high density polymers or low density polymers (e.g., low density polyethylene, high density polyethylene, etc.).

As used herein, the term "polymer-lignin composite" means a composite comprising polymer and lignin, wherein each of these components is present in an amount of greater than 0%, and ranging up to a maximum of less than 100% by weight, based on the weight of the composite on a dry basis. As used herein, the term "polymer-lignin composite" does not encompass naturally occurring composites such as wood, lignocellulosic biomass, cellulose-hemicellulose composites, or constructs comprising wood or lignocellulosic biomass. Cellulose or hemicellulose, or even wood, may also be present as an additional component (in addition to the polymer component and the lignin component). Specific examples of polymer-lignin composites are described elsewhere herein and are representative of the meaning of "cellulose-polymer composite" as used herein.

As used herein, "comminuting" means any mechanical technique for the size reduction of a solid, such as crushing, grinding, collision milling, and the like.

As used herein, the terms "ambient temperature" and "ambient pressure" refer to normal (usually, but not necessarily, unadjusted) room temperature and room pressure. Because such conditions can vary, the term is only used to convey an approximate temperature and approximate pressure. Herein, ambient temperature is taken to mean a temperature of 20° C.+/−5° C., and ambient pressure is taken to mean a pressure of 1 bar (1 atmosphere)+/−0.2 bar (0.2 atmosphere).

As used herein, the term "glass transition temperature", or Tg, refers to the temperature at or above which a glassy polymer will undergo segmental motion of the polymer chain (and transitions from the "glassy" state to a molten or rubber-like state) and as used herein refers to a measured Tg determined by differential scanning calorimetry (DSC) using a heating rate of 10° C./minute, taking the mid-point in the heat flow versus temperature transition as the Tg value.

As used herein, "C1-05 alcohol" indicates an alcohol comprising 1 to 5 carbon atoms. Examples of C1-05 alcohols include, but are not limited to, methanol, ethanol, n-propanol, isopropanol, n-butanol, s-butanol, t-butanol, i-butanol, n-pentanol, 2-pentanol, 3-pentanol, 2-methyl-1-butanol, 2-methyl-2-butanol, 3-methyl-1-butanol, 3-methyl-2-butanol, and 2,2-dimethyl-1-propanol. Mixtures of one or more of these alcohols may be used.

B. POLYMERS AND POLYMER COMPOSITIONS

In an embodiment, disclosed are compositions comprising a thermoplastic polymer and a biomass, wherein the biomass comprises a lignin, and wherein the composition comprises cellulose and/or hemicellulose in an amount no greater than 20% based on the weight of the biomass.

The present invention provides a polymer or polymer composition comprising a lignin such as, for example, a hardwood lignin, a softwood lignin, a grass lignin, or a combination thereof. In certain embodiments, the polymer or polymer composition can further comprise acridine orange (AO). In certain embodiments, the hardwood lignin, the softwood lignin, and/or the grass lignin are prepared by a disclosed process.

Without wishing to be bound by theory, the composition of lignin varies from species to species. Briefly, three monolignol monomers are precursors of lignin, all of which are methoxylated to various degrees. These include p-coumaryl alcohol, coniferyl alcohol, and sinapyl alcohol. These lignols are incorporated into lignin in the form of the phenylpropanoids p-hydroxyphenyl (H), guaiacyl (G), and syringyl (S), respectively. Gymnosperms have a lignin that consists almost entirely of G with small quantities of H. Dioctyledonous angiosperms are more often than not a mixture of G and S, with very little H. Finally, monocotyledonous lignin is a mixture of all three (i.e., a mixture of H, G, and S). Many grasses have mostly G, while some palms have mainly S. All lignins contain small amounts of incomplete or modified monolignols. Additionally, other monomers can be prominent in non-woody plants.

In certain embodiments, the lignin is substantially free of cellulose. Thus, for example, the lignin can contain less than about 20% by weight, less than about 15% by weight, less than about 10% by weight, less than about 5% by weight, or less than about 1% by weight of cellulose, based on the total weight of the lignin.

In certain embodiments, the lignin is substantially free of hemicellulose. Thus, for example, the lignin can contain less than about 20% by weight, less than about 15% by weight, less than about 10% by weight, less than about 5% by weight, or less than about 1% by weight of hemicellulose, based on the total weight of the lignin.

In certain embodiments, the lignin is substantially free of both cellulose and hemicellulose. Thus, for example, the lignin can contain less than about 20% by weight, less than about 15% by weight, less than about 10% by weight, less than about 5% by weight, or less than about 1% by weight of both cellulose and hemicellulose together, based on the total weight of the lignin.

The present invention also provides a polymer or polymer composition comprising a biomass consisting essentially of lignin. Thus, in certain embodiments, the biomass comprises at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight of lignin, based on the total weight of the biomass.

The polymer-lignin composite comprises at least one polymer and a lignin. Each of the polymer component and the lignin component is present in an amount of greater than 0%, and ranging up to a maximum of less than 100% by weight, based on the weight of the composite on a dry basis. In an embodiment, each of the at least two components is present in an amount of at least 2%, and ranging up to a maximum of 98% by weight, based on the weight of the composite. In an embodiment, each of the at least two components is present in an amount of at least 5%, and ranging up to a maximum of 95% by weight, based on the weight of the composite.

The lignin (e.g., grass lignin or hardwood lignin) can be employed in a polymer or polymer composition, such as a thermoplastic polymer, in any suitable amount. For example, the amount (wt. %) can be 0.01, 0.02, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, 4.8, 5, 5.5, 6, 6.5, 7, 7.5, 8, 8.5, 9, 9.5, 10, 11, 12, 13, 14, 15, 16, 18, 20, 22, 24, 26, 28, 30, 32, 34, 36, 38, 40, 42, 44, 46, 48, 50, 55, 60, 65, 70, 75, 80, 85, 90 or 95. Each of the foregoing numbers can be preceded by the term "about," "at least about," or "less than about," and any of the foregoing numbers can be used singly to describe an open-ended range or in combination to describe a close-ended range. For example, the lignin can be employed in a polymer or polymer composition in an amount of from 0.1 to 3.0 wt. %, or from 0.3 to 2.0 wt. %, or from 10 to 60 wt. %. Lignin can be obtained from biomass as described elsewhere herein. Suitable biomasses include, but are not limited to, switchgrass, *Miscanthus* (silvergrass), lawn grasses, hardwood, ornamental grasses, and cereal grains such as sorghum, barley, wheat, etc. As disclosed herein, the lignin can be used in any composition for antioxidant purposes, including compositions where the polymer or polymer composition is present in a coating, film, adhesive, or personal care composition.

Thus, in certain embodiments, the polymer or polymer composition is a thermoplastic, a thermoset, a composite, a coating, a film, an adhesive, a personal care composition, or any combination thereof.

In certain embodiments, the oxidation onset temperature of the polymer or polymer composition comprising the grass lignin is at least 10° C. higher than an otherwise identical polymer or polymer composition containing Kraft lignin or hardwood lignin instead of the grass lignin.

In certain embodiments, the polymer or polymer composition has an oxidation onset temperature of about 232° C. to about 250° C. In one such embodiment, the polymer is polypropylene. In one such embodiment, the grass lignin is switchgrass lignin.

In certain embodiments, the polymer or polymer composition is a thermoplastic.

In certain embodiments, the thermoplastic comprises polyethylene, polypropylene, or a combination thereof.

Other suitable components of the polymer or polymer composition can be fillers (e.g., talc, calcium carbonate, glass fiber, etc.), colorants (e.g., inorganic pigments such as titanium dioxide, carbon black, metal salts, etc. or organic colorants such as phthalocyanine blue), as well as other additives such as compatibilizers (e.g., graft-modified polymers, block copolymers, silanes, etc.), processing aids (e.g., waxes, lubricants, zinc stearate, etc.), anti-abrasion aids (e.g., lubricants such as polytetrafluoroethylene, PTFE, oils, silicones, etc.), anti-blocking aids (e.g., talc), anti-static agents (metals such as stainless steel fibers, ionic salts, etc.), nucleants (e.g., sorbitol, minerals, metal salts, etc.), flame retardants (bromine containing compounds, phosphorus containing compounds, magnesium hydroxide, etc.), or any combination thereof.

The polymer to be stabilized (or polymer in the polymer-lignin composite) may be any polymer, such as, for example, a thermoset polymer, a thermoplastic polymer, a coating, a film, an adhesive, a personal care composition, or any combination thereof. In certain embodiments, the polymer may be a synthetic polymer. In certain embodiments, the polymer may be a thermoplastic polymer. In certain embodiments, the polymer comprises, consists essentially of, or consists of, polyethylene, polypropylene, polyester (e.g., poly(ethylene terephthalate)), polyamide (e.g., including aliphatic, aromatic or semi-aromatic polyamides), or any combination thereof. Polymers stabilized include, but are not limited to, polypropylene, polyethylene, polyvinyl chloride (PVC), polyvinyl acetate (PVA), chlorinated polyethylene, polystyrene, acrylonitrile-butadiene-styrene (ABS) copolymers, ethylene-vinyl acetate copolymers, PVC/ABS blends, polyethylene terephthalate (PET), polycarbonate, polyurethanes, acrylics, styrene-acrylics, polyamides, nylon, elastomers, etc. Any of the polymers herein may be present singly or in any combination (e.g., with other synthetic polymers, with natural polymers, or both). The polymer may be present as a bulk (dry) polymer with no solvent or carrier liquid; or it may be present in a solvent solution or dispersion, or aqueous solution or dispersion; or it may be present as a dried film or coating. Thus, in various embodiments, the polymer to be stabilized can be a polymer that has a processing temperature (i.e., melt or softening) below the scorch point of lignin. In various further embodiments, the polymer to be stabilized can be a polymer that has a processing temperature below about 400° C.

Antioxidant activity can be assessed using ASTM 2009-02 (Standard Test Method for Oxidation Onset Temperature of Hydrocarbons by Differential Scanning calorimetry (DSC)). Grass lignin, such as switchgrass lignin, can provide superior protection to oxidative degradation for polymers compared to other lignins. For example, at a 1.0 wt. % level, the switchgrass lignin typically raises the Oxidation Onset Temperature of polypropylene (Bapolene® 4012F, Bamberger Polymer, Inc., Houston, TX, USA) from about 200° C. to about 244° C. (compared to about 230° C. for hardwood lignins and Kraft lignins, at the same level in the same polymer).

In certain embodiments, the composition an oxidation onset temperature that is at least 10° C. higher than an otherwise identical composition containing Kraft lignin or hardwood lignin instead of the grass lignin.

1. Grass Lignin

In certain embodiments, the lignin is grass lignin. In certain embodiments, the grass lignin is switchgrass lignin. In certain embodiments, the grass lignin has a large quantity of hydroxycinnamic acid units, e.g., ferulic acid and p-coumaric acid units, which are ether linked to the lignin. For example, the grass lignin can comprise a mixture of p-hydroxyphenyl, guiaiacyl, and syringly units.

In certain embodiments, the grass lignin has an average particle size, $d_{(50)}$, as measured by light scattering, of less than about 600 µm, less than about 550 µm, less than about 500 µm, less than about 450 µm, less than about 400 µm, less than about 350 µm, less than about 300 µm, less than about 250 µm, less than about 200 µm, less than about 150 µm, less than about 125 µm, less than about 100 µm, less than about 75 µm, less than about 50 µm, less than about 25 µm, less than about 10 µm, or less than about 5 µm.

In certain embodiments, the grass lignin is obtained by hydrolysis, e.g., sub-, near-, or supercritical hydrolysis, of a grass biomass with a fluid. Examples of fluids include, but are not limited to, water, methanol, ethanol, propanol, butanol, carbon dioxide, sulfur dioxide, or any combination thereof. In certain aspects, hydrolysis is supercritical hydrolysis. The preparation process can comprise a pretreatment step, as further detailed herein, although such a pretreatment step is not required. In certain embodiments, the process can comprise a treatment step, as further detailed herein.

In certain embodiments, the grass lignin is obtained by hydrolysis, such as, for example, supercritical hydrolysis. The hydrolysis can be conducted at a pressure (bar) such as, for example, 1, 5, 10, 20, 30, 40, 50, 60, 70, 80, 90, 100, 110, 120, 125, 130, 140, 150, 160, 170, 175, 180, 190, 200, 210, 220, 221, 225, 230, 240, 250, 260, 270, 275, 280, 290, 300, 310, 320, 325, 330, 340, 350, 360, 370, 375, 380, 390, 400, 420, 440, 450, 460, 475, 480, 500, 525, 550, 575, 600, 625, 650, 675, 700, 725, 750, 775, or 800. The hydrolysis can be conducted at a temperature (° C.) such as, for example, 374, 375, 380, 390, 400, 410, 420, 430, 440, 450, 460, 470, 480, 490, 500, 510, 520, 530, 540, 550, 560, 570, or 575. Each of the foregoing numbers can be preceded by the word "about," "at least about," or "less than about," and any of the foregoing numbers can be used singly to describe an open-ended range or in combination to describe a closed-ended range. Thus, in certain embodiments the grass lignin is obtained by exposing a grass biomass to a fluid having a temperature of at least about 340° C. to about 400° C. and a pressure of from about 225 bar to about 250 bar.

Conventionally, antioxidants for polymers are provided as additives and typically used in amounts ranging from 0.05 to 10 wt. % (solids on solids). The grass lignin (e.g., switchgrass lignin) disclosed herein for use as an antioxidant in polymers may also be utilized in this way, as a polymer additive. However, as disclosed herein, and discussed further below, the grass lignin may also be utilized as a polymer filler (or extender) which also functions as an antioxidant. The content of the grass lignin may therefore be as high as 95 wt. %.

The polymer-lignin composite comprises at least one polymer and grass lignin. Each of the polymer component and grass lignin component is present in an amount of greater than 0%, and ranging up to a maximum of less than 100% by weight, based on the weight of the composite on a dry basis. In an embodiment, each of the at least two components is present in an amount of at least 2%, and ranging up to a maximum of 98% by weight, based on the weight of the composite. In an embodiment, each of the at least two components is present in an amount of at least 5%, and ranging up to a maximum of 95% by weight, based on the weight of the composite.

The grass lignin (e.g., switchgrass lignin) can be employed in a polymer or polymer composition, such as a thermoplastic polymer, in any suitable amount. For example, the amount (wt. %) can be 0.01, 0.02, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, 4.8, 5, 5.5, 6, 6.5, 7, 7.5, 8, 8.5, 9, 9.5, 10, 11, 12, 13, 14, 15, 16, 18, 20, 22, 24, 26, 28, 30, 32, 34, 36, 38, 40, 42, 44, 46, 48, 50, 55, 60, 65, 70, 75, 80, 85, 90 or 95. Each of the foregoing numbers can be preceded by the term "about," "at least about," or "less than about," and any of the foregoing numbers can be used singly to describe an open-ended range or in combination to describe a close-ended range. For example, the grass lignin can be employed in a polymer or polymer composition in an amount of from 0.1 to 3.0 wt. %, or from 0.3 to 2.0 wt. %, or from 10 to 60 wt. %. Grass lignin can be obtained from grass biomass as described elsewhere herein. Suitable biomasses include, but are not limited to, switchgrass, *Miscanthus* (silvergrass), lawn grasses, ornamental grasses, and cereal grains such as sorghum, barley, wheat, etc. As disclosed herein, the grass lignin can be used in any composition for antioxidant purposes, including compositions where the polymer or polymer composition is present in a coating, film, adhesive, or personal care composition.

The grass lignin may have a mean particle size, diameter/largest dimension (micrometers) of 0.1, 0.2, 0.3, 0.4, 0.5, 0.6, 0.7, 0.8, 0.9, 1.0, 1.2, 1.3, 1.4, 1.5, 1.6, 1.7, 1.8, 1.9, 2.0, 2.2, 2.4, 2.6, 2.8, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 25, 30, 40, 50. Each of the foregoing numbers can be preceded by the term "about," "at least about," or "less than about," and any of the foregoing numbers can be used singly to describe an open-ended range or in combination to describe a close-ended range. For example, the grass lignin may have a mean particle size (micrometers) of from 1.0 to 10.0, or from 2 to 8 micrometers.

The grass lignin may have a carbohydrate content (%) of 0.1, 0.5, 1.0, 1.5, 2.0, 5.0, 6.0, 7.0, 8.0, 9.0, 10, 11, 12, 13, 14, 15, 16, 17, 18, 19, 20, 25, 30, 40, 50. Each of the foregoing numbers can be preceded by the term "about," "at least about," or "less than about," and any of the foregoing numbers can be used singly to describe an open-ended range or in combination to describe a close-ended range. For example, the grass lignin may have a carbohydrate content of from 1.0 to 15.0, or from 2 to 8%.

Biomass, including switchgrass biomass, typically comprises cellulose, hemicellulose, and lignin. The grass lignin can be derived from a grass biomass by any suitable method, including, for example, by hydrolysis of grass biomass with a fluid. The hydrolysis can include one step or multiple steps (2, 3, 4, 5, 6, 7, 8, or 9 or more hydrolysis steps). The temperatures, pressures, and times described herein can apply to any single step. For example, a hydrolysis process can be performed in two steps, in which the first step has any of the temperatures, pressures, and residences times disclosed herein, and in which the second step has any of the temperatures, pressures, and times disclosed herein.

The fluid comprises, consists of, or consists essentially of water, methanol, ethanol, propanol, butanol, carbon dioxide, sulfur dioxide, or any combination thereof. In some embodiments, the fluid comprises, consists of, or consists essentially of water.

In certain embodiments, the grass biomass (e.g., switchgrass) is subjected to sub-, near-, or supercritical hydrolysis. The process may comprise a pretreatment step, in which the grass biomass is pretreated under a first temperature and a first pressure for a first period of time, thereby forming a pretreated biomass. The pretreatment step, as used herein, typically comprises extracting hemicellulose (if present) from the biomass, while leaving behind the cellulose (if present) and lignin (i.e., the products of the pretreatment step are termed herein the "pretreated biomass"). The process may additionally comprise a treatment step, in which the pretreated biomass is treated under a second temperature and a second pressure for a second period of time. In some embodiments, the process comprises the treatment step and does not comprise the pretreatment step. In other words, the grass biomass that is not subjected to a pretreatment step as defined herein is subjected to a treatment step comprising a fluid; however, prior to the treatment step the grass biomass may be comminuted (e.g., size reduced by mechanical means, such as crushing, grinding, collision milling, etc., or by explosive decompression, such as steam explosion), which comminution does not qualify as a pretreatment step as used herein. In the case of using a fluid comprising supercritical water, the process may comprise treating grass biomass using supercritical water without a pretreatment step as defined herein.

In some embodiments, if necessary, the grass biomass may be subjected to size-reduction as described above prior to sub-, near-, or supercritical hydrolysis, typically to produce average particle size, $d_{(50)}$, of less than about 600 micrometers, or less than 500 micrometers. In certain embodiments, size reducing comprises exploding the grass biomass in the presence of ammonia. In certain embodiments, size reducing comprises exploding the grass biomass in the presence of sulfur dioxide. Size-reduction, however, may not be necessary.

In certain embodiments, the grass biomass to be subjected to sub-, near-, or supercritical hydrolysis, or any other hydrolysis (e.g., enzymatic, etc.) disclosed herein, has an average particle size, $d_{(50)}$, as measured by light scattering, of less than about 600 μm, or less than about 500 μm, e.g., the average particle size, $d_{(50)}$, (in micrometers, μm may be 5, 10, 25, 50, 75, 100, 125, 150, 200, 250, 300, 350, 400, 450, 500, 550, 600. Each of the foregoing numbers can be preceded by the word "about," "at least about," or "less than about," and any of the foregoing numbers can be used singly to describe an open-ended range or in combination to describe a closed-ended range. For example, the average particle size, $d_{(50)}$, can be about 50 μm to about 600 μm, about 50 μm to about 500 μm, about 50 μm to about 450 μm, about 25 μm to about 250 μm, or about 100 μm to about 400 μm.

In certain embodiments, the grass biomass, preferably size reduced as described earlier herein, is mixed with a fluid, e.g., a fluid comprising, consisting of, or consisting essentially of water, thereby forming a mixture, and the mixture is subjected to hydrolysis at a temperature of at least about 100° C. In some embodiments, the fluid that is contacted with the mixture, or the mixture itself, has a temperature (° C.) of 100, 120, 140° C., 150° C., 160° C., 170° C., 180° C., 190° C., 200° C., 210° C., 220° C., 230° C., 240° C., 250° C., 260° C., 280° C., 300° C., 320° C., 340° C., 350° C., 360° C., 370° C., 374.2° C., 380° C., 390° C., 400° C., 410° C., 420° C., 440° C., 450° C., 460° C., 480° C., 500° C., 520° C., 540° C., 560° C., 580° C., or 600° C. Each of the foregoing numbers can be preceded by the word "about," "at least about," or "less than about," and any of the foregoing numbers can be used singly to describe an open-ended range or in combination to describe a closed-ended range. For example, the mixture may be subjected to hydrolysis at a temperature of from 190° C. to 374° C.; or the mixture may be subjected to hydrolysis at a temperature of from 374° C. to 500° C., or greater than 500° C. In certain embodiments, the mixture is subjected to hydrolysis at a temperature of from 100° C. to 500° C., and under a pressure sufficient to ensure all of the fluid is in liquid form. In some such embodiments, the mixture is substantially free of exogenous acid. In some such embodiments, the mixture is substantially free of Ci-05 alcohols. Optionally, for each embodiment, one or more preheating steps may also be employed.

In certain embodiments, the grass biomass is mixed with a fluid, e.g. comprising, consisting of, or consisting essentially of water, to form a mixture and the mixture is subjected to supercritical hydrolysis, wherein said mixture is subjected to a temperature of at least about 374° C., such as from about 374.2° C. to about 575° C., and a pressure of at least about 221 bar, and for a duration sufficient to produce at least one C6 saccharide. When the mixture is subjected to supercritical hydrolysis, the water that is contacted with the mixture has a temperature of at least about 374° C. The water that is contacted with the mixture has a temperature (° C.) of 374, 375, 380, 390, 400, 410, 420, 430, 440, 450, 460, 470, 480, 490, 500, 510, 520, 530, 540, 550, 560, 570, 575. Each of the foregoing numbers can be preceded by the word "about," "at least about," or "less than about," and any of the foregoing numbers can be used singly to describe an open-ended range or in combination to describe a closed-ended range. Thus, the water that is contacted with the mixture can have a temperature bounded by any two of the foregoing endpoints. For example, the water can have a temperature of about 374° C. to about 575° C., about 374° C. to about 450° C., about 400° C. to about 520° C., or about 375° C. to about 430° C.; and, in each case, under a pressure of at least about 221 bar. In certain embodiments, the water can have a temperature greater than 575° C. and under a pressure of at least about 221 bar. In some such embodiments, the mixture is substantially free of exogenous acid. In some such embodiments, the mixture is substantially free of C1-05 alcohols. Optionally, for each embodiment, additional preheating steps may also be employed.

In embodiments where the mixture is subjected to sub-, near-, or supercritical hydrolysis, the hydrolysis is conducted at a pressure (bar) of 1, 5, 10, 20, 30, 40, 50, 60, 70, 80, 90, 100, 110, 120, 125, 130, 140, 150, 160, 170, 175, 180, 190, 200, 210, 220, 221, 225, 230, 240, 250, 260, 270, 275, 280, 290, 300, 310, 320, 325, 330, 340, 350, 360, 370, 375, 380, 390, 400, 420, 440, 450, 460, 475, 480, 500, 525, 550, 575, 600, 625, 650, 675, 700, 725, 750, 775, or 800. Each of the foregoing numbers can be preceded by the word "about," "at least about," or "less than about," and any of the foregoing numbers can be used singly to describe an open-ended range or in combination to describe a closed-ended range. For example, the pressure can be about 221 bar to about 800 bar, about 230 bar to about 500 bar, about 325 bar to about 750 bar, or about 275 bar to about 350 bar. In certain embodiments, the pressure may be greater than 800 bar.

In certain embodiments, where the mixture is subjected to near- or supercritical hydrolysis, the duration (seconds) of the hydrolysis is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, 5.0, 6.0, 7.0, 8.0, 9.0, 10.0, 15, 20, 30, 40, 50, 60, 70, 80, 90, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range. For example, the duration can be about 0.1 seconds to about 10 seconds, about 0.1 seconds to about 5 seconds, about 0.1 seconds to about 0.3 seconds, about 1.1 seconds to about 5 seconds, or about 0.9 seconds to about 9 seconds. In certain embodiments, the duration is greater than 10 seconds. In a preferred embodiment, the duration is about 1.4 seconds or less, such as about 0.1 seconds to about 1.4 seconds. In certain embodiments, where the mixture is subjected to lower temperatures (e.g., subcritical hydrolysis), the duration (minutes) of the hydrolysis is 0.5, 1, 1.5, 2, 2.5, 3, 3.5, 4, 4.5, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, or 300. Each of the foregoing numbers can be preceded by the word "about," "at least about," or "less than about," and any of the foregoing numbers can be used singly to describe an open-ended range or in combination to describe a closed-ended range.

In certain embodiments, the mixture comprising the grass biomass that is subject to subsequent hydrolysis is substantially free of C1-05 alcohol. In certain embodiments, the mixture is substantially free of exogenous acid. Optionally, for each embodiment, one or more preheating steps may also be employed prior to the hydrolysis. In other embodiments, the mixture comprises any C1-05 alcohol (as disclosed elsewhere herein), an exogenous acid, or any combination thereof.

In certain embodiments, the solids content of the mixture, based on the total weight of the mixture, is about 1 wt. % or more, such as from 1 wt. % to 40 wt. %. The solids content of the mixture (%) may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, or higher. Each of the foregoing numbers can be preceded by the word "about," "at least about," or "less than about," and any of the foregoing numbers can be used singly to describe an open-ended range or in combination to describe a closed-ended range. For example, the solids content of the mixture can be about 10 wt. % to about 29 wt. %, about 15 wt. % to about 29 wt. %, about 10 wt. % to about 18 wt. %, or about 24 wt. % to about 27 wt. %.

2. Hardwood Lignin

In certain embodiments, the lignin is hardwood lignin. In certain embodiments, the hardwood lignin can comprise a mixture of guiaiacyl and syringly units. In certain further embodiments, the hardwood lignin cannot comprise p-hydroxyphenyl.

In certain embodiments, the hardwood lignin has an average particle size, $d_{(50)}$, as measured by light scattering, of less than about 600 µm, less than about 550 µm, less about 500 µm, less than about 450 µm, less than about 400 µm, less than about 350 µm, less than about 300 µm, less than about 250 µm, less than about 200 µm, less than about 150 µm, less than about 125 µm, less than about 100 µm, less than about 75 µm, less than about 50 µm, less than about 25 µm, less than about 10 µm, or less than about 5 µm.

In certain embodiments, the hardwood lignin is obtained by hydrolysis, e.g., sub-, near-, or supercritical hydrolysis, of a biomass with a fluid. Examples of fluids include, but are not limited to, water, methanol, ethanol, propanol, butanol, carbon dioxide, sulfur dioxide, or any combination thereof. In certain aspects, hydrolysis is supercritical hydrolysis. The preparation process can comprise a pretreatment step, as further detailed herein, although such a pretreatment step is not required. In certain embodiments, the process can comprise a treatment step, as further detailed herein.

In certain embodiments, the hardwood lignin is obtained by hydrolysis, such as, for example, supercritical hydrolysis. The hydrolysis can be conducted at a pressure (bar) such as, for example, 1, 5, 10, 20, 30, 40, 50, 60, 70, 80, 90, 100, 110, 120, 125, 130, 140, 150, 160, 170, 175, 180, 190, 200, 210, 220, 221, 225, 230, 240, 250, 260, 270, 275, 280, 290, 300, 310, 320, 325, 330, 340, 350, 360, 370, 375, 380, 390, 400, 420, 440, 450, 460, 475, 480, 500, 525, 550, 575, 600, 625, 650, 675, 700, 725, 750, 775, or 800. The hydrolysis can be conducted at a temperature (° C.) such as, for example, 374, 375, 380, 390, 400, 410, 420, 430, 440, 450, 460, 470, 480, 490, 500, 510, 520, 530, 540, 550, 560, 570, or 575. Each of the foregoing numbers can be preceded by the word "about," "at least about," or "less than about," and any of the foregoing numbers can be used singly to describe an open-ended range or in combination to describe a closed-ended range. Thus, in certain embodiments the hardwood lignin is obtained by exposing a biomass to a fluid having a temperature of at least about 340° C. to about 400° C. and a pressure of from about 225 bar to about 250 bar.

Conventionally, antioxidants for polymers are provided as additives and typically used in amounts ranging from 0.05 to 10 wt. % (solids on solids). The hardwood lignin disclosed herein for use as an antioxidant in polymers may also be utilized in this way, as a polymer additive. However, as disclosed herein, and discussed further below, the hardwood lignin may also be utilized as a polymer filler (or extender) which also functions as an antioxidant. The content of the hardwood lignin may therefore be as high as 95 wt %.

The polymer-lignin composite comprises at least one polymer and hardwood lignin. Each of the polymer component and hardwood lignin component is present in an amount of greater than 0%, and ranging up to a maximum of less than 100% by weight, based on the weight of the composite on a dry basis. In an embodiment, each of the at least two components is present in an amount of at least 2%, and ranging up to a maximum of 98% by weight, based on the weight of the composite. In an embodiment, each of the at least two components is present in an amount of at least 5%, and ranging up to a maximum of 95% by weight, based on the weight of the composite.

The hardwood lignin can be employed in a polymer or polymer composition, such as a thermoplastic polymer, in any suitable amount. For example, the amount (wt. %) can be 0.01, 0.02, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, 4.8, 5, 5.5, 6, 6.5, 7, 7.5, 8, 8.5, 9, 9.5, 10, 11, 12, 13, 14, 15, 16, 18, 20, 22, 24, 26, 28, 30, 32, 34, 36, 38, 40, 42, 44, 46, 48, 50, 55, 60, 65, 70, 75, 80, 85, 90 or 95. Each of the foregoing numbers can be preceded by the term "about," "at least about," or "less than about," and any of the foregoing numbers can be used singly to describe an open-ended range or in combination to describe a close-ended range. For example, the hardwood lignin can be employed in a polymer or polymer composition in an amount of from 0.1 to 3.0 wt. %, or from 0.3 to 2.0 wt. %, or from 10 to 60 wt. %. Hardwood lignin can be obtained from biomass as described elsewhere herein. As disclosed herein, the hardwood lignin can be used in any composition for antioxidant purposes, including compositions where the polymer or polymer composition is present in a coating, film, adhesive, or personal care composition.

The hardwood lignin may have a mean particle size, diameter/largest dimension (micrometers) of 0.1, 0.2, 0.3, 0.4, 0.5, 0.6, 0.7, 0.8, 0.9, 1.0, 1.2, 1.3, 1.4, 1.5, 1.6, 1.7, 1.8, 1.9, 2.0, 2.2, 2.4, 2.6, 2.8, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 25, 30, 40, 50. Each of the foregoing numbers can be preceded by the term "about," "at least about," or "less than about," and any of the foregoing numbers can be used singly to describe an open-ended range or in combination to describe a close-ended range. For example, the hardwood lignin may have a mean particle size (micrometers) of from 1.0 to 10.0, or from 2 to 8 micrometers.

The hardwood lignin may have a carbohydrate content (%) of 0.1, 0.5, 1.0, 1.5, 2.0, 5.0, 6.0, 7.0, 8.0, 9.0, 10, 11, 12, 13, 14, 15, 16, 17, 18, 19, 20, 25, 30, 40, 50. Each of the foregoing numbers can be preceded by the term "about," "at least about," or "less than about," and any of the foregoing numbers can be used singly to describe an open-ended range or in combination to describe a close-ended range. For example, the hardwood lignin may have a carbohydrate content of from 1.0 to 15.0, or from 2 to 8%.

Biomass typically comprises cellulose, hemicellulose, and lignin. The hardwood lignin can be derived from a biomass by any suitable method, including, for example, by hydrolysis of a biomass with a fluid. The hydrolysis can include one step or multiple steps (2, 3, 4, 5, 6, 7, 8, or 9 or more hydrolysis steps). The temperatures, pressures, and times described herein can apply to any single step. For example, a hydrolysis process can be performed in two steps, in which the first step has any of the temperatures, pressures, and residences times disclosed herein, and in which the second step has any of the temperatures, pressures, and times disclosed herein.

The fluid comprises, consists of, or consists essentially of water, methanol, ethanol, propanol, butanol, carbon dioxide, sulfur dioxide, or any combination thereof. In some embodiments, the fluid comprises, consists of, or consists essentially of water.

In certain embodiments, the biomass is subjected to sub-, near-, or supercritical hydrolysis. The process may comprise a pretreatment step, in which the biomass is pretreated under a first temperature and a first pressure for a first period of time, thereby forming a pretreated biomass. The pretreatment step, as used herein, typically comprises extracting hemicellulose (if present) from the biomass, while leaving behind the cellulose (if present) and lignin (i.e., the products of the pretreatment step are termed herein the "pretreated biomass"). The process may additionally comprise a treatment step, in which the pretreated biomass is treated under a second temperature and a second pressure for a second period of time. In some embodiments, the process comprises the treatment step and does not comprise the pretreatment step. In other words, the biomass that is not subjected to a pretreatment step as defined herein is subjected to a treatment step comprising a fluid; however, prior to the treatment step the biomass may be comminuted (e.g., size reduced by mechanical means, such as crushing, grinding, collision milling, etc., or by explosive decompression, such as steam explosion), which comminution does not qualify as a pretreatment step as used herein. In the case of using a fluid comprising supercritical water, the process may comprise treating biomass using supercritical water without a pretreatment step as defined herein.

In some embodiments, if necessary, the biomass may be subjected to size-reduction as described above prior to sub-, near-, or supercritical hydrolysis, typically to produce average particle size, $d_{(50)}$, of less than about 600 micrometers, or less than 500 micrometers. In certain embodiments, size reducing comprises exploding the biomass in the presence of ammonia. In certain embodiments, size reducing comprises exploding the biomass in the presence of sulfur dioxide. Size-reduction, however, may not be necessary.

In certain embodiments, the biomass is subjected to sub-, near-, or supercritical hydrolysis, or any other hydrolysis (e.g., enzymatic, etc.) disclosed herein, has an average particle size, $d_{(50)}$, as measured by light scattering, of less than about 600 μm, or less than about 500 μm, e.g., the average particle size, $d_{(50)}$, (in micrometers, μm may be 5, 10, 25, 50, 75, 100, 125, 150, 200, 250, 300, 350, 400, 450, 500, 550, 600. Each of the foregoing numbers can be preceded by the word "about," "at least about," or "less than about," and any of the foregoing numbers can be used singly to describe an open-ended range or in combination to describe a closed-ended range. For example, the average particle size, $d_{(50)}$, can be about 50 μm to about 600 μm, about 50 μm to about 500 μm, about 50 μm to about 450 μm, about 25 μm to about 250 μm, or about 100 μm to about 400 μm.

In certain embodiments, the biomass, preferably size reduced as described earlier herein, is mixed with a fluid, e.g., a fluid comprising, consisting of, or consisting essentially of water, thereby forming a mixture, and the mixture is subjected to hydrolysis at a temperature of at least about 100° C. In some embodiments, the fluid that is contacted with the mixture, or the mixture itself, has a temperature (° C.) of 100, 120, 140° C., 150° C., 160° C., 170° C., 180° C., 190° C., 200° C., 210° C., 220° C., 230° C., 240° C., 250° C., 260° C., 280° C., 300° C., 320° C., 340° C., 350° C., 360° C., 370° C., 374.2° C., 380° C., 390° C., 400° C., 410° C., 420° C., 440° C., 450° C., 460° C., 480° C., 500° C., 520° C., 540° C., 560° C., 580° C., or 600° C. Each of the foregoing numbers can be preceded by the word "about," "at least about," or "less than about," and any of the foregoing numbers can be used singly to describe an open-ended range or in combination to describe a closed-ended range. For example, the mixture may be subjected to hydrolysis at a temperature of from 190° C. to 374° C.; or the mixture may be subjected to hydrolysis at a temperature of from 374° C. to 500° C., or greater than 500° C. In certain embodiments, the mixture is subjected to hydrolysis at a temperature of from 100° C. to 500° C., and under a pressure sufficient to ensure all of the fluid is in liquid form. In some such embodiments, the mixture is substantially free of exogenous acid. In some such embodiments, the mixture is substantially free of Ci-05 alcohols. Optionally, for each embodiment, one or more preheating steps may also be employed.

In certain embodiments, the biomass is mixed with a fluid, e.g. comprising, consisting of, or consisting essentially of water, to form a mixture and the mixture is subjected to supercritical hydrolysis, wherein said mixture is subjected to a temperature of at least about 374° C., such as from about 374.2° C. to about 575° C., and a pressure of at least about 221 bar, and for a duration sufficient to produce at least one C6 saccharide. When the mixture is subjected to supercritical hydrolysis, the water that is contacted with the mixture has a temperature of at least about 374° C. The water that is contacted with the mixture has a temperature (° C.) of 374, 375, 380, 390, 400, 410, 420, 430, 440, 450, 460, 470, 480, 490, 500, 510, 520, 530, 540, 550, 560, 570, 575. Each of the foregoing numbers can be preceded by the word "about," "at least about," or "less than about," and any of the foregoing numbers can be used singly to describe an open-ended range or in combination to describe a closed-ended range. Thus, the water that is contacted with the mixture can have a temperature bounded by any two of the foregoing endpoints. For example, the water can have a temperature of about 374° C. to about 575° C., about 374° C. to about 450° C., about 400° C. to about 520° C., or about 375° C. to about 430° C.; and, in each case, under a pressure of at least about 221 bar. In certain embodiments, the water can have a temperature greater than 575° C. and under a pressure of at least about 221 bar. In some such embodiments, the mixture is substantially free of exogenous acid. In some such embodiments, the mixture is substantially free of C1-05 alcohols. Optionally, for each embodiment, additional preheating steps may also be employed.

In embodiments where the mixture is subjected to sub-, near-, or supercritical hydrolysis, the hydrolysis is conducted at a pressure (bar) of 1, 5, 10, 20, 30, 40, 50, 60, 70, 80, 90, 100, 110, 120, 125, 130, 140, 150, 160, 170, 175, 180, 190, 200, 210, 220, 221, 225, 230, 240, 250, 260, 270, 275, 280, 290, 300, 310, 320, 325, 330, 340, 350, 360, 370, 375, 380, 390, 400, 420, 440, 450, 460, 475, 480, 500, 525, 550, 575, 600, 625, 650, 675, 700, 725, 750, 775, or 800. Each of the foregoing numbers can be preceded by the word "about," "at least about," or "less than about," and any of the foregoing numbers can be used singly to describe an open-ended range or in combination to describe a closed-ended range. For example, the pressure can be about 221 bar to about 800 bar, about 230 bar to about 500 bar, about 325 bar to about 750 bar, or about 275 bar to about 350 bar. In certain embodiments, the pressure may be greater than 800 bar.

In certain embodiments, where the mixture is subjected to near- or supercritical hydrolysis, the duration (seconds) of the hydrolysis is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, 5.0, 6.0, 7.0, 8.0, 9.0, 10.0, 15, 20, 30, 40, 50, 60, 70, 80, 90, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range. For example, the duration can be about 0.1 seconds to about 10 seconds, about 0.1 seconds to about 5 seconds, about 0.1 seconds to about 0.3 seconds, about 1.1 seconds to about 5 seconds, or about 0.9 seconds to about 9 seconds. In certain embodiments, the duration is greater than 10 seconds. In a preferred embodiment, the duration is about 1.4 seconds or less, such as about 0.1 seconds to about 1.4 seconds. In certain embodiments, where the mixture is subjected to lower temperatures (e.g., subcritical hydrolysis), the duration (minutes) of the hydrolysis is 0.5, 1, 1.5, 2, 2.5, 3, 3.5, 4, 4.5, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, or 300. Each of the foregoing numbers can be preceded by the word "about," "at least about," or "less than about," and any of the foregoing numbers can be used singly to describe an open-ended range or in combination to describe a closed-ended range.

In certain embodiments, the mixture comprising the biomass that is subject to subsequent hydrolysis is substantially free of C1-05 alcohol. In certain embodiments, the mixture is substantially free of exogenous acid. Optionally, for each embodiment, one or more preheating steps may also be employed prior to the hydrolysis. In other embodiments, the mixture comprises any C1-05 alcohol (as disclosed elsewhere herein), an exogenous acid, or any combination thereof.

In certain embodiments, the solids content of the mixture, based on the total weight of the mixture, is about 1 wt. % or more, such as from 1 wt. % to 40 wt. %. The solids content of the mixture (%) may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, or higher. Each of the foregoing numbers can be preceded by the word "about," "at least about," or "less than about," and any of the foregoing numbers can be used singly to describe an open-ended range or in combination to describe a closed-ended range. For example, the solids content of the mixture can be about 10 wt. % to about 29 wt. %, about 15 wt. % to about 29 wt. %, about 10 wt. % to about 18 wt. %, or about 24 wt. % to about 27 wt. %.

C. METHODS OF MAKING POLYMERS AND POLYMER COMPOSITIONS

The present invention provides a method of making a polymer or a polymer composition, the method comprising the steps of combining a lignin, e.g., a grass lignin or a hardwood lignin, and a polymer carrier. Examples of polymer carriers include, but are not limited to, polypropylene, ethylene, polyvinyl chloride (PVC), polyvinyl acetate (PVA), chlorinated polyethylene, polystyrene, acrylonitrile-butadiene-styrene (ABS) copolymers, ethylene-vinyl acetate copolymers, PVC/ABS blends, polyethylene terephthalate (PET), polycarbonate, polyurethanes, acrylics, styrene-acrylics, polyamides, nylon, elastomers, or any combination thereof.

The methods of the invention can be carried out in any suitable reactor, including, but not limited to, a tubular reactor, a digester (vertical, horizontal, or inclined), or the like. Suitable digesters include the digester system described in U.S. Pat. No. 8,057,639, which include a digester and a steam explosion unit.

Thus, for example, in certain embodiments, the lignin is obtained by (a) providing a lignocellulosic biomass comprising (i) a first solid fraction comprising cellulose and lignin and (ii) a first liquid fraction, (b) mixing the first solid fraction with water to form a slurry; and (c) pre-heating the slurry to a temperature of from about 340° C. to about 400° C. at a pressure of from about 225 bar to about 250 bar (for a residence time of from about 20 seconds to about 45 seconds in certain embodiments).

In certain embodiments, the lignin is obtained by hydrolysis, such as, for example, supercritical hydrolysis. The hydrolysis can be conducted at a pressure (bar) such as, for example, 1, 5, 10, 20, 30, 40, 50, 60, 70, 80, 90, 100, 110, 120, 125, 130, 140, 150, 160, 170, 175, 180, 190, 200, 210, 220, 221, 225, 230, 240, 250, 260, 270, 275, 280, 290, 300, 310, 320, 325, 330, 340, 350, 360, 370, 375, 380, 390, 400, 420, 440, 450, 460, 475, 480, 500, 525, 550, 575, 600, 625, 650, 675, 700, 725, 750, 775, or 800. The hydrolysis can be conducted at a temperature (° C.) such as, for example, 374, 375, 380, 390, 400, 410, 420, 430, 440, 450, 460, 470, 480, 490, 500, 510, 520, 530, 540, 550, 560, 570, or 575. Each of the foregoing numbers can be preceded by the word "about," "at least about," or "less than about," and any of the foregoing numbers can be used singly to describe an open-ended range or in combination to describe a closed-ended range. Thus, in certain embodiments the lignin is obtained by exposing a biomass to a fluid having a temperature of at least about 340° C. to about 400° C. and a pressure of from about 225 bar to about 250 bar.

In certain embodiments, the methods disclosed herein, including the hydrolysis (e.g., supercritical hydrolysis) and collection of products, are run continuously, although, in other embodiments, they may be run as batch or semi-batch processes.

The grass biomass (e.g., switchgrass) may be employed in the hydrolysis "as is," or may be suitably prepared, e.g., by washing, mechanically preparing (e.g., grinding, chopping, milling, etc.), or any combination thereof.

Other processes suitable for preparing the grass lignins of the invention may also be employed.

The grass lignins of the invention typically are (but need not be) extracted from the solids produced in a treatment step as described above by using a suitable solvent. Extraction with a suitable solvent is referred to herein as "the extraction step" or "extraction." For example, the solvent can be aqueous alkaline solutions, such as aqueous sodium hydroxide solutions. The amount of base in the alkaline aqueous solutions can be about 0.1 wt. % or more, and the maximum amount is not particularly limited. The amount of base in the alkaline aqueous solutions can be about 3 wt. % or less, and the minimum amount is not particularly limited. The balance of the solution typically comprises or consists of water. For example, the amount of base (wt. %) can be 0.1, 0.3, 0.5, 0.7, 0.9, 1.2, 1.4, 1.8, 2, 2.2, 2.4, 2.6, 2.8, 3. Each of the foregoing numbers can be preceded by the word "about," "at least about," or "less than about," and any of the foregoing numbers can be used singly to describe an open-ended range or in combination to describe a closed-ended range. For example, the amount of base can be about 0.9 wt. % or more, about 1.7 wt. % to about 2.6 wt. %, about 2.8 wt.

% to about 3 wt. %, or about 0.9 wt. % to about 1.2 wt. %. Preferably, the aqueous alkaline solution is about 1 wt. %.

Other suitable extraction solvents include aqueous organic solvents, such as at least one of dioxane, acetone, ethanol, methanol, propanol, or butanol in water. The amount of organic solvent (dioxane, acetone, ethanol, methanol, propanol, butanol, or a combination thereof) in the aqueous organic solvent can be about 80 vol. % or more, and the upper limit is not particularly limited. The amount of organic solvent can be about 99.5 vol % or less, and the minimum amount is not particularly limited. The balance can comprise or consist of water. For example, the amount of organic solvent in the aqueous organic solvent (vol. %) can be 80, 82, 84, 86, 88, 90, 92, 94, 96, 98, 99, 99.5. Each of the foregoing numbers can be preceded by the word "about," "at least about," or "less than about," and any of the foregoing numbers can be used singly to describe an open-ended range or in combination to describe a closed-ended range. For example, the amount of organic solvent in the aqueous organic solvent can be about 86 vol. % or less, about 88 vol. % to about 94 vol. %, about 90 vol. % to about 92 vol. %, or about 94 to about 96 vol. %. Preferred amounts of organic solvent in water is about 90 vol. % or about 96 vol. %.

In certain embodiments, the yield of grass lignin is at least 30% of theoretical yield. In certain embodiments, the yield (%) of said grass lignin is 30, 35, 40, 45, 50, 55, 60, 65, 70, 75, 80, 85, 90, 95, or 99% of theoretical yield. Each of the foregoing numbers can be preceded by the word "about," "at least about," or "less than about," and any of the foregoing numbers can be used singly to describe an open-ended range or in combination to describe a closed-ended range. For example, in certain embodiments, the yield of the grass lignin is at least about 70% of theoretical yield, or at least about 85% of theoretical yield.

D. PRODUCTS

In some embodiments, the invention is directed to products produced by the methods described herein.

In some embodiments, polymers stabilized include, but are not limited to, polypropylene, ethylene, polyvinyl chloride (PVC), polyvinyl acetate (PVA), chlorinated polyethylene, polystyrene, acrylonitrile-butadiene-styrene (ABS) copolymers, ethylene-vinyl acetate copolymers, PVC/ABS blends, polyethylene terephthalate (PET), polycarbonate, polyurethanes, acrylics, styrene-acrylics, polyamides, nylon, elastomers, or any combination thereof.

In some embodiments, coatings stabilized include architectural coating and industrial coatings which may comprise any of the aforementioned polymers, or any combination thereof.

In some embodiments, the grass lignin, such as switchgrass, can be used in combination with one or more additional antioxidants. Suitable antioxidants include IRGANOX 1010, IRGANOX B225, IRGAFOS 168, as well as other phosphites, phosphonites, sterically hindered phenols, amines, thioesters, or any combination thereof.

In some embodiments, the oxidation onset temperature (OOT) of the polymer containing the grass lignin (e.g., switchgrass lignin) can be (° C.) 150, 155, 160, 165, 170, 175, 180, 185, 190, 195, 200, 205, 210, 215, 220, 222, 225, 227, 230, 231, 232, 233, 234, 235, 236, 237, 238, 239, 240, 241, 242, 243, 244, 245, 246, 247, 248, 249, 250, 252, 255, 257, 260, 262, 265, 267, 270, 275, 280, 285, 290, 295, 300, 305, 310, 315, 320, 325, 330, 335, 340, 345, 350, 355, 360, 365, 370, 380, 390, 400, 410, 420, 430, 440, or 450. Each of the foregoing numbers can be preceded by the word "about," "at least about," or "less than about," and any of the foregoing numbers can be used singly to describe an open-ended range or in combination to describe a closed-ended range.

In some embodiments, the oxidation onset temperature of the polymer containing the grass lignin (e.g., switchgrass lignin) is at least 1, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, or 100 (° C.) higher than an otherwise identical polymer that contains Kraft lignin or hardwood lignin instead of the grass lignin.

E. EXEMPLARY CLAUSES

Some embodiments of the methods or products disclosed herein are set forth in the following clauses, and any combination of these clauses (or portions thereof) may be made to define an embodiment of the methods or products disclosed herein.

Clause 1: A polymer or polymer composition comprising a grass lignin.

Clause 2: The polymer or polymer composition of clause 1, wherein the polymer or polymer composition is a thermoplastic, a thermoset, a composite, a coating, a film, an adhesive, a personal care composition, or any combination thereof.

Clause 3: The polymer or polymer composition of clause 1, wherein the oxidation onset temperature of the polymer or polymer composition comprising a grass lignin is at least 10° C. higher than an otherwise identical polymer containing Kraft lignin or hardwood lignin instead of the grass lignin.

Clause 4: The polymer or polymer composition of clause 1 having an oxidation onset temperature of about 232° C. to about 250° C. In one such embodiment, the polymer or polymer composition is a polypropylene polymer comprising a grass lignin. In one such embodiment, the polymer or polymer composition is a polypropylene polymer comprising switchgrass lignin.

Clause 5: The polymer or polymer composition of any one of clause 2, 3, or 4 wherein the polymer or polymer composition is a thermoplastic.

Clause 6: The polymer or polymer composition of clause 5, wherein the thermoplastic comprises polyethylene, polypropylene, or a combination thereof.

Clause 7: The polymer or polymer composition of clause 5, wherein the thermoplastic comprises polypropylene and the grass lignin is present at a level of from 0.5 to 1.5 wt. %. In one such embodiment, the thermoplastic comprises polypropylene and the grass lignin is switchgrass lignin which is present at a level of 0.5 to 1.5 wt. %.

Clause 8: A coating composition or film comprising a grass lignin at a level of from 0.5 to 2.0 wt. %.

Clause 9: A personal care composition comprising a grass lignin at a level of from 0.5 to 2.0 wt. %.

Clause 10: A composition comprising a thermoplastic polymer and a biomass, wherein the biomass comprises a lignin, and wherein the composition comprises cellulose and/or hemicellulose in an amount no greater than 20% based on the weight of the biomass.

Clause 11: The composition of clause 10, wherein the thermoplastic polymer has a processing temperature below about 400° C.

Clause 12: The composition of clause 10, wherein the thermoplastic polymer is polyethylene, polypropylene, or a combination thereof.

Clause 13: The composition of clause 10, wherein the lignin is a hardwood lignin.

Clause 14: The composition of clause 10, wherein the lignin is a grass lignin.

Clause 15: The composition of clause 10, wherein the lignin comprises a mixture of guiaiacyl and syringly units.

Clause 16: The composition of clause 10, having an oxidation onset temperature of from about 232° C. to about 250° C.

Clause 17: The composition of clause 10, wherein the lignin has an average particle size of from about 2 micrometers to about 8 micrometers.

Clause 18: The composition of clause 10, wherein the lignin is prepared by supercritical hydrolysis.

Clause 19: The composition of clause 10, wherein the lignin is prepared by exposing a biomass to a fluid having a temperature of at from about 340° C. to about 400° C. and a pressure of from about 225 bar to about 250 bar.

Clause 20: The composition of clause 10, wherein the polymer is polypropylene and the lignin is present at a level of from about 0.5 wt % to about 1.5 wt %.

Clause 21: A coating composition or film comprising the composition of clause 10.

Clause 22: A personal care composition comprising the composition of clause 10.

Clause 23: A method of making the composition of clause 10, the method comprising the steps of: (a) obtaining the lignin by exposing a biomass to a fluid having a temperature of from about 340° C. to about 400° C. and a pressure of from about 225 bar to about 250 bar; and (b) combining the lignin with the thermoplastic polymer.

Clause 24: The method of clause 23, wherein the thermoplastic polymer has a processing temperature below about 400° C.

Clause 25: The method of clause 23, wherein the thermoplastic polymer is polyethylene, polypropylene, or a combination thereof.

Clause 26: The method of clause 23, wherein the lignin is a hardwood lignin.

Clause 27: The method of clause 23, wherein the lignin is a grass lignin.

Clause 28: The method of clause 23, wherein the composition has an oxidation onset temperature of from about 232° C. to about 250° C.

Clause 29: The method of clause 23, wherein the lignin has an average particle size of from about 2 micrometers to about 8 micrometers.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

F. EXAMPLES

1. Example 1

This Example shows the effect of switchgrass lignin as an antioxidant in polypropylene, and compares it to hardwood lignin and Kraft lignin, as well as commercially available antioxidant. All samples were assessed using ASTM 2009-02 (Standard Test Method for Oxidation Onset Temperature of Hydrocarbons by Differential Scanning calorimetry (DSC)), for which a higher Oxidation Onset Temperature (OOT) is considered to show improved stability toward oxidative degradation. All samples were prepared with polypropylene, specifically Bapolene® 4012F (Bamberger Polymer, Inc., Houston, TX, USA), which is commercially available as a compounding/extrusion grade polypropylene with a melt flow of 12.0 g/10 min (ASTM D-1238; 230 C/2,160 g). Samples were dry blended (polypropylene, lignin antioxidant or commercial antioxidant, and zinc stearate at 0.5 wt. % as a processing aid) and fed directly into a co-rotating 20 mm twin screw extruder. Samples were extruded and produced pellets, which were then cut to small discs (~2.6 mg) and then accurately weighed in preparation for the OOT test (performed in triplicate). The samples were tested by DSC in air, separately, on a Tzero Aluminum pan (TA Instruments, New Castle, DE, USA), which was equilibrated at 50° C. before increasing the temperature at a rate of 20° C./min in an air flow of 50 mL/min. Samples contained varying quantities of each test antioxidant (0, 0.1, 0.3, 0.5 or 0.6, and 1.0 wt. %) as shown in FIG. 1.

FIG. 1 shows the OOT (° C.) obtained at each antioxidant addition level for each added antioxidant. Referring to the key in FIG. 1, the antioxidants tested were:

Base—no antioxidant added (i.e., 0 wt. % antioxidant).

EBS/Omno (50%)—the added antioxidant comprised 50% ethylene bis stearamide and 50% hardwood lignin.

Irg1010/Omno (40%)—the added antioxidant comprised 60% Irganox 1010 and 40% hardwood lignin.

Irganox—the added antioxidant was Irganox 1010.

IrgB225/Omno (30%)—the added antioxidant comprised 70% Irganox B225 and 30% hardwood lignin.

Kraft—the added antioxidant was Kraft lignin.

Omno—the added antioxidant was hardwood lignin.

Switchgrass Omno—the added antioxidant was switchgrass lignin.

[Irganox 1010 is Pentaerythritol tetrakis(3-(3,5-di-tert-butyl-4-hydroxyphenyl)propionate), a sterically hindered phenol; Irganox B225=melt blend of Irganox 1010 and Irgafos 168; Irgafos 168=Tris(2,4-ditert-butylphenyl)phosphite, a phosphite stabilizer].

Both the hardwood lignin and the switchgrass lignin were pre-milled to a mean particle size of 5 micrometers diameter/largest dimension.

The data show that at a 1.0 wt. % addition level, all of the lignins show some efficacy as antioxidant stabilizers in that the OOT is elevated compared to the base case (Base: polypropylene without any antioxidant stabilizer), however, the switchgrass lignin provides significantly improved OOT compared to that of Kraft lignin and hardwood lignin, for example, at a 1.0 wt. % level, the switchgrass lignin typically raises the OOT of polypropylene from about 200° C. to about 244° C. (compared to about 230° C. for hardwood lignins and Kraft lignins, at the same level in the same polymer). Moreover, extrapolating the curves implies that the level of improvement is likely to be much greater as the levels of lignin (as antioxidant) are increased.

Commercially viable performance may be judged from the OOT achieved using Irganox 1010 at typical use levels (0.3 wt. %), and such performance should be attainable for switchgrass lignin at just slightly higher use levels. The specialty chemicals currently used in the industry are generally expensive, so a small increase in use level may not be prohibitive from the commercial standpoint.

2. Example 2

The components of Masterbatches (MBs) A-F is shown in Table 1.

TABLE 1

| MB Name | A | B | C | D | E | F |
|---|---|---|---|---|---|---|
| Omno | 100 | 50 | 40 | 30 | — | — |
| EBS | — | 50 | — | — | — | — |
| Irganox 1010 | — | — | 60 | — | — | — |
| Irganox B225 | — | — | — | 70 | — | — |
| Lignin-Kraft | — | — | — | — | 100 | — |
| Irganox 1098 | — | — | — | — | — | 100 |

The components of the exemplary compositions are shown in Table 2 (wt %) and Table 3 (grams) (Note: one pellet retains 500 g).

TABLE 2

| Identifier | RMX-AO-01 | RMX-AO-02 | RMX-AO-03 | RMX-AO-04 | RMX-AO-05 | RMX-AO-06 | RMX-AO-07 | RMX-AO-08 | RMX-AO-09 |
|---|---|---|---|---|---|---|---|---|---|
| Bapolene 4012F | 99.5% | 98.5% | 97.5% | 98.5% | 98.5% | 98.5% | 50.0% | 90.0% | 70.0% |
| Ultramid 8202 | | | | | | | | | |
| Zinc Stearate | 0.5% | 0.5% | 0.5% | 0.5% | 0.5% | 0.5% | | | |
| A | | 1.0% | | | | | | | |
| B | | | 2.0% | | | | | | |
| C | | | | 1.0% | | | | | |
| D | | | | | 1.0% | | | | |
| E | | | | | | 1.0% | | | |
| F | | | | | | | | | |
| RMX-AO-01 | | | | | | | 50.0% | | |
| RMX-AO-02 | | | | | | | | 10.0% | 30.0% |
| RMX-AO-03 | | | | | | | | | |
| RMX-AO-04 | | | | | | | | | |
| RMX-AO-05 | | | | | | | | | |
| RMX-AO-06 | | | | | | | | | |
| RMX-AO-23 | | | | | | | | | |
| RMX-AO-24 | | | | | | | | | |
| OOT (° C.) | 203 | 229 | 219 | 256 | 253 | 232 | 198 | 214 | |

| Identifier | RMX-AO-09 | RMX-AO-10 | RMX-AO-11 | RMX-AO-12 | RMX-AO-13 | RMX-AO-14 | RMX-AO-15 | RMX-AO-16 |
|---|---|---|---|---|---|---|---|---|
| Bapolene 4012F | 70.0% | 50.0% | 90.0% | 70.0% | 50.0% | 90.0% | 70.0% | 50.0% |
| Ultramid 8202 | | | | | | | | |
| Zinc Stearate | | | | | | | | |
| A | | | | | | | | |
| B | | | | | | | | |
| C | | | | | | | | |
| D | | | | | | | | |
| E | | | | | | | | |
| F | | | | | | | | |
| RMX-AO-01 | | | | | | | | |
| RMX-AO-02 | 30.0% | 50.0% | | | | | | |
| RMX-AO-03 | | | 10.0% | 30.0% | 50.0% | | | |
| RMX-AO-04 | | | | | | 10.0% | 30.0% | 50.0% |
| RMX-AO-05 | | | | | | | | |
| RMX-AO-06 | | | | | | | | |
| RMX-AO-23 | | | | | | | | |
| RMX-AO-24 | | | | | | | | |
| OOT (° C.) | 217 | 219 | 217 | 212 | 214 | 229 | 242 | 245 |

| Identifier | RMX-AO-17 | RMX-AO-18 | RMX-AO-19 | RMX-AO-20 | RMX-AO-21 | RMX-AO-22 | RMX-AO-23 | RMX-AO-24 |
|---|---|---|---|---|---|---|---|---|
| Bapolene 4012F | 90.0% | 70.0% | 50.0% | 90.0% | 70.0% | 50.0% | | |
| Ultramid 8202 | | | | | | | 98.5% | 98.5% |
| Zinc Stearate | | | | | | | 0.5% | 0.5% |
| A | | | | | | | 1.0% | |
| B | | | | | | | | |
| C | | | | | | | | |
| D | | | | | | | | |
| E | | | | | | | | |
| F | | | | | | | | 1.0% |
| RMX-AO-01 | | | | | | | | |
| RMX-AO-02 | | | | | | | | |
| RMX-AO-03 | | | | | | | | |
| RMX-AO-04 | | | | | | | | |
| RMX-AO-05 | 10.0% | 30.0% | 50.0% | | | | | |
| RMX-AO-06 | | | | 10.0% | 30.0% | 50.0% | | |
| RMX-AO-23 | | | | | | | | |

TABLE 2-continued

| RMX-AO-24 | | | | | | | | |
|---|---|---|---|---|---|---|---|---|
| OOT (° C.) | 226 | 235 | 247 | 222 | 226 | 221 | 353 | 341 |

| Identifier | RMX-AO-25 | RMX-AO-26 | RMX-AO-27 | RMX-AO-28 |
|---|---|---|---|---|
| Bapolene 4012F | | | | |
| Ultramid 8202 | 90.0% | 70.0% | 50.0% | 70.0% |
| Zinc Stearate | | | | |
| A | | | | |
| B | | | | |
| C | | | | |
| D | | | | |
| E | | | | |
| F | | | | |
| RMX-AO-01 | | | | |
| RMX-AO-02 | | | | |
| RMX-AO-03 | | | | |
| RMX-AO-04 | | | | |
| RMX-AO-05 | | | | |
| RMX-AO-06 | | | | |
| RMX-AO-23 | 10.0% | 30.0% | 50.0% | |
| RMX-AO-24 | | | | 30.0% |
| OOT (° C.) | 338 | 336 | 347 | |

TABLE 3

| | Batch Size (g) | | | | | | | |
|---|---|---|---|---|---|---|---|---|
| | 3,000 | 5,000 | 5,000 | 5,000 | 5,000 | 5,000 | 5,000 | 5,000 |
| | Identifier | | | | | | | |
| | RMX-AO-01 | RMX-AO-02 | RMX-AO-03 | RMX-AO-04 | RMX-AO-05 | RMX-AO-06 | RMX-AO-07 | RMX-AO-08 |
| Bapolene 4012F | 2,985 | 4,925 | 4,875 | 4,925 | 4,925 | 4,925 | 2,500 | 4,500 |
| Ultramid 8202 | 0 | 0 | 0 | 0 | 0 | 0 | 0 | 0 |
| Zinc Stearate | 15 | 25 | 25 | 25 | 25 | 25 | 0 | 0 |
| A | 0 | 50 | 0 | 0 | 0 | 0 | 0 | 0 |
| B | 0 | 0 | 100 | 0 | 0 | 0 | 0 | 0 |
| C | 0 | 0 | 0 | 50 | 0 | 0 | 0 | 0 |
| D | 0 | 0 | 0 | 0 | 50 | 0 | 0 | 0 |
| E | 0 | 0 | 0 | 0 | 0 | 50 | 0 | 0 |
| F | 0 | 0 | 0 | 0 | 0 | 0 | 0 | 0 |
| RMX-AO-01 | 0 | 0 | 0 | 0 | 0 | 0 | 2,500 | 0 |
| RMX-AO-02 | 0 | 0 | 0 | 0 | 0 | 0 | 0 | 500 |
| RMX-AO-03 | 0 | 0 | 0 | 0 | 0 | 0 | 0 | 0 |
| RMX-AO-04 | 0 | 0 | 0 | 0 | 0 | 0 | 0 | 0 |
| RMX-AO-05 | 0 | 0 | 0 | 0 | 0 | 0 | 0 | 0 |
| RMX-AO-06 | 0 | 0 | 0 | 0 | 0 | 0 | 0 | 0 |
| RMX-AO-23 | 0 | 0 | 0 | 0 | 0 | 0 | 0 | 0 |
| RMX-AO-24 | 0 | 0 | 0 | 0 | 0 | 0 | 0 | 0 |

| | Batch Size (g) | | | | | | | |
|---|---|---|---|---|---|---|---|---|
| | 3,000 | 5,000 | 5,000 | 5,000 | 5,000 | 5,000 | 5,000 | 5,000 |
| | Identifier | | | | | | | |
| | RMX-AO-01 | RMX-AO-02 | RMX-AO-03 | RMX-AO-04 | RMX-AO-05 | RMX-AO-06 | RMX-AO-07 | RMX-AO-08 |
| Bapolene 4012F | 2,985 | 4,925 | 4,875 | 4,925 | 4,925 | 4,925 | 2,500 | 4,500 |
| Ultramid 8202 | 0 | 0 | 0 | 0 | 0 | 0 | 0 | 0 |
| Zinc Stearate | 15 | 25 | 25 | 25 | 25 | 25 | 0 | 0 |
| A | 0 | 50 | 0 | 0 | 0 | 0 | 0 | 0 |
| B | 0 | 0 | 100 | 0 | 0 | 0 | 0 | 0 |
| C | 0 | 0 | 0 | 50 | 0 | 0 | 0 | 0 |
| D | 0 | 0 | 0 | 0 | 50 | 0 | 0 | 0 |
| E | 0 | 0 | 0 | 0 | 0 | 50 | 0 | 0 |
| F | 0 | 0 | 0 | 0 | 0 | 0 | 0 | 0 |
| RMX-AO-01 | 0 | 0 | 0 | 0 | 0 | 0 | 2,500 | 0 |
| RMX-AO-02 | 0 | 0 | 0 | 0 | 0 | 0 | 0 | 500 |
| RMX-AO-03 | 0 | 0 | 0 | 0 | 0 | 0 | 0 | 0 |
| RMX-AO-04 | 0 | 0 | 0 | 0 | 0 | 0 | 0 | 0 |
| RMX-AO-05 | 0 | 0 | 0 | 0 | 0 | 0 | 0 | 0 |

TABLE 3-continued

| | | | | | | | | |
|---|---|---|---|---|---|---|---|---|
| RMX-AO-06 | 0 | 0 | 0 | 0 | 0 | 0 | 0 | 0 |
| RMX-AO-23 | 0 | 0 | 0 | 0 | 0 | 0 | 0 | 0 |
| RMX-AO-24 | 0 | 0 | 0 | 0 | 0 | 0 | 0 | 0 |

| Batch Size (g) | | | | | | | | |
|---|---|---|---|---|---|---|---|---|
| | 3,000 | 5,000 | 5,000 | 5,000 | 5,000 | 5,000 | 5,000 | 5,000 |
| Identifier | | | | | | | | |
| | RMX-AO-01 | RMX-AO-02 | RMX-AO-03 | RMX-AO-04 | RMX-AO-05 | RMX-AO-06 | RMX-AO-07 | RMX-AO-08 |
| Bapolene 4012F | 2,985 | 4,925 | 4,875 | 4,925 | 4,925 | 4,925 | 2,500 | 4,500 |
| Ultramid 8202 | 0 | 0 | 0 | 0 | 0 | 0 | 0 | 0 |
| Zinc Stearate | 15 | 25 | 25 | 25 | 25 | 25 | 0 | 0 |
| A | 0 | 50 | 0 | 0 | 0 | 0 | 0 | 0 |
| B | 0 | 0 | 100 | 0 | 0 | 0 | 0 | 0 |
| C | 0 | 0 | 0 | 50 | 0 | 0 | 0 | 0 |
| D | 0 | 0 | 0 | 0 | 50 | 0 | 0 | 0 |
| E | 0 | 0 | 0 | 0 | 0 | 50 | 0 | 0 |
| F | 0 | 0 | 0 | 0 | 0 | 0 | 0 | 0 |
| RMX-AO-01 | 0 | 0 | 0 | 0 | 0 | 0 | 2,500 | 0 |
| RMX-AO-02 | 0 | 0 | 0 | 0 | 0 | 0 | 0 | 500 |
| RMX-AO-03 | 0 | 0 | 0 | 0 | 0 | 0 | 0 | 0 |
| RMX-AO-04 | 0 | 0 | 0 | 0 | 0 | 0 | 0 | 0 |
| RMX-AO-05 | 0 | 0 | 0 | 0 | 0 | 0 | 0 | 0 |
| RMX-AO-06 | 0 | 0 | 0 | 0 | 0 | 0 | 0 | 0 |
| RMX-AO-23 | 0 | 0 | 0 | 0 | 0 | 0 | 0 | 0 |
| RMX-AO-24 | 0 | 0 | 0 | 0 | 0 | 0 | 0 | 0 |

| Batch Size (g) | | | | | | | | |
|---|---|---|---|---|---|---|---|---|
| | 3,000 | 5,000 | 5,000 | 5,000 | 5,000 | 5,000 | 5,000 | 5,000 |
| Identifier | | | | | | | | |
| | RMX-AO-01 | RMX-AO-02 | RMX-AO-03 | RMX-AO-04 | RMX-AO-05 | RMX-AO-06 | RMX-AO-07 | RMX-AO-08 |
| Bapolene 4012F | 2,985 | 4,925 | 4,875 | 4,925 | 4,925 | 4,925 | 2,500 | 4,500 |
| Ultramid 8202 | 0 | 0 | 0 | 0 | 0 | 0 | 0 | 0 |
| Zinc Stearate | 15 | 25 | 25 | 25 | 25 | 25 | 0 | 0 |
| A | 0 | 50 | 0 | 0 | 0 | 0 | 0 | 0 |
| B | 0 | 0 | 100 | 0 | 0 | 0 | 0 | 0 |
| C | 0 | 0 | 0 | 50 | 0 | 0 | 0 | 0 |
| D | 0 | 0 | 0 | 0 | 50 | 0 | 0 | 0 |
| E | 0 | 0 | 0 | 0 | 0 | 50 | 0 | 0 |
| F | 0 | 0 | 0 | 0 | 0 | 0 | 0 | 0 |
| RMX-AO-01 | 0 | 0 | 0 | 0 | 0 | 0 | 2,500 | 0 |
| RMX-AO-02 | 0 | 0 | 0 | 0 | 0 | 0 | 0 | 500 |
| RMX-AO-03 | 0 | 0 | 0 | 0 | 0 | 0 | 0 | 0 |
| RMX-AO-04 | 0 | 0 | 0 | 0 | 0 | 0 | 0 | 0 |
| RMX-AO-05 | 0 | 0 | 0 | 0 | 0 | 0 | 0 | 0 |
| RMX-AO-06 | 0 | 0 | 0 | 0 | 0 | 0 | 0 | 0 |
| RMX-AO-23 | 0 | 0 | 0 | 0 | 0 | 0 | 0 | 0 |
| RMX-AO-24 | 0 | 0 | 0 | 0 | 0 | 0 | 0 | 0 |

The total amount of each component used (in grams) is shown in Table 4.

TABLE 4

| Identifier | Grams |
|---|---|
| Bapolene 4012F | 82,560 |
| Ultramid 8202 | 20,895 |
| Zinc Stearate | 175 |
| A | 100 |
| B | 100 |
| C | 50 |
| D | 50 |
| E | 50 |
| F | 20 |
| RMX-AO-01 | 2,500 |
| RMX-AO-02 | 4,500 |
| RMX-AO-03 | 4,500 |
| RMX-AO-04 | 4,500 |
| RMX-AO-05 | 4,500 |
| RMX-AO-06 | 4,500 |
| RMX-AO-23 | 4,500 |
| RMX-AO-24 | 1,500 |

3. Example 3

The components of the exemplary compositions are shown in Table 5 (wt %) and Table 6 (grams) (Note: one pellet retains 500 g).

TABLE 5

| Identifier | RMX-AO-29 | RMX-AO-30 | RMX-AO-31 | RMX-AO-32 | RMX-AO-33 |
|---|---|---|---|---|---|
| Bapolene 4012F | 98.5% | 90.0% | 70.0% | 50.0% | 99.2% |
| Irganox 1010 | | | | | 0.3% |
| Zinc Stearate | 0.5% | | | | 0.5% |
| LC-061617-TTG_HighCarbSw | 1.0% | | | | |
| RMX-AO-29 | | 10% | 30% | 50% | |

TABLE 6

| | Batch Size (g) | | | | |
|---|---|---|---|---|---|
| Identifier | 5,000 RMX-AO-29 | 5,000 RMX-AO-30 | 5,000 RMX-AO-31 | 5,000 RMX-AO-32 | 5,000 RMX-AO-33 |
| Bapolene 4012F | 4,925 | 4,500 | 3,500 | 2,500 | 4,960 |
| Irganox 1010 | 0 | 0 | 0 | 0 | 15 |
| Zinc Stearate | 25 | 0 | 0 | 0 | 25 |
| LC-061617-TTG_HighCarbSw | 50 | 0 | 0 | 0 | 0 |
| RMX-AO-29 | 0 | 500 | 1,500 | 2,500 | 0 |
| OOT | 244 | 212 | 219 | 234 | 256 |

The total amount of each component used (in grams) is shown in Table 7.

TABLE 7

| Identifier | Grams |
|---|---|
| Bapolene 4012F | 20,385 |
| Irganox 1010 | 15 |
| Zinc Stearate | 50 |
| LC-061617-TTG_HighCarbSw | 50 |
| RMX-AO-29 | 4,500 |

The oxidation onset temperature of the compositions of Example 3 is shown in Table 8 (~2.5 mg sample; air, 50 mL/min, ramp 20° C. per minute up to 310° C.).

TABLE 8

| | OMNO load | Oxidation Onset Temperature (° C.) | | | | |
|---|---|---|---|---|---|---|
| Sample ID | % wt | 1 | 2 | 3 | average | stdev |
| RMXAO29 | 1.0 | 244 | 243 | 246 | 244 | 1.5 |
| RMXAO32 | 0.50 | 234 | 234 | 234 | 234 | 0.0 |
| RMXAO31 | 0.30 | 220 | 218 | 219 | 219 | 1.0 |
| RMXAO30 | 0.10 | 210 | 214 | 211 | 212 | 2.1 |
| RMXAO33 | Irganox | 258 | 260 | | 259 | 1.4 |
| RMXAO33-2 | Irganox | 255 | 255 | 254 | 255 | 0.6 |

4. Example 4

Figure 2:
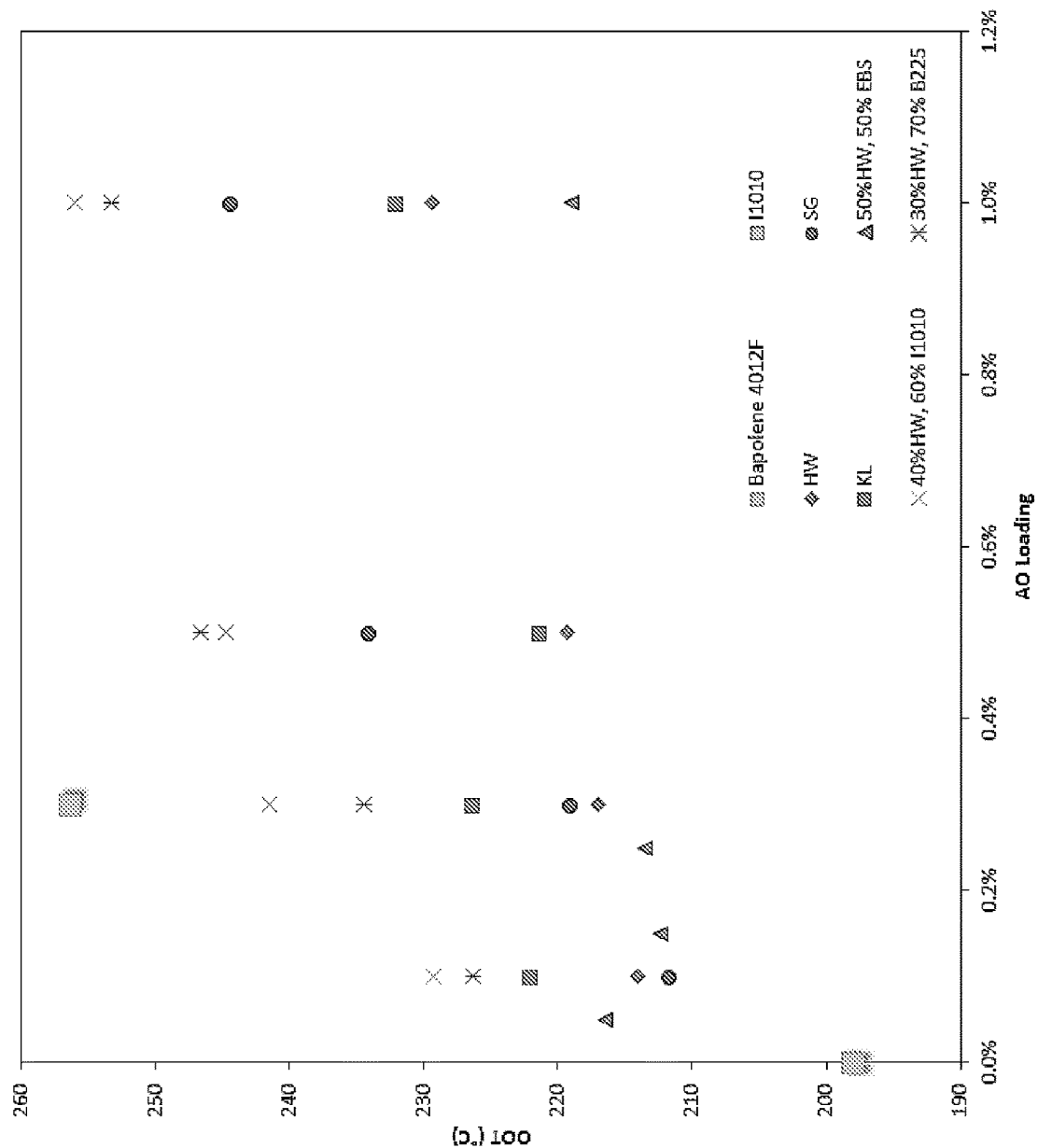
FIG. 2 shows a representative summary of the Oxidation Onset Temperature of exemplary compositions.

A summary of the Oxidation Onset Temperature (OOT) of the exemplary compositions is shown in Table 9 and FIG. 2.

TABLE 9

| Identifier | Resin | AO Package | AO Loading | OOT 1 | 2 | 3 | 4 | 5 | Avg. | StDev. |
|---|---|---|---|---|---|---|---|---|---|---|
| RMX-AO-01 | Bapolene 4012F | N/A | N/A | 202 | 203 | | | | 203 | 0.71 |
| RMX-AO-02 | Bapolene 4012F | HW | 1.0% | 227 | 230 | 229 | 228 | 233 | 229 | 2.30 |
| RMX-AO-03 | Bapolene 4012F | 50% HW, 50% EBS | 1.0% | 220 | 222 | 215 | 219 | | 219 | 2.94 |
| RMX-AO-04 | Bapolene 4012F | 40% HW, 60% I1010 | 1.0% | 258 | 258 | 252 | | | 256 | 3.46 |
| RMX-AO-05 | Bapolene 4012F | 30% HW, 70% B225 | 1.0% | 249 | 255 | 256 | | | 253 | 3.79 |
| RMX-AO-06 | Bapolene 4012F | KL | 1.0% | 234 | 230 | | | | 232 | 2.83 |
| RMX-AO-07 | Bapolene 4012F | N/A | N/A | 197 | 199 | | | | 198 | 1.41 |
| RMX-AO-08 | Bapolene 4012F | HW | 0.1% | 215 | 213 | | | | 214 | 1.41 |

TABLE 9-continued

| Identifier | Resin | AO Package | AO Loading | OOT 1 | 2 | 3 | 4 | 5 | Avg. | StDev. |
|---|---|---|---|---|---|---|---|---|---|---|
| RMX-AO-09 | Bapolene 4012F | HW | 0.3% | 219 | 219 | 213 | | | 217 | 3.46 |
| RMX-AO-10 | Bapolene 4012F | HW | 0.5% | 219 | 220 | 219 | | | 219 | 0.58 |
| RMX-AO-11 | Bapolene 4012F | 50% HW, 50% EBS | 0.05% | 217 | 215 | 217 | 217 | | 217 | 1.00 |
| RMX-AO-12 | Bapolene 4012F | 50% HW, 50% EBS | 0.15% | 214 | 213 | 210 | | | 212 | 2.08 |
| RMX-AO-13 | Bapolene 4012F | 50% HW, 50% EBS | 0.25% | 213 | 214 | | | | 214 | 0.71 |
| RMX-AO-14 | Bapolene 4012F | 40% HW, 60% I1010 | 0.1% | 227 | 231 | 230 | | | 229 | 2.08 |
| RMX-AO-15 | Bapolene 4012F | 40% HW, 60% I1010 | 0.3% | 242 | 239 | 242 | 243 | | 242 | 1.73 |
| RMX-AO-16 | Bapolene 4012F | 40% HW, 60% I1010 | 0.5% | 248 | 239 | 246 | 246 | | 245 | 3.95 |
| RMX-AO-17 | Bapolene 4012F | 30% HW, 70% B225 | 0.1% | 227 | 222 | 230 | | | 226 | 4.04 |
| RMX-AO-18 | Bapolene 4012F | 30% HW, 70% B225 | 0.3% | 239 | 233 | 232 | 234 | | 235 | 3.11 |
| RMX-AO-19 | Bapolene 4012F | 30% HW, 70% B225 | 0.5% | 250 | 244 | 246 | | | 247 | 3.06 |
| RMX-AO-20 | Bapolene 4012F | KL | 0.1% | 221 | 222 | 223 | | | 222 | 1.00 |
| RMX-AO-21 | Bapolene 4012F | KL | 0.3% | 228 | 224 | 227 | | | 226 | 2.08 |
| RMX-AO-22 | Bapolene 4012F | KL | 0.5% | 219 | 220 | 225 | | | 221 | 3.21 |
| RMX-AO-23 | Ultramid 8202 | HW | 1.0% | 351 | 353 | 354 | | | 353 | 1.53 |
| RMX-AO-24 | Ultramid 8202 | I1098 | 1.0% | 344 | 338 | 341 | | | 341 | 3.00 |
| RMX-AO-25 | Ultramid 8202 | HW | 0.1% | 339 | 337 | 337 | | | 338 | 1.15 |
| RMX-AO-26 | Ultramid 8202 | HW | 0.3% | 337 | 334 | | | | 336 | 2.12 |
| RMX-AO-27 | Ultramid 8202 | HW | 0.5% | 348 | 346 | | | | 347 | 1.41 |
| RMX-AO-28 | Ultramid 8202 | I1098 | 0.3% | | | | | | — | — |
| RMX-AO-29 | Bapolene 4012F | SG | 1.0% | 244 | 243 | 246 | | | 244 | 1.53 |
| RMX-AO-30 | Bapolene 4012F | SG | 0.1% | 210 | 214 | 211 | | | 212 | 2.08 |
| RMX-AO-31 | Bapolene 4012F | SG | 0.3% | 220 | 218 | 219 | | | 219 | 1.00 |
| RMX-AO-32 | Bapolene 4012F | SG | 0.5% | 234 | 234 | 234 | | | 234 | 0.00 |
| RMX-AO-33 | Bapolene 4012F | I1010 | 0.3% | 258 | 260 | 255 | 255 | 254 | 256 | 2.51 |

5. Example 5

Figure 3A:
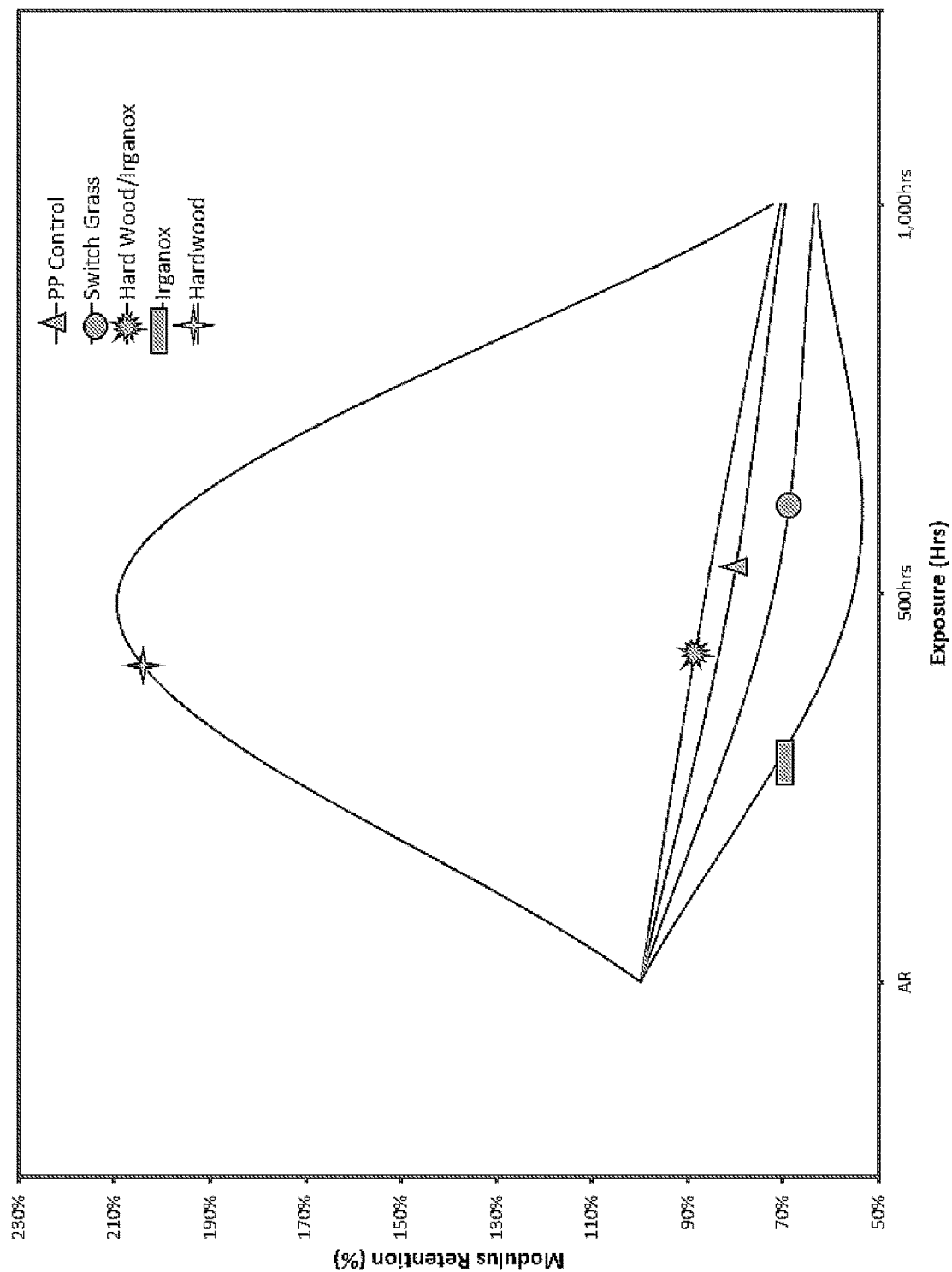
FIG. 3A and FIG. 3B show representative results of UV testing on exemplary compositions.
Figure 3B:
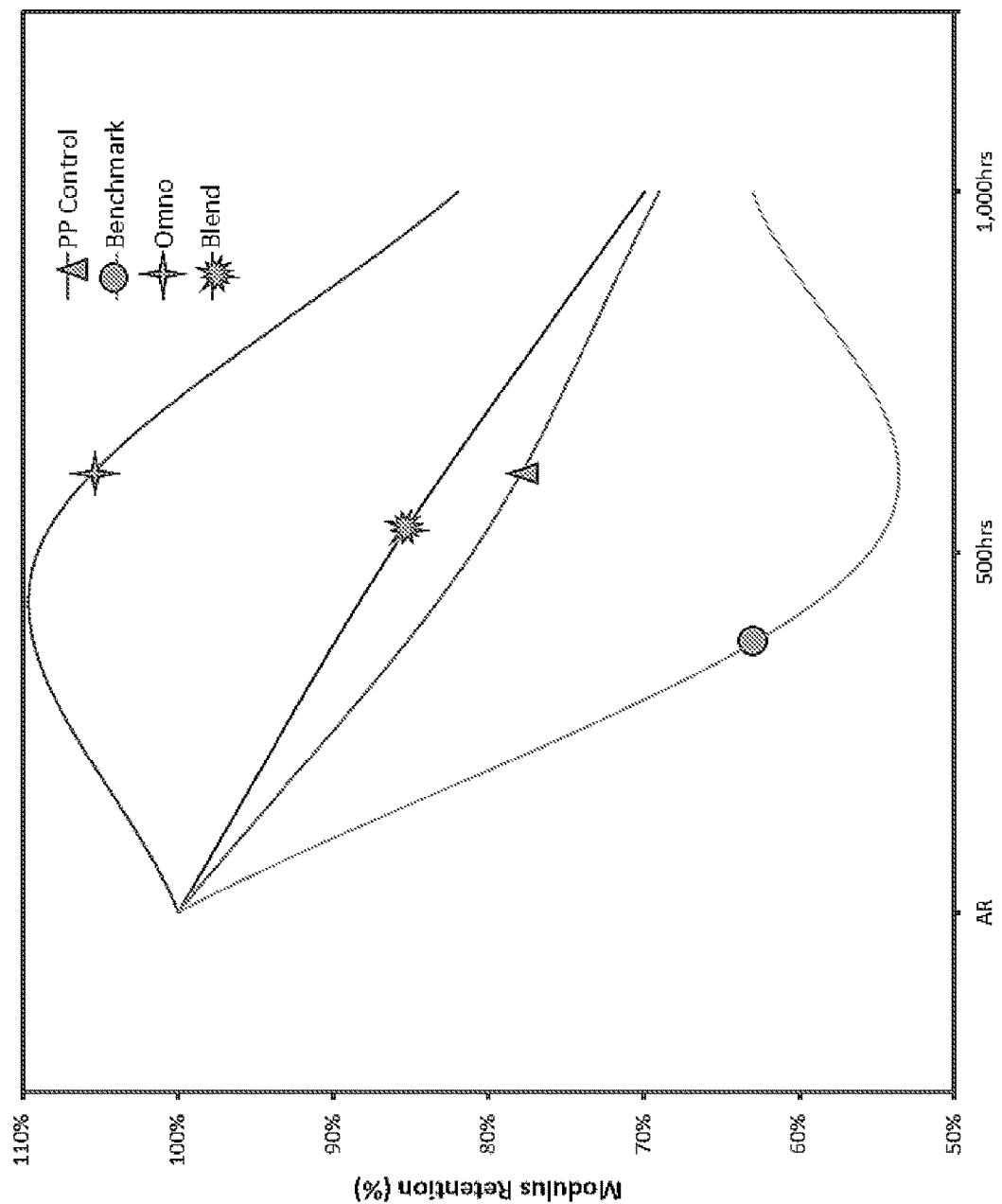

The results of UV testing on the exemplary compositions is shown in Tables 10 and 11 and FIG. 3A and FIG. 3B.

TABLE 10

| | | Specimen | | | | | Avg. | StDev | Speed | Type |
|---|---|---|---|---|---|---|---|---|---|---|
| | | 1 | 2 | 3 | 4 | 5 | | | | |
| AR | RMX-AO-07 | 31.48 | 30.35 | 30.39 | 31.00 | 29.91 | 30.63 | 0.62 | 10 mm/min | ISO 1B |
| | RMX-AO-31 | 32.07 | 31.83 | 31.24 | 30.69 | 31.34 | 31.43 | 0.54 | 5 mm/min | ASTM I |
| | RMX-AO-15 | 30.25 | 30.37 | 30.19 | 29.86 | 30.11 | 30.16 | 0.19 | 10 mm/min | ISO 1B |
| | RMX-AO-33 | 35.24 | 35.68 | 35.62 | 35.20 | 35.31 | 35.41 | 0.22 | 50 mm/min | ASTM I |
| | RMX-AO-09 | 30.68 | 30.23 | 30.92 | 30.44 | 31.04 | 30.66 | 0.33 | 10 mm/min | ISO 1B |
| 500 hrs | RMX-AO-07 | 25.02 | 24.64 | 24.62 | 24.73 | 24.90 | 24.78 | 0.17 | 5 mm/min | ISO 1B |
| | RMX-AO-31 | 22.45 | 22.44 | 22.99 | 22.18 | 23.02 | 22.62 | 0.37 | 5 mm/min | ASTM I |
| | RMX-AO-15 | 27.55 | 22.51 | 26.94 | 26.79 | 26.28 | 26.01 | 2.01 | 10 mm/min | ISO 1B |
| | RMX-AO-33 | 23.88 | 16.96 | 20.04 | 19.18 | 17.97 | 19.61 | 2.66 | 50 mm/min | ASTM I |
| | RMX-AO-09 | 67.89 | 51.81 | 73.20 | 57.91 | 69.90 | 64.14 | 8.95 | 10 mm/min | ISO 1B |
| 1,000 hrs | RMX-AO-07 | 21.55 | 20.44 | 21.61 | 21.75 | 20.92 | 21.25 | 0.56 | 10 mm/min | ISO 1B |
| | RMX-AO-31 | 22.30 | 18.75 | 20.12 | 20.05 | 18.44 | 19.93 | 1.52 | 5 mm/min | ASTM I |
| | RMX-AO-15 | 21.89 | 21.00 | 21.44 | 20.97 | 20.90 | 21.24 | 0.42 | 10 mm/min | ISO 1B |
| | RMX-AO-33 | 21.63 | 21.94 | 22.51 | 22.44 | 22.86 | 22.28 | 0.49 | 50 mm/min | ASTM I |
| | RMX-AO-09 | 22.51 | 22.22 | 21.63 | 22.79 | 21.44 | 22.12 | 0.57 | 10 mm/min | ISO 1B |

| | | Lignin | Qty (wt %) | Retention (Relative) | Retention (Neat PP) |
|---|---|---|---|---|---|
| As Received (AR) | RMX-AO-07 | N/A | N/A | 100.00% | 100.00% |
| | RMX-AO-31 | SG | 0.3% | 100.00% | — |
| | RMX-AO-15 | 40% HW, 60% I1010 | 0.3% | 100.00% | — |
| | RMX-AO-33 | I1010 | 0.3% | 100.00% | — |
| | RMX-AO-09 | HW | 0.3% | 100.00% | — |
| 500 hrs | RMX-AO-07 | N/A | N/A | 80.92% | 80.92% |
| | RMX-AO-31 | SG | 0.3% | 71.95% | 73.85% |
| | RMX-AO-15 | 40% HW, 60% I1010 | 0.3% | 86.26% | 84.94% |
| | RMX-AO-33 | I1010 | 0.3% | 55.37% | 64.02% |
| | RMX-AO-09 | HW | 0.3% | 209.19% | 209.44% |
| 1,000 hrs | RMX-AO-07 | N/A | N/A | 69.40% | 69.40% |
| | RMX-AO-31 | SG | 0.3% | 63.41% | 65.08% |
| | RMX-AO-15 | 40% HW, 60% I1010 | 0.3% | 70.43% | 69.35% |
| | RMX-AO-33 | I1010 | 0.3% | 62.91% | 72.74% |
| | RMX-AO-09 | HW | 0.3% | 72.13% | 72.22% |

TABLE 11

|  | PP Control | Benchmark | Omno | Blend |
|---|---|---|---|---|
| AR | 100% | 100% | 100% | 100% |
| 500 hrs | 81% | 55.40% | 109% | 86.30% |
| 1,000 hrs | 69% | 63% | 82% | 70% |

6. Example 6

Figure 4A:
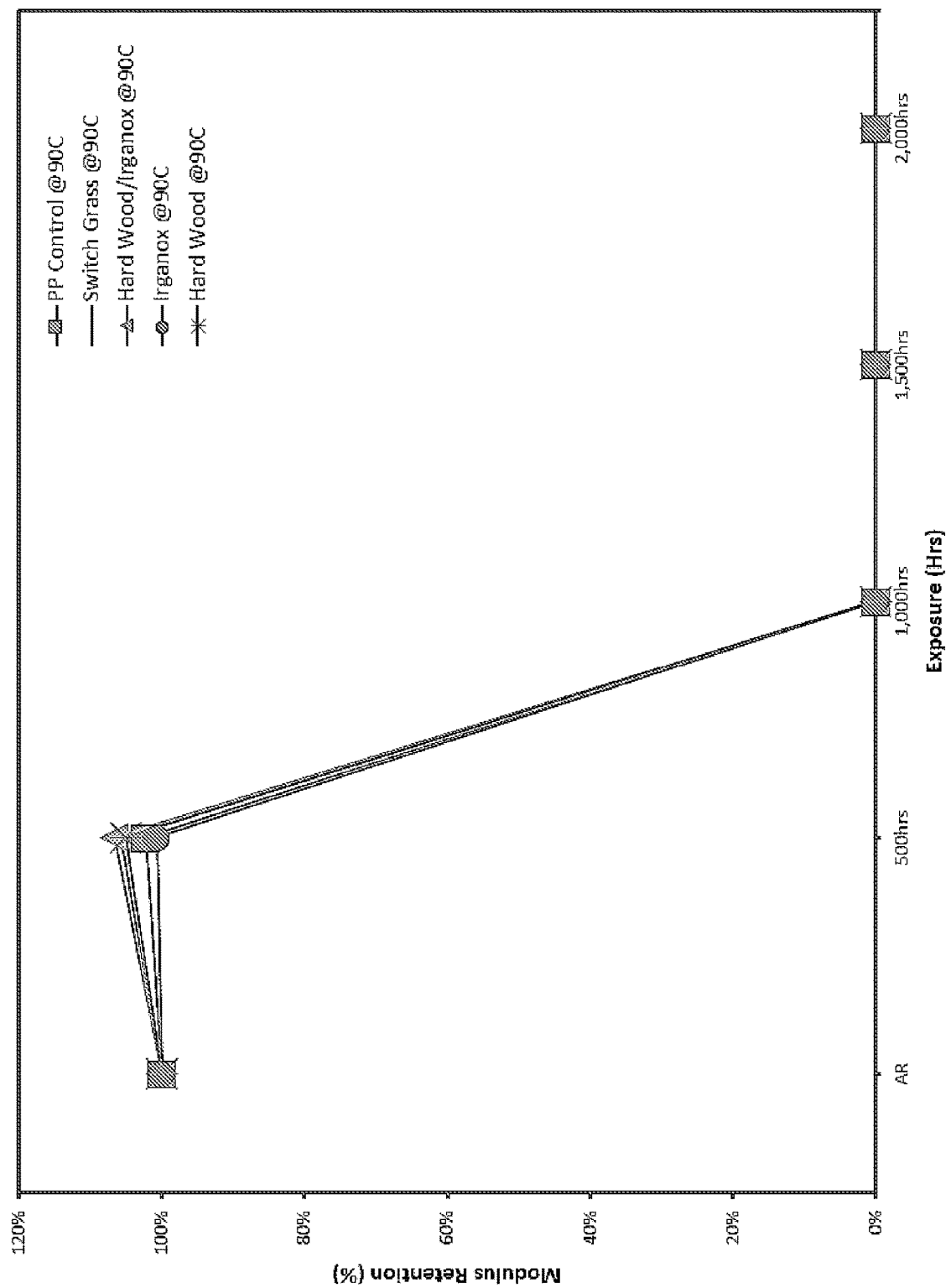
FIGS. 4A-C show representative results of heat testing on exemplary compositions.
Figure 4B:
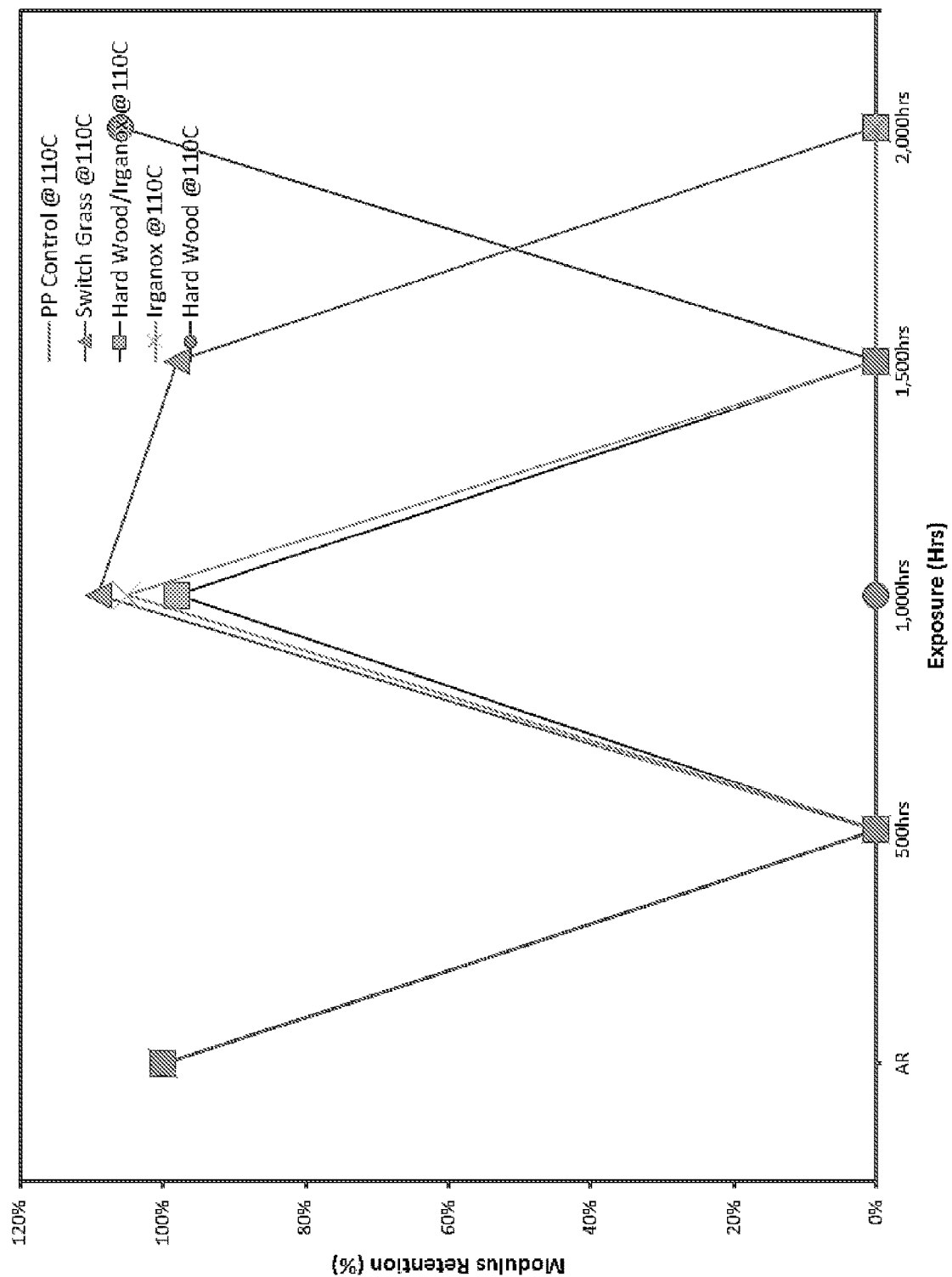
Figure 4C:
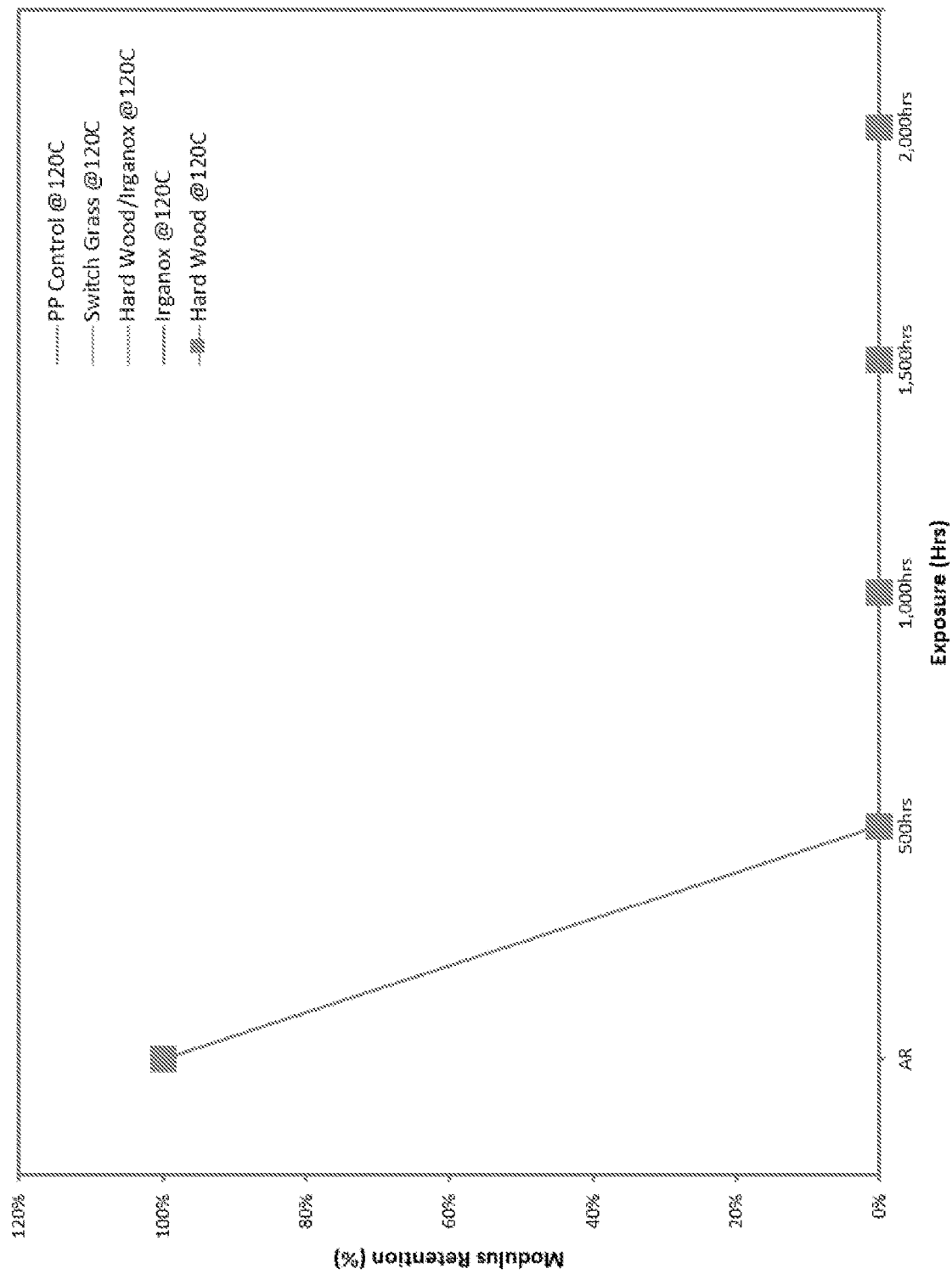

The results of heat testing on the exemplary compositions is shown in Tables 12-14 and FIGS. 4A-C.

TABLE 12

|  |  | Specimen | | | | | Avg. | StDev | Speed | Type |
|---|---|---|---|---|---|---|---|---|---|---|
|  |  | 1 | 2 | 3 | 4 | 5 |  |  |  |  |
| AR | RMX-AO-07 | 31.48 | 30.35 | 30.39 | 31.00 | 29.91 | 30.63 | 0.62 | 10 mm/min | ISO 1B |
|  | RMX-AO-31 | 32.07 | 31.83 | 31.24 | 30.69 | 31.34 | 31.43 | 0.54 | 5 mm/min | ASTM I |
|  | RMX-AO-15 | 30.25 | 30.37 | 30.19 | 29.86 | 30.11 | 30.16 | 0.19 | 10 mm/min | ISO 1B |
|  | RMX-AO-33 | 35.24 | 35.68 | 35.62 | 35.20 | 35.31 | 35.41 | 0.22 | 50 mm/min | ASTM I |
|  | RMX-AO-09 | 30.68 | 30.23 | 30.92 | 30.44 | 31.04 | 30.66 | 0.33 | 10 mm/min | ISO 1B |
| 590 hrs @ 90° C. | RMX-AO-07 | 30.69 | 31.91 |  |  |  | 31.30 | 0.86 | 10 mm/min | ISO 1B |
|  | RMX-AO-31 | 32.92 | 33.58 |  |  |  | 33.25 | 0.47 |  | ASTM I |
|  | RMX-AO-15 | 32.05 | 32.25 |  |  |  | 32.15 | 0.14 | 10 mm/min | ISO 1B |
|  | RMX-AO-33 | 35.06 | 36.22 |  |  |  | 35.64 | 0.82 | 50 mm/min | ASTM I |
|  | RMX-AO-09 | 32.54 | 31.86 |  |  |  | 32.20 | 0.48 | 10 mm/min | ISO 1B |
| 1,512 hrs @ 90° C. | RMX-AO-07 |  |  |  |  |  | — | — |  | ISO 1B |
|  | RMX-AO-31 |  |  |  |  |  | — | — |  | ASTM I |
|  | RMX-AO-15 |  |  |  |  |  | — | — |  | ISO 1B |
|  | RMX-AO-33 |  |  |  |  |  | — | — |  | ASTM I |
|  | RMX-AO-09 |  |  |  |  |  | — | — |  | ISO 1B |
| 2,300 hrs @ 90° C. | RMX-AO-07 |  |  |  |  |  | — | — |  | ISO 1B |
|  | RMX-AO-31 |  |  |  |  |  | — | — |  | ASTM I |
|  | RMX-AO-15 |  |  |  |  |  | — | — |  | ISO 1B |
|  | RMX-AO-33 |  |  |  |  |  | — | — |  | ASTM I |
|  | RMX-AO-09 |  |  |  |  |  | — | — |  | ISO 1B |

|  |  | Lignin | Qty (wt %) | Retention (Relative) | Retention (Neat PP) |
|---|---|---|---|---|---|
| AR | RMX-AO-07 | N/A | N/A | 100.00% | 100.00% |
|  | RMX-AO-31 | SG | 0.3% | 100.00% | — |
|  | RMX-AO-15 | 40% HW, 60% I1010 | 0.3% | 100.00% | — |
|  | RMX-AO-33 | I1010 | 0.3% | 100.00% | — |
|  | RMX-AO-09 | HW | 0.3% | 100.00% | — |

TABLE 12-continued

| | | | | | |
|---|---|---|---|---|---|
| 590 hrs @ 90° C. | RMX-AO-07 | N/A | N/A | 102.20% | 102.20% |
| | RMX-AO-31 | SG | 0.3% | 105.78% | 108.57% |
| | RMX-AO-15 | 40% HW, 60% I1010 | 0.3% | 106.61% | 104.98% |
| | RMX-AO-33 | I1010 | 0.3% | 100.65% | 116.37% |
| | RMX-AO-09 | HW | 0.3% | 105.02% | 105.14% |
| 1,512 hrs @ 90° C. | RMX-AO-07 | N/A | N/A | — | — |
| | RMX-AO-31 | SG | 0.3% | — | — |
| | RMX-AO-15 | 40% HW, 60% I1010 | 0.3% | — | — |
| | RMX-AO-33 | I1010 | 0.3% | — | — |
| | RMX-AO-09 | HW | 0.3% | — | — |
| 2,300 hrs @ 90° C. | RMX-AO-07 | N/A | N/A | — | — |
| | RMX-AO-31 | SG | 0.3% | — | — |
| | RMX-AO-15 | 40% HW, 60% I1010 | 0.3% | — | — |
| | RMX-AO-33 | I1010 | 0.3% | — | — |
| | RMX-AO-09 | HW | 0.3% | — | — |
| 2,000 hrs @ 90° C. | RMX-AO-07 | N/A | N/A | — | — |
| | RMX-AO-31 | SG | 0.3% | — | — |
| | RMX-AO-15 | 40% HW, 60% I1010 | 0.3% | — | — |
| | RMX-AO-33 | I1010 | 0.3% | — | — |
| | RMX-AO-09 | HW | 0.3% | — | — |

"—" = no property loss observed

TABLE 13

| | | Specimen | | | | | | | | |
|---|---|---|---|---|---|---|---|---|---|---|
| | | 1 | 2 | 3 | 4 | 5 | Avg. | StDev | Speed | Type |
| AR | RMX-AO-07 | 31.48 | 30.35 | 30.39 | 31.00 | 29.91 | 30.63 | 0.62 | 10 mm/min | ISO 1B |
| | RMX-AO-31 | 32.07 | 31.83 | 31.24 | 30.69 | 31.34 | 31.43 | 0.54 | 5 mm/min | ASTM I |
| | RMX-AO-15 | 30.25 | 30.37 | 30.19 | 29.86 | 30.11 | 30.16 | 0.19 | 10 mm/min | ISO 1B |
| | RMX-AO-33 | 35.24 | 35.68 | 35.62 | 35.20 | 35.31 | 35.41 | 0.22 | 50 mm/min | ASTM I |
| | RMX-AO-09 | 30.68 | 30.23 | 30.92 | 30.44 | 31.04 | 30.66 | 0.33 | 10 mm/min | ISO 1B |
| 504 hrs @ 100° C. | RMX-AO-07 | | | | | | 2.14 | — | 10 mm/min | ISO 1B |
| | RMX-AO-31 | | | | | | — | — | | ASTM I |
| | RMX-AO-15 | | | | | | — | — | 10 mm/min | ISO 1B |
| | RMX-AO-33 | | | | | | — | — | 50 mm/min | ASTM I |
| | RMX-AO-09 | | | | | | — | — | 10 mm/min | ISO 1B |
| 2,041 hrs @ 100° C. | RMX-AO-07 | | | | | | 0.00 | — | | ISO 1B |
| | RMX-AO-31 | | | | | | 34.26 | — | | ASTM I |
| | RMX-AO-15 | | | | | | 29.56 | — | | ISO 1B |

TABLE 13-continued

|  |  |  | | | |
|---|---|---|---|---|---|
|  | RMX-AO-33 |  | 37.18 | — | ASTM I |
|  | RMX-AO-09 |  | — | — | ISO 1B |
|  |  |  | — |  |  |
| 2,685 hrs @ 100° C. | RMX-AO-07 |  | 0.00 | — | ISO 1B |
|  | RMX-AO-31 |  | 30.80 | — | ASTM I |
|  | RMX-AO-15 |  | — | — | ISO 1B |
|  | RMX-AO-33 |  | — | — | ASTM I |
|  | RMX-AO-09 |  | — | — | ISO 1B |
|  |  |  | — |  |  |
| 3,717 hrs @ 100° C. | RMX-AO-07 |  | 0.00 | — | ISO 1B |
|  | RMX-AO-31 |  | — | — | ASTM I |
|  | RMX-AO-15 |  | — | — | ISO 1B |
|  | RMX-AO-33 |  | — | — | ASTM I |
|  | RMX-AO-09 |  | 32.50 | — | ISO 1B |

|  |  | Lignin | Qty (wt %) | Retention (Relative) | Retention (Neat PP) |
|---|---|---|---|---|---|
| AR | RMX-AO-07 | N/A | N/A | 100.00% | 100.00% |
|  | RMX-AO-31 | SG | 0.3% | 100.00% | — |
|  | RMX-AO-15 | 40% HW, 60% I1010 | 0.3% | 100.00% | — |
|  | RMX-AO-33 | I1010 | 0.3% | 100.00% | — |
|  | RMX-AO-09 | HW | 0.3% | 100.00% | — |
| 504 hrs @ 100° C. | RMX-AO-07 | N/A | N/A | 6.99% | 6.99% |
|  | RMX-AO-31 | SG | 0.3% | — | — |
|  | RMX-AO-15 | 40% HW, 60% I1010 | 0.3% | — | — |
|  | RMX-AO-33 | I1010 | 0.3% | — | — |
|  | RMX-AO-09 | HW | 0.3% | — | — |
| 2,041 hrs @ 100° C. | RMX-AO-07 | N/A | N/A | 0.00% | 0.00% |
|  | RMX-AO-31 | SG | 0.3% | 108.99% | 111.87% |
|  | RMX-AO-15 | 40% HW, 60% I1010 | 0.3% | 98.02% | 96.52% |
|  | RMX-AO-33 | I1010 | 0.3% | 105.00% | 121.40% |
|  | RMX-AO-09 | HW | 0.3% | — | — |
| 2,685 hrs @ 100° C. | RMX-AO-07 | N/A | N/A | 0.00% | 0.00% |
|  | RMX-AO-31 | SG | 0.3% | 97.98% | 100.57% |
|  | RMX-AO-15 | 40% HW, 60% I1010 | 0.3% | — | — |
|  | RMX-AO-33 | I1010 | 0.3% | — | — |
|  | RMX-AO-09 | HW | 0.3% | — | — |

TABLE 13-continued

| 3,717 hrs @ 100° C. | RMX-AO-07 | N/A | N/A | 0.00% | 0.00% |
|---|---|---|---|---|---|
| | RMX-AO-31 | SG | 0.3% | — | — |
| | RMX-AO-15 | 40% HW, 60% I1010 | 0.3% | — | — |
| | RMX-AO-33 | I1010 | 0.3% | — | — |
| | RMX-AO-09 | HW | 0.3% | 105.99% | 106.12% |

"—" = no property loss observed

TABLE 14

| | | Specimen | | | | | Avg. | StDev | Speed | Type |
|---|---|---|---|---|---|---|---|---|---|---|
| | | 1 | 2 | 3 | 4 | 5 | | | | |
| AR | RMX-AO-07 | 31.48 | 30.35 | 30.39 | 31.00 | 29.91 | 30.63 | 0.62 | 10 mm/min | ISO 1B |
| | RMX-AO-31 | 32.07 | 31.83 | 31.24 | 30.69 | 31.34 | 31.43 | 0.54 | 5 mm/min | ASTM I |
| | RMX-AO-15 | 30.25 | 30.37 | 30.19 | 29.86 | 30.11 | 30.16 | 0.19 | 10 mm/min | ISO 1B |
| | RMX-AO-33 | 35.24 | 35.68 | 35.62 | 35.20 | 35.31 | 35.41 | 0.22 | 50 mm/min | ASTM I |
| | RMX-AO-09 | 30.68 | 30.23 | 30.92 | 30.44 | 31.04 | 30.66 | 0.33 | 10 mm/min | ISO 1B |
| 500 hrs @ 110° C. | RMX-AO-07 | | | | | | — | — | 10 mm/min | ISO 1B |
| | RMX-AO-31 | | | | | | — | — | | ASTM I |
| | RMX-AO-15 | | | | | | — | — | 10 mm/min | ISO 1B |
| | RMX-AO-33 | | | | | | — | — | 50 mm/min | ASTM I |
| | RMX-AO-09 | | | | | | — | — | 10 mm/min | ISO 1B |
| 1,000 hrs @ 110° C. | RMX-AO-07 | | | | | | — | — | | ISO 1B |
| | RMX-AO-31 | | | | | | — | — | | ASTM I |
| | RMX-AO-15 | | | | | | — | — | | ISO 1B |
| | RMX-AO-33 | | | | | | — | — | | ASTM I |
| | RMX-AO-09 | | | | | | — | — | | ISO 1B |
| 1,500 hrs @ 110° C. | RMX-AO-07 | | | | | | — | — | | ISO 1B |
| | RMX-AO-31 | | | | | | — | — | | ASTM I |
| | RMX-AO-15 | | | | | | — | — | | ISO 1B |
| | RMX-AO-33 | | | | | | — | — | | ASTM I |
| | RMX-AO-09 | | | | | | — | — | | ISO 1B |
| 2,000 hrs @ 110° C. | RMX-AO-07 | | | | | | — | — | | ISO 1B |
| | RMX-AO-31 | | | | | | — | — | | ASTM I |
| | RMX-AO-15 | | | | | | — | — | | ISO 1B |
| | RMX-AO-33 | | | | | | — | — | | ASTM I |
| | RMX-AO-09 | | | | | | — | — | | ISO 1B |

TABLE 14-continued

|  |  | Lignin | Qty (wt %) | Retention (Relative) | Retention (Neat PP) |
|---|---|---|---|---|---|
| AR | RMX-AO-07 | N/A | N/A | 100.00% | 100.00% |
|  | RMX-AO-31 | SG | 0.3% | 100.00% | — |
|  | RMX-AO-15 | 40% HW, 60% I1010 | 0.3% | 100.00% | — |
|  | RMX-AO-33 | I1010 | 0.3% | 100.00% | — |
|  | RMX-AO-09 | HW | 0.3% | 100.00% | — |
| 500 hrs @ 110° C. | RMX-AO-07 | N/A | N/A | — | — |
|  | RMX-AO-31 | SG | 0.3% | — | — |
|  | RMX-AO-15 | 40% HW, 60% I1010 | 0.3% | — | — |
|  | RMX-AO-33 | I1010 | 0.3% | — | — |
|  | RMX-AO-09 | HW | 0.3% | — | — |
| 1,000 hrs @ 110° C. | RMX-AO-07 | N/A | N/A | — | — |
|  | RMX-AO-31 | SG | 0.3% | — | — |
|  | RMX-AO-15 | 40% HW, 60% I1010 | 0.3% | — | — |
|  | RMX-AO-33 | I1010 | 0.3% | — | — |
|  | RMX-AO-09 | HW | 0.3% | — | — |
| 1,500 hrs @ 110° C. | RMX-AO-07 | N/A | N/A | — | — |
|  | RMX-AO-31 | SG | 0.3% | — | — |
|  | RMX-AO-15 | 40% HW, 60% I1010 | 0.3% | — | — |
|  | RMX-AO-33 | I1010 | 0.3% | — | — |
|  | RMX-AO-09 | HW | 0.3% | — | — |
| 2,000 hrs @ 110° C. | RMX-AO-07 | N/A | N/A | — | — |
|  | RMX-AO-31 | SG | 0.3% | — | — |
|  | RMX-AO-15 | 40% HW, 60% I1010 | 0.3% | — | — |
|  | RMX-AO-33 | I1010 | 0.3% | — | — |
|  | RMX-AO-09 | HW | 0.3% | — | — |

"—" = no property loss observed

7. Example 7

Figure 5:
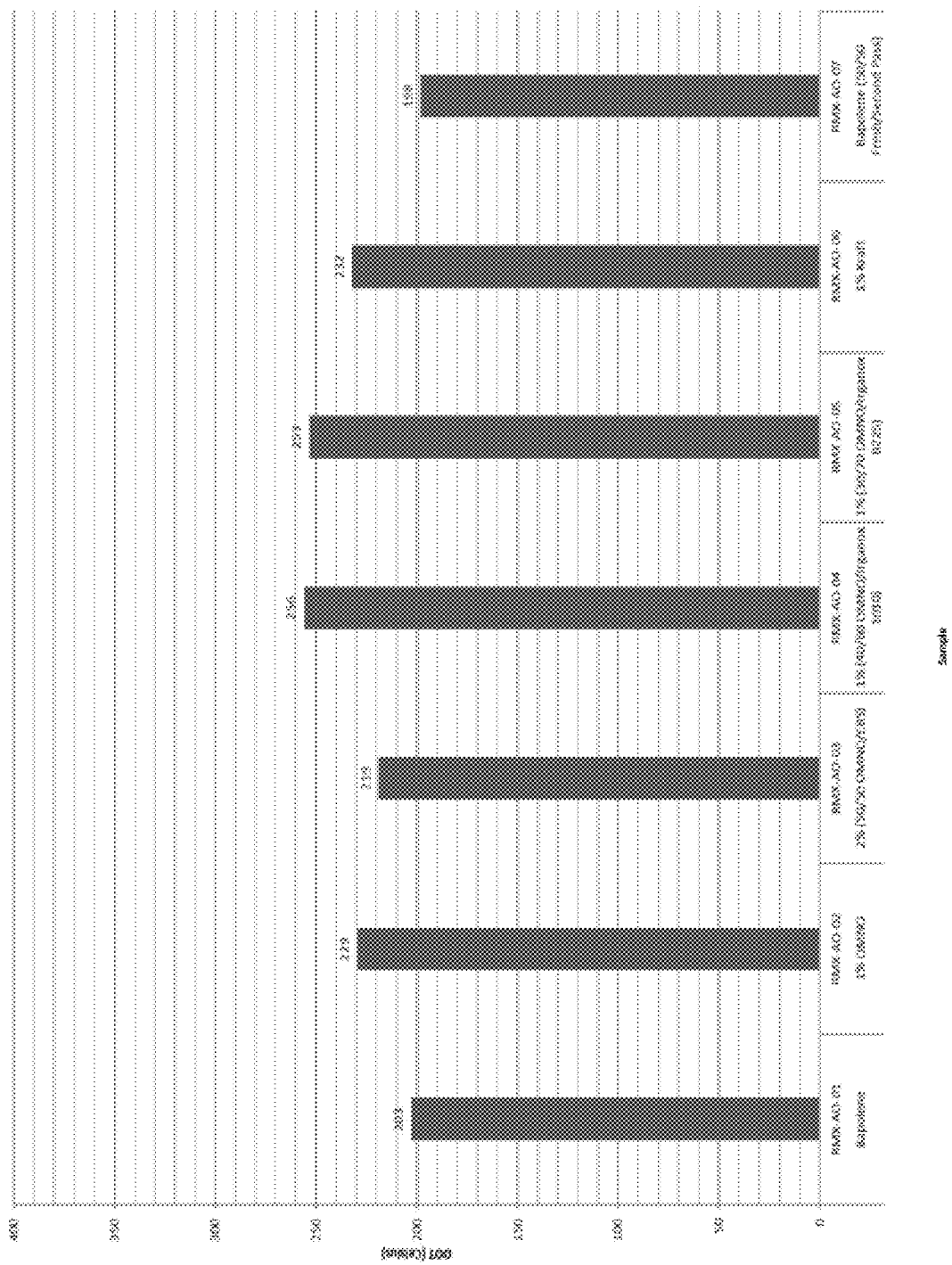
FIG. 5 shows representative results of baseline onset temperature (OOT) testing on exemplary compositions.
Figure 5:
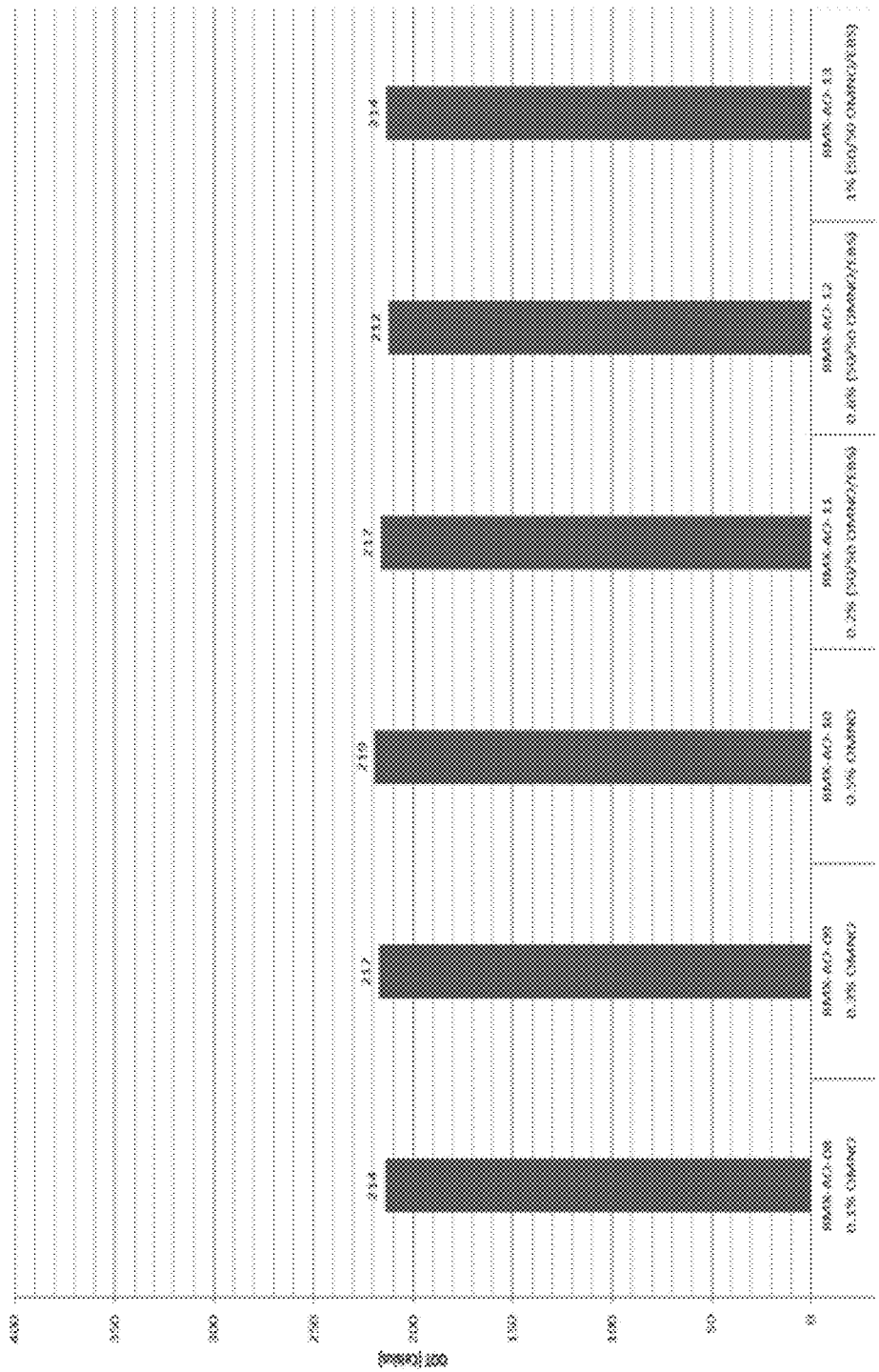
Figure 5:
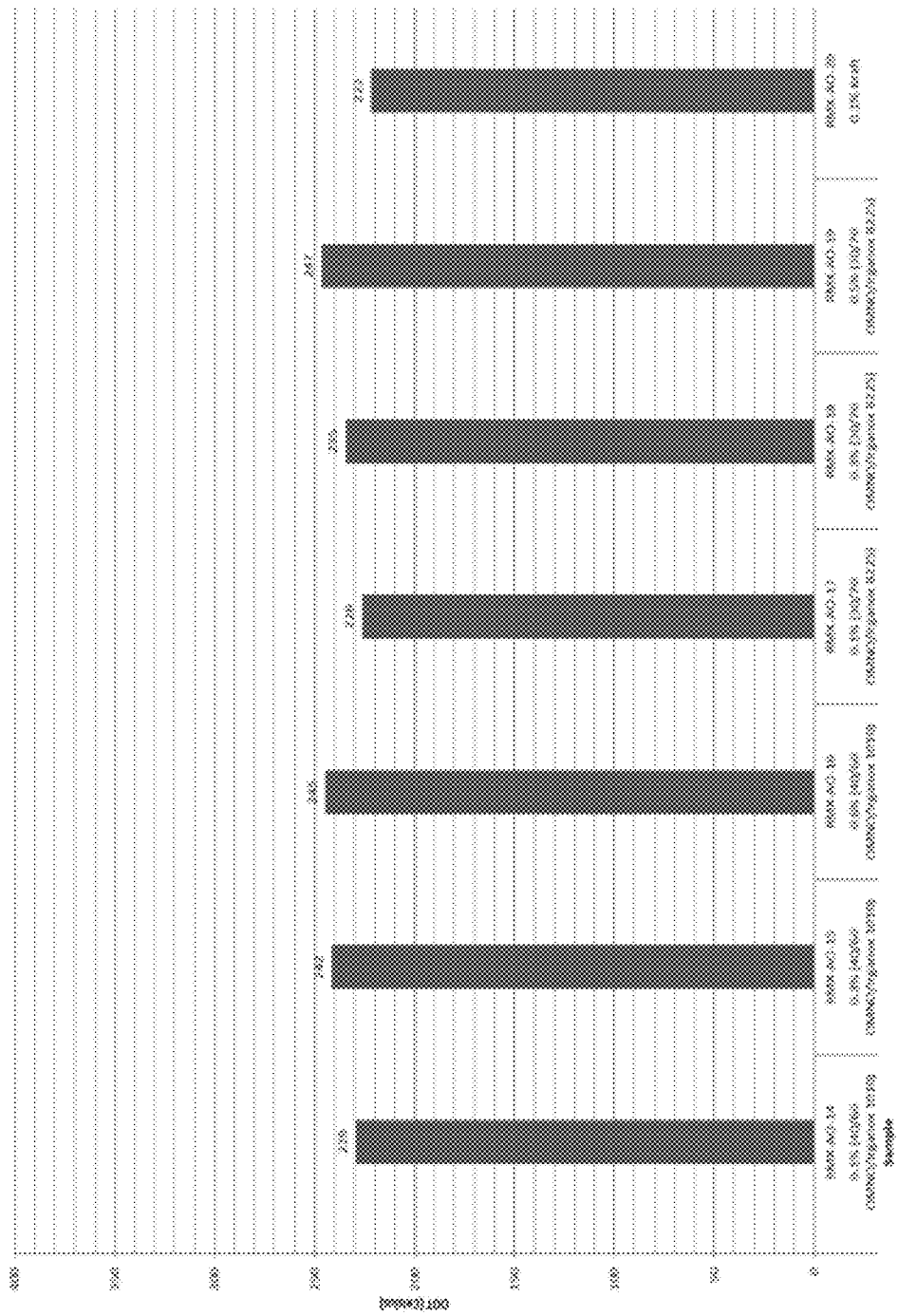
Figure 5:
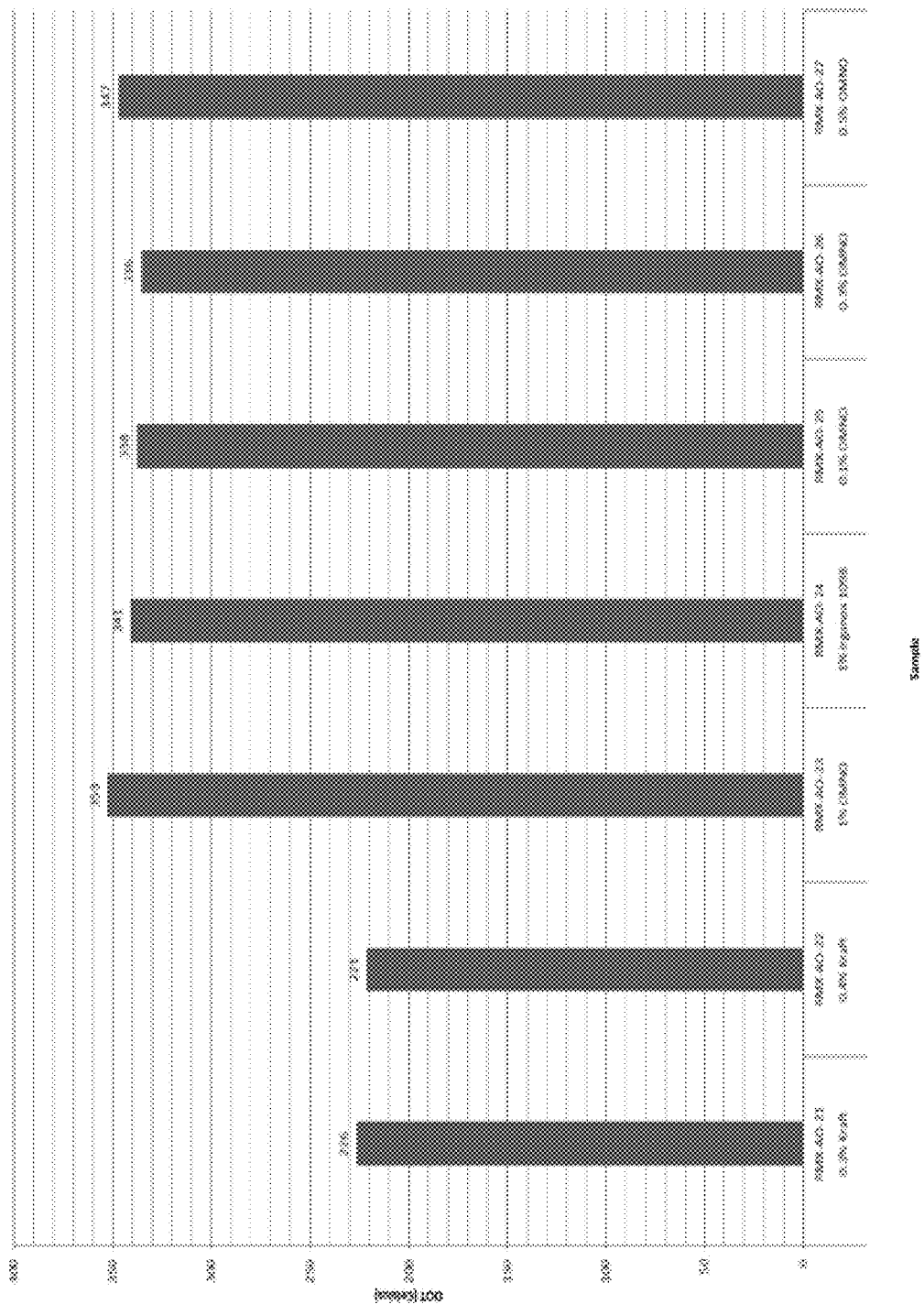
Figure 6A:
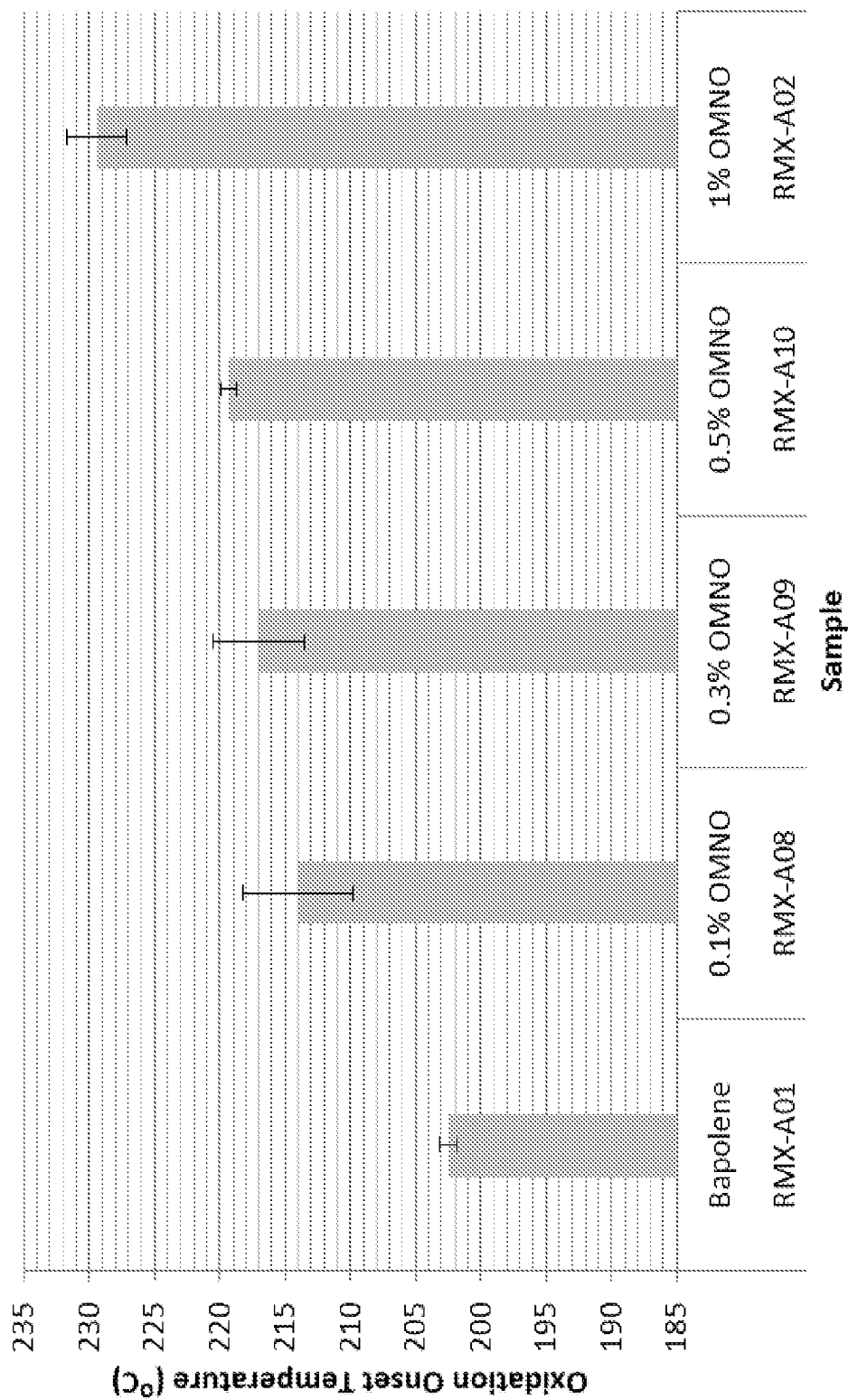
FIGS. 6A-L show representative data corresponding to baseline oxidation onset temperature (OOT) testing on exemplary compositions.
Figure 6B:
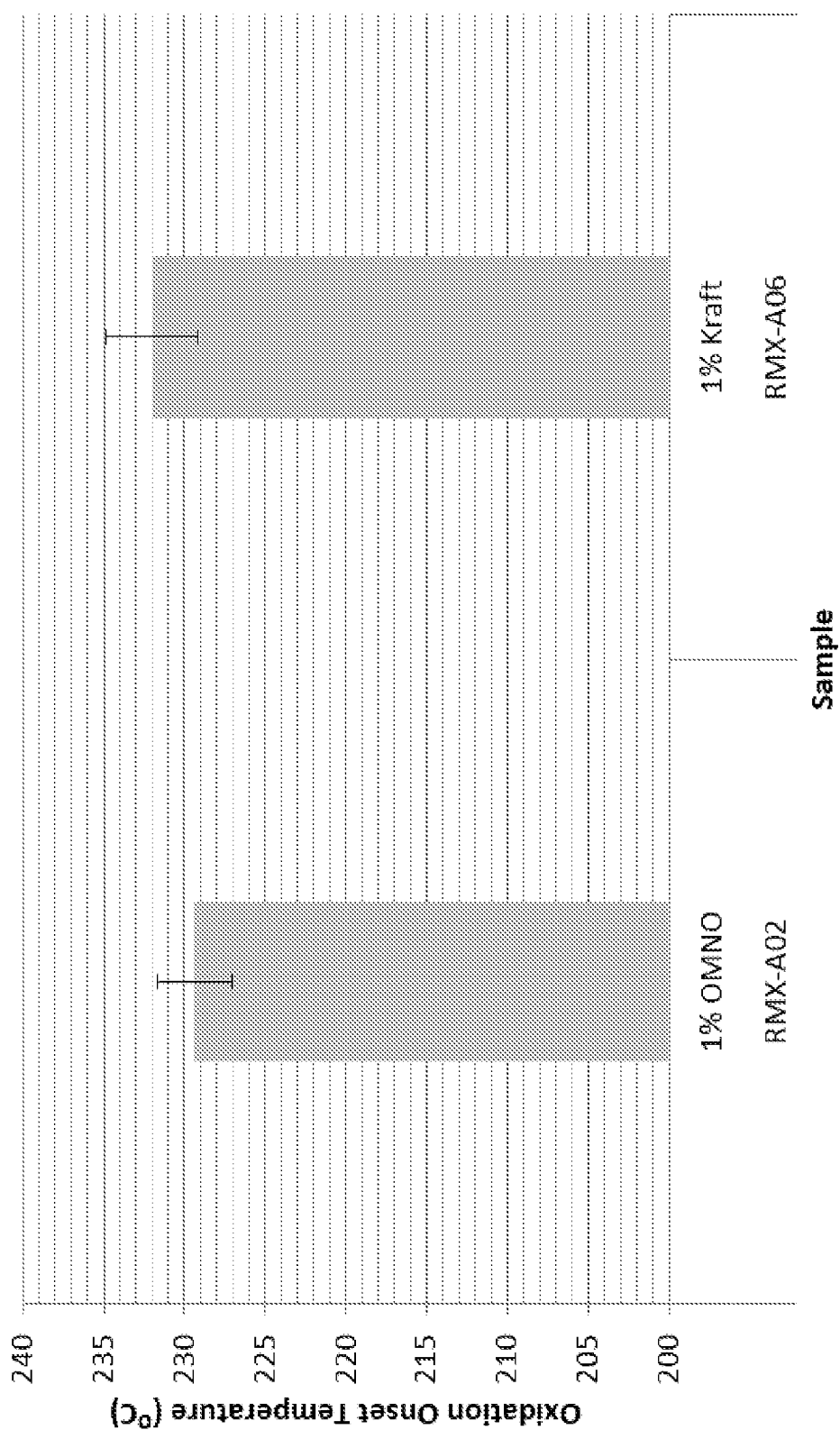
Figure 6C:
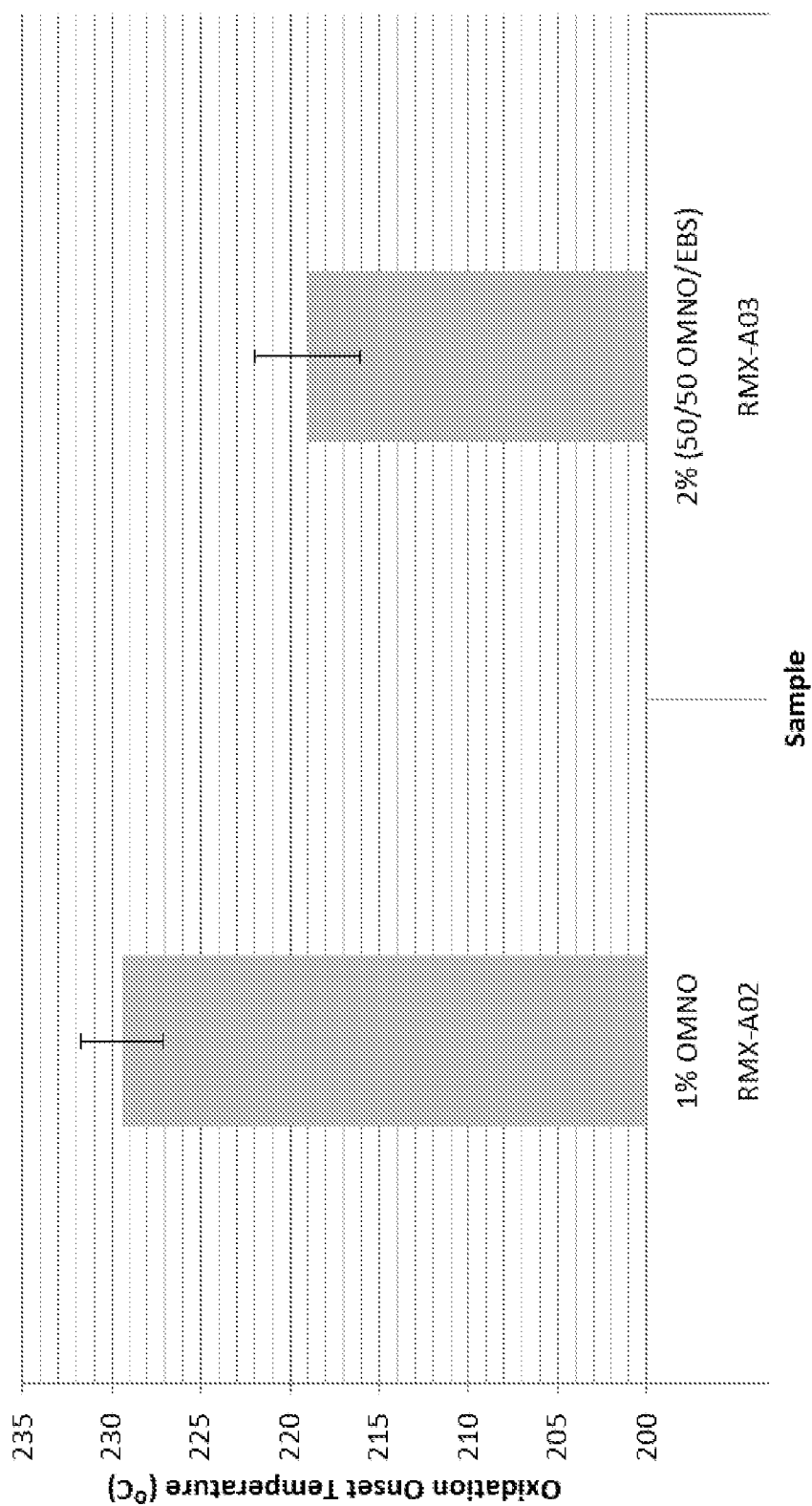
Figure 6D:
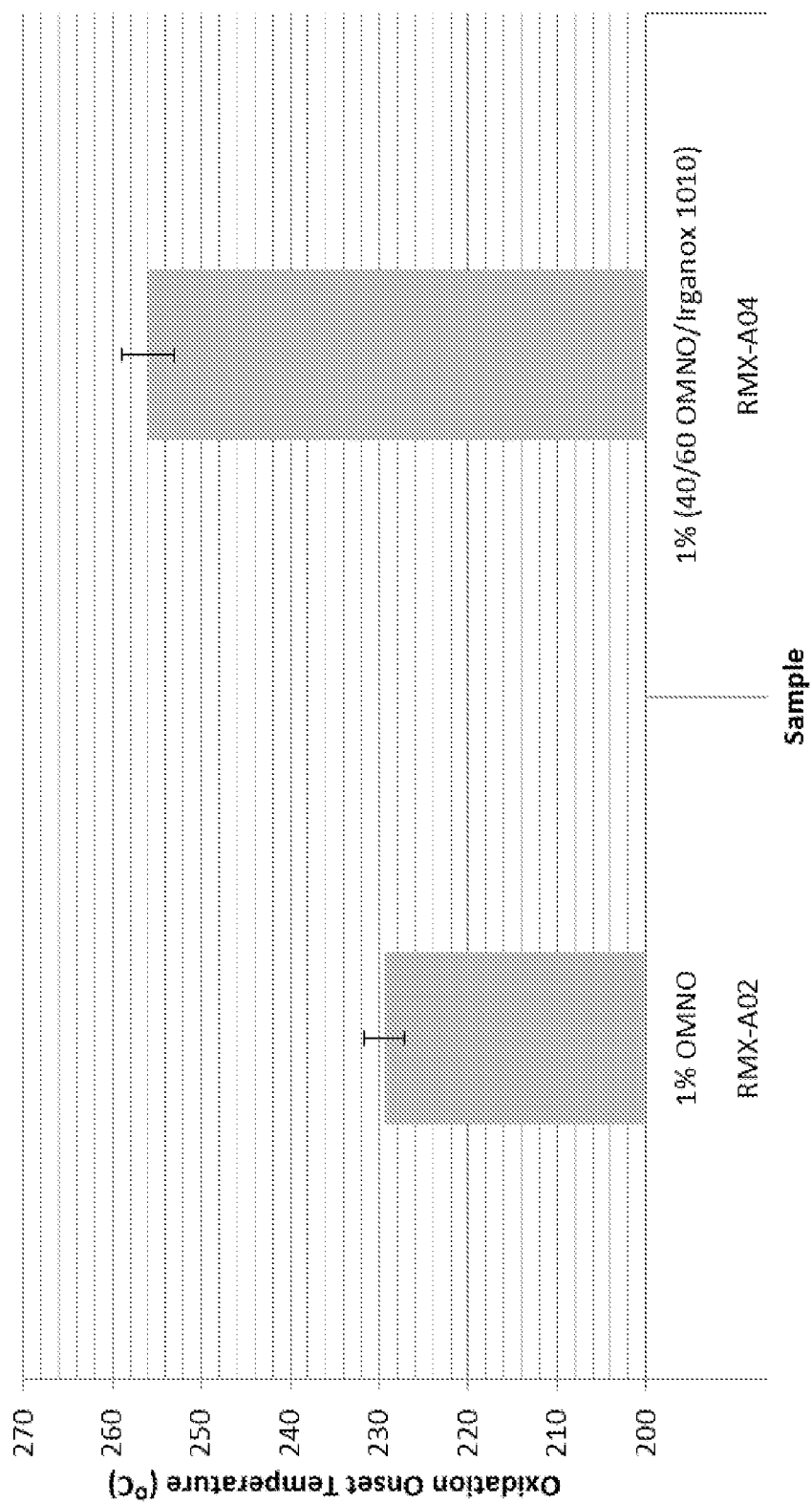
Figure 6E:
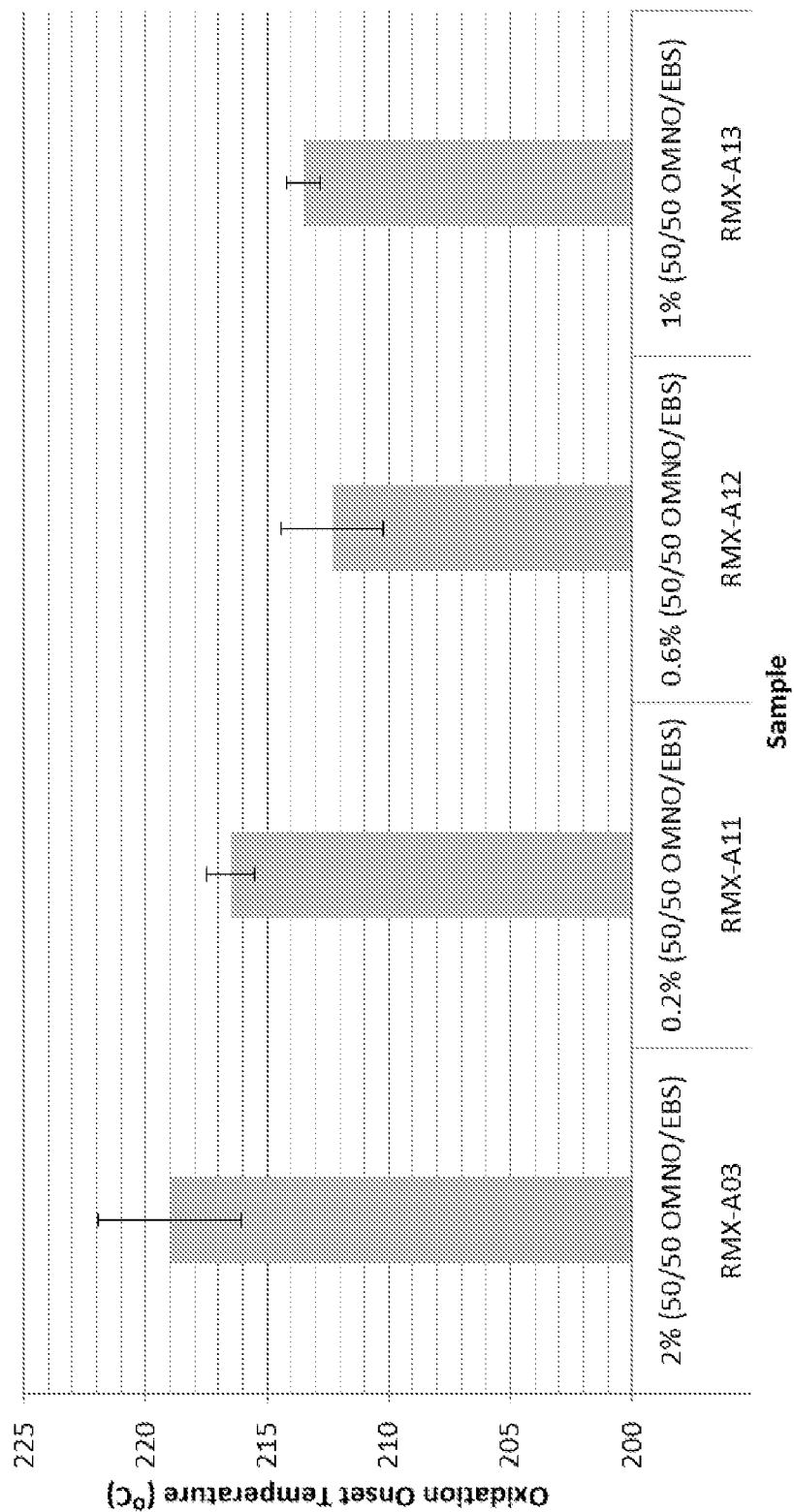
Figure 6F:
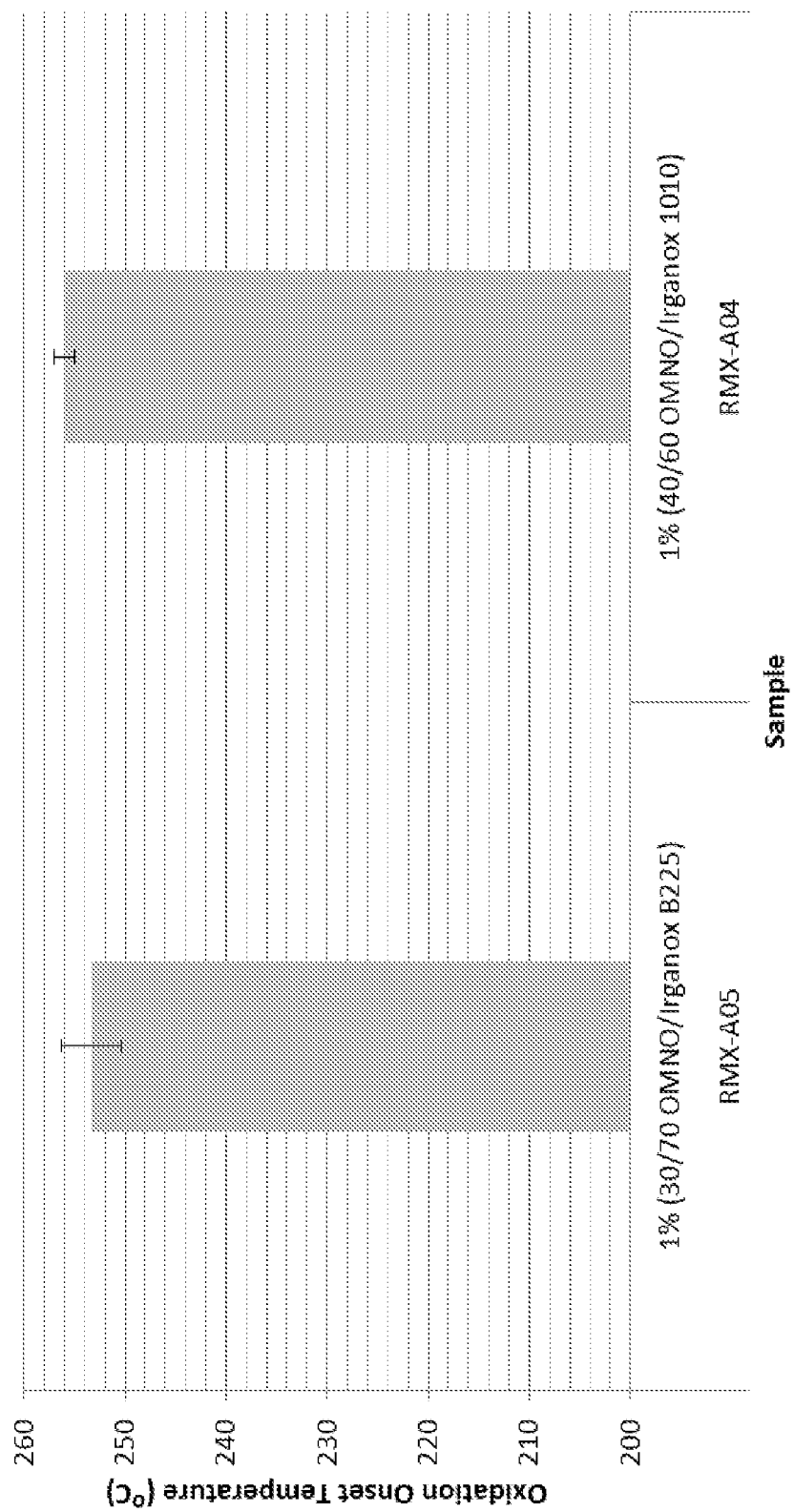
Figure 6G:
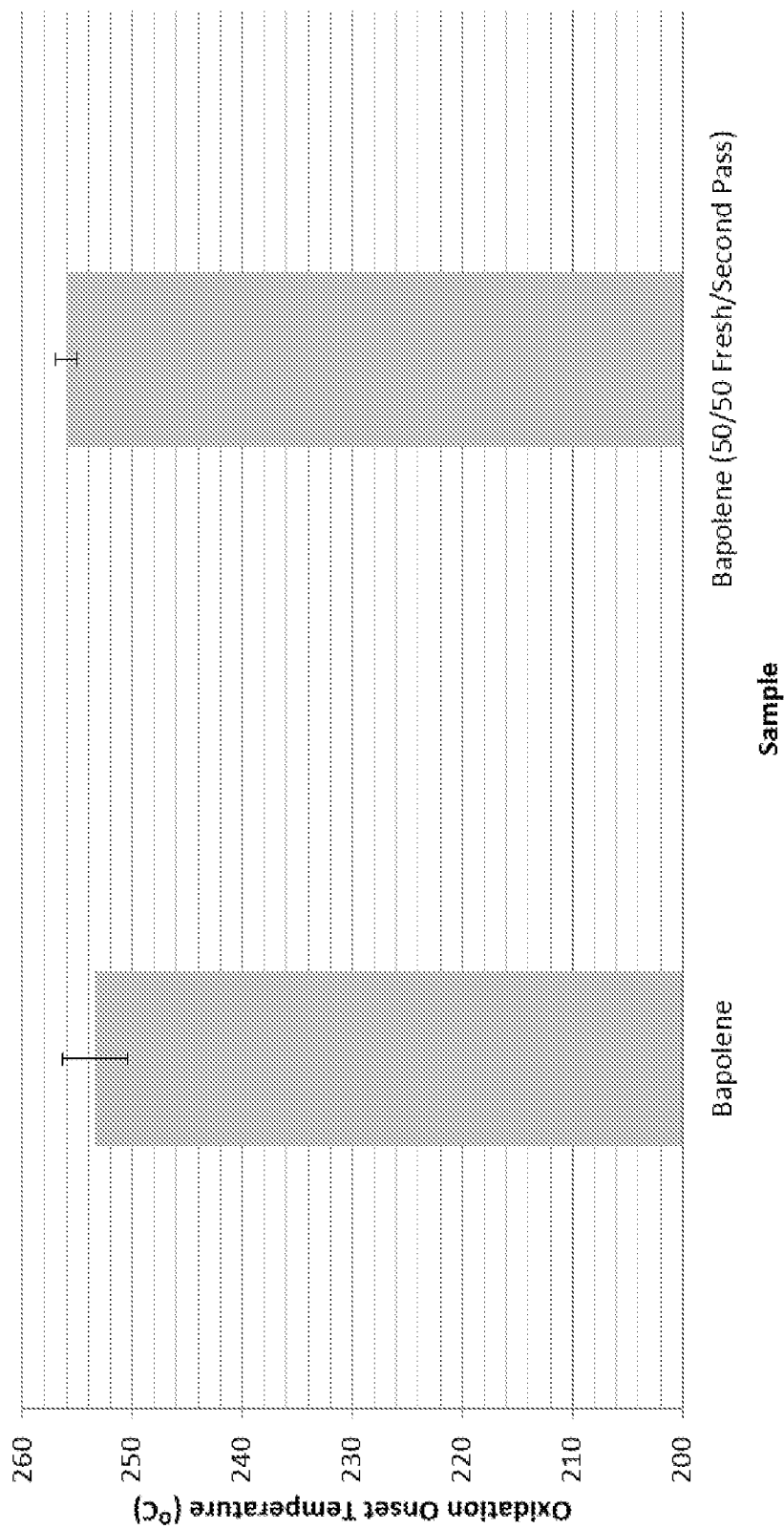
Figure 6H:
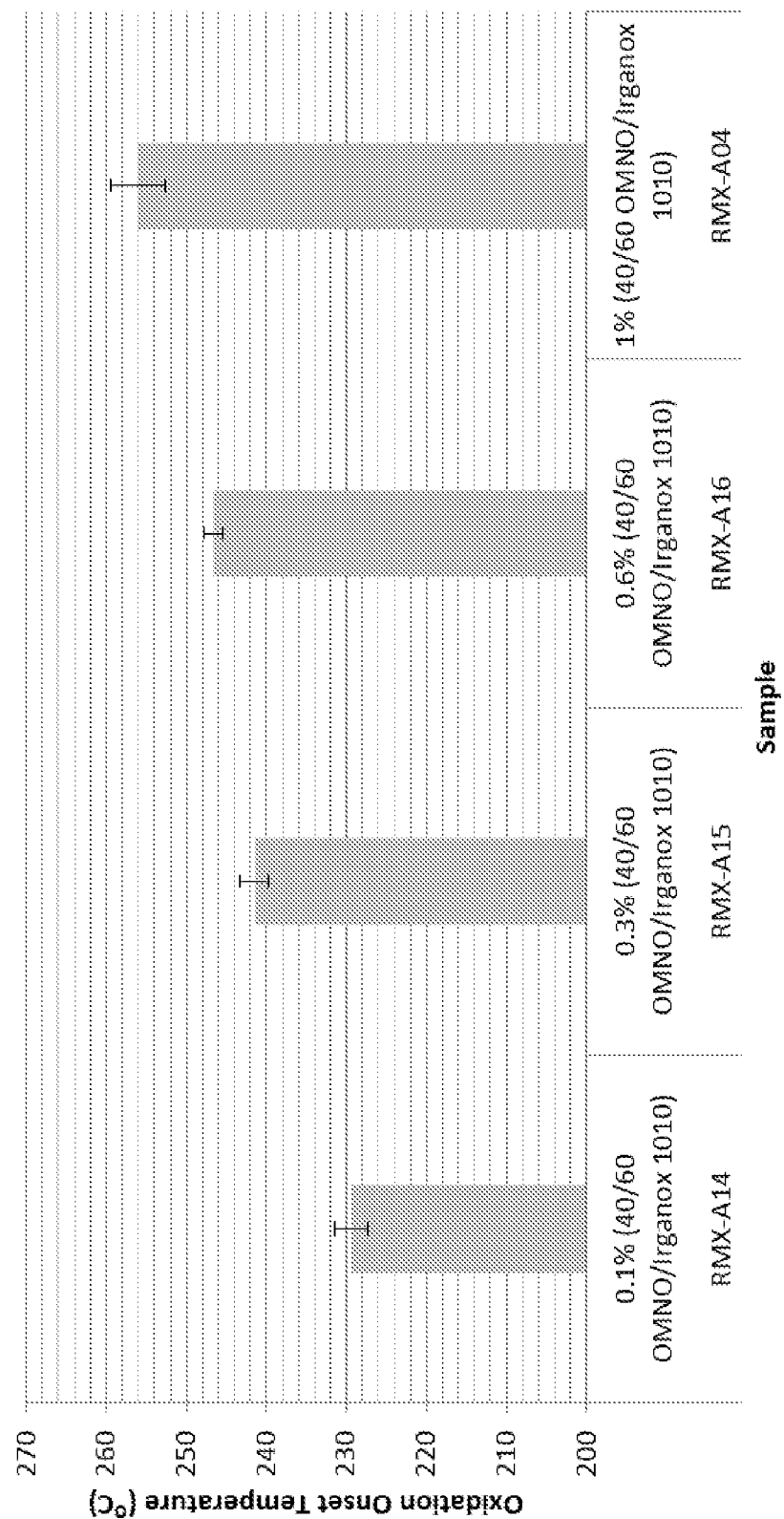
Figure 6I:
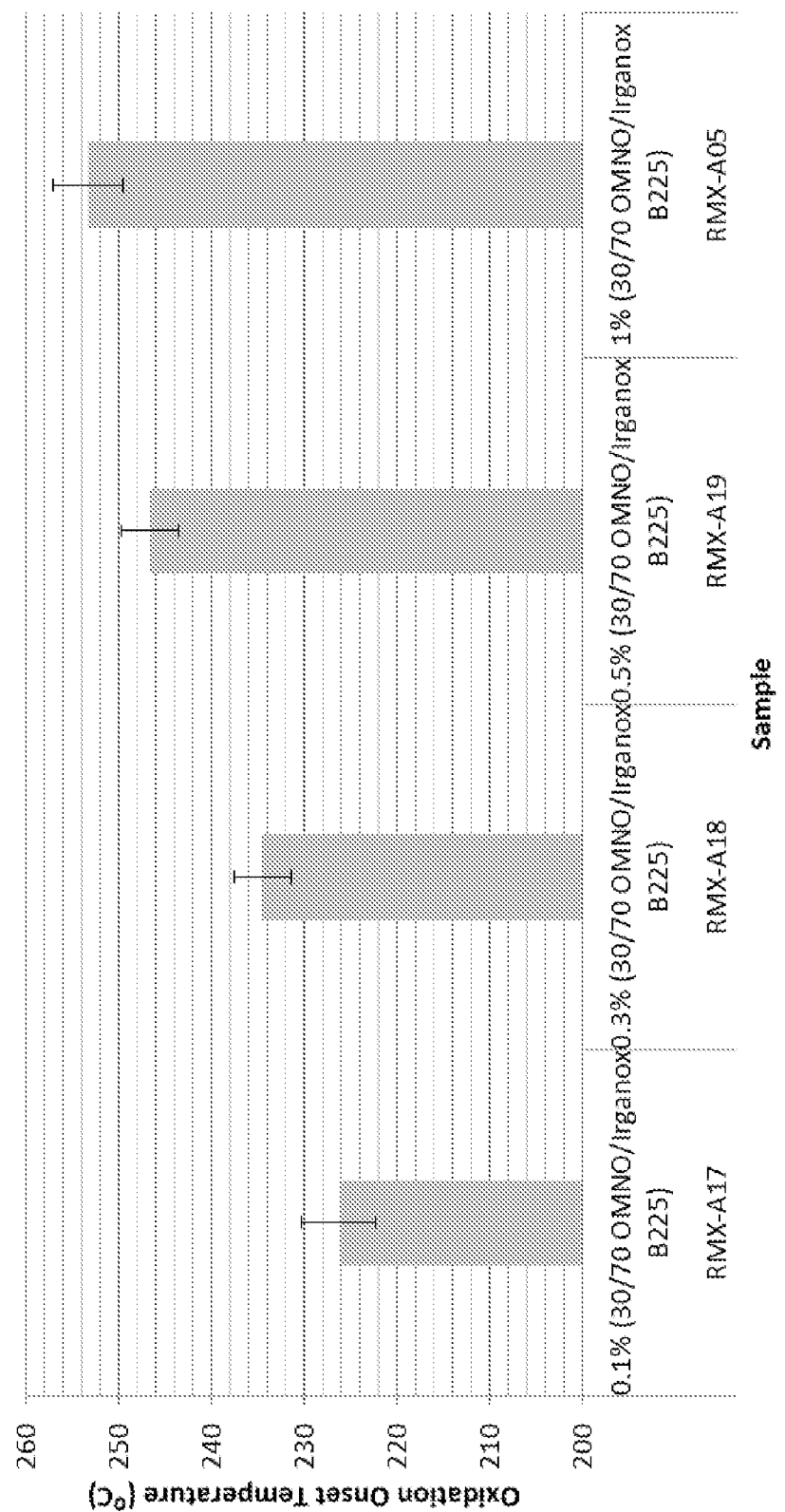
Figure 6J:
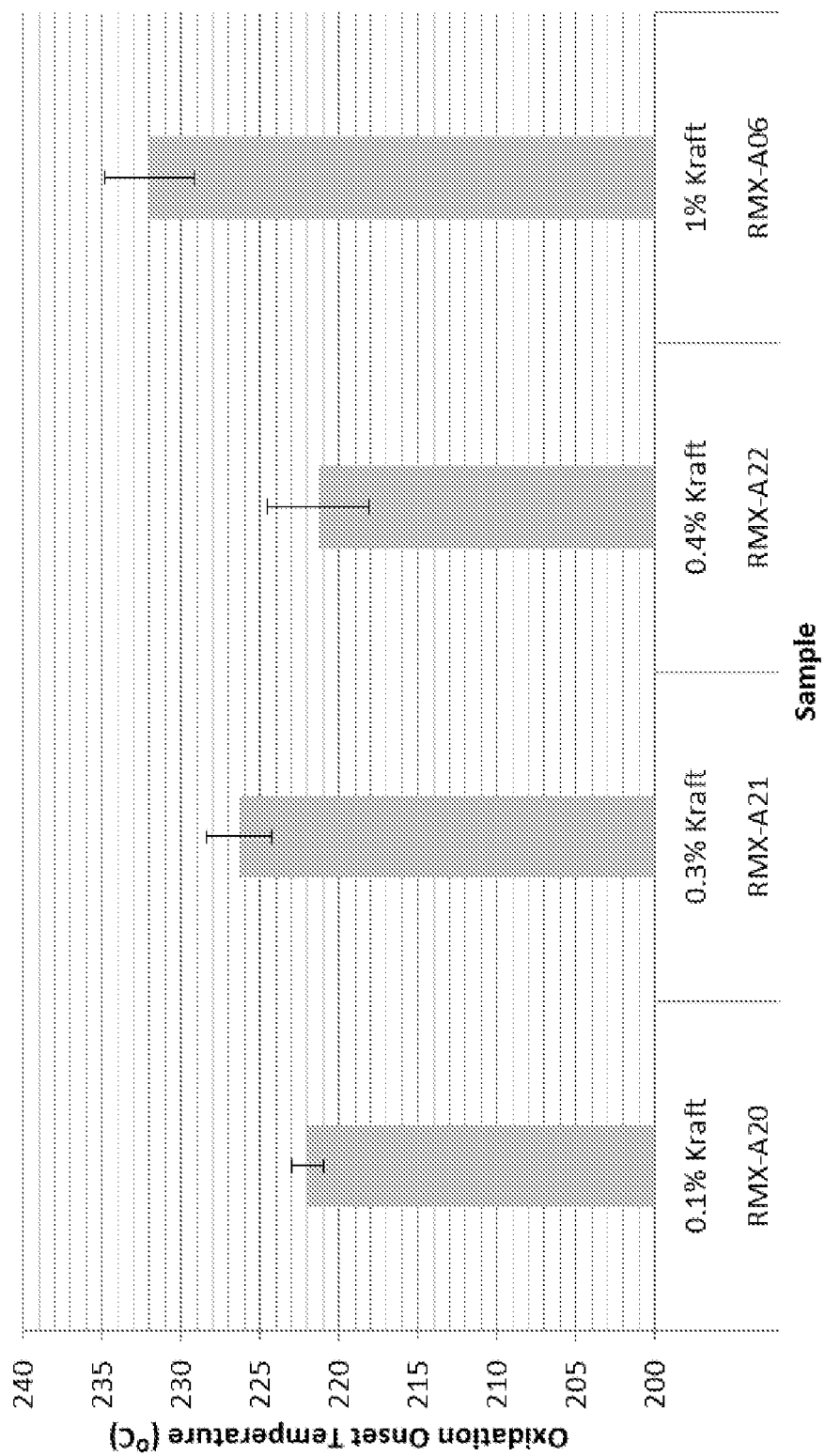
Figure 6K:
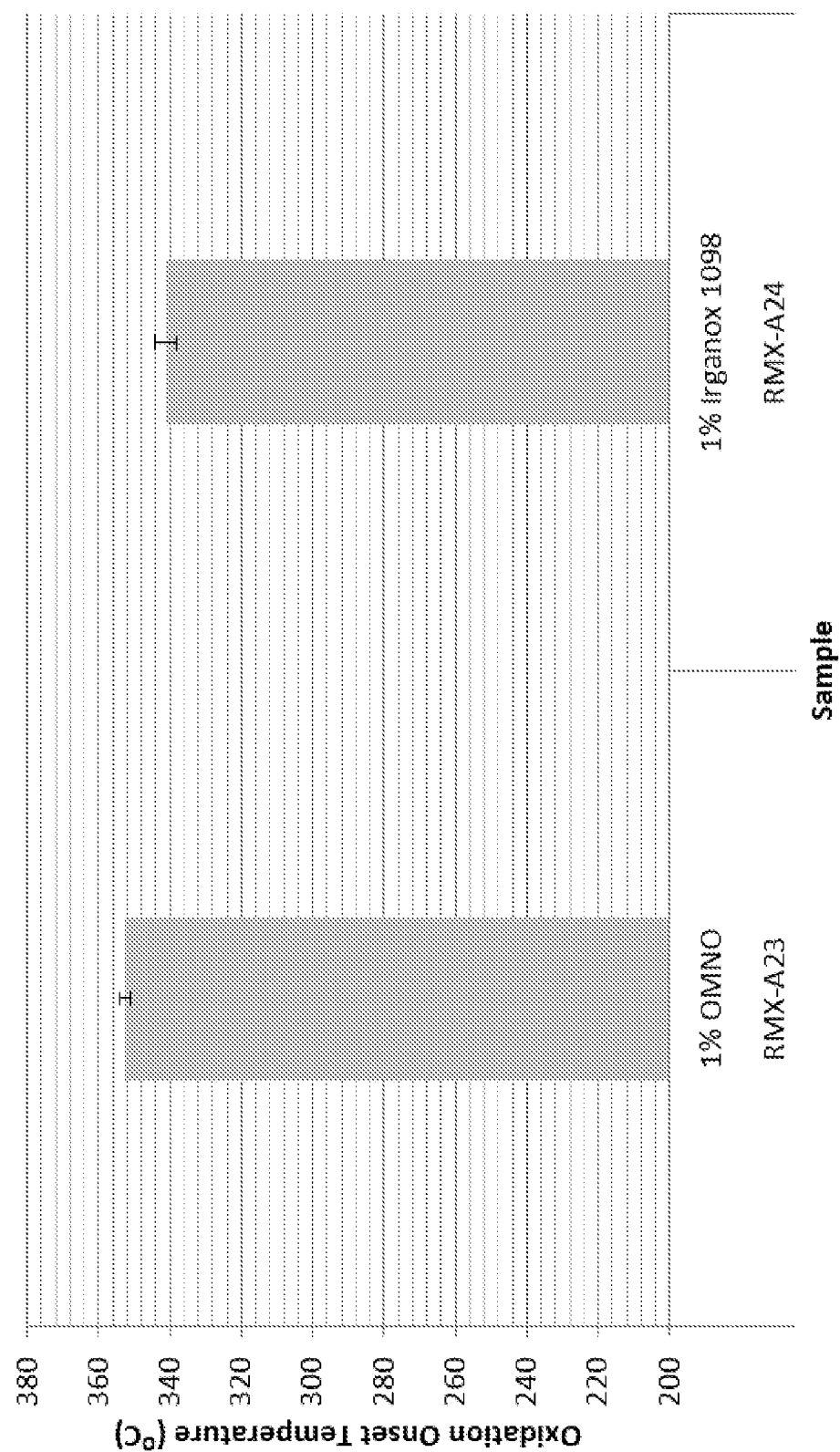
Figure 6L:
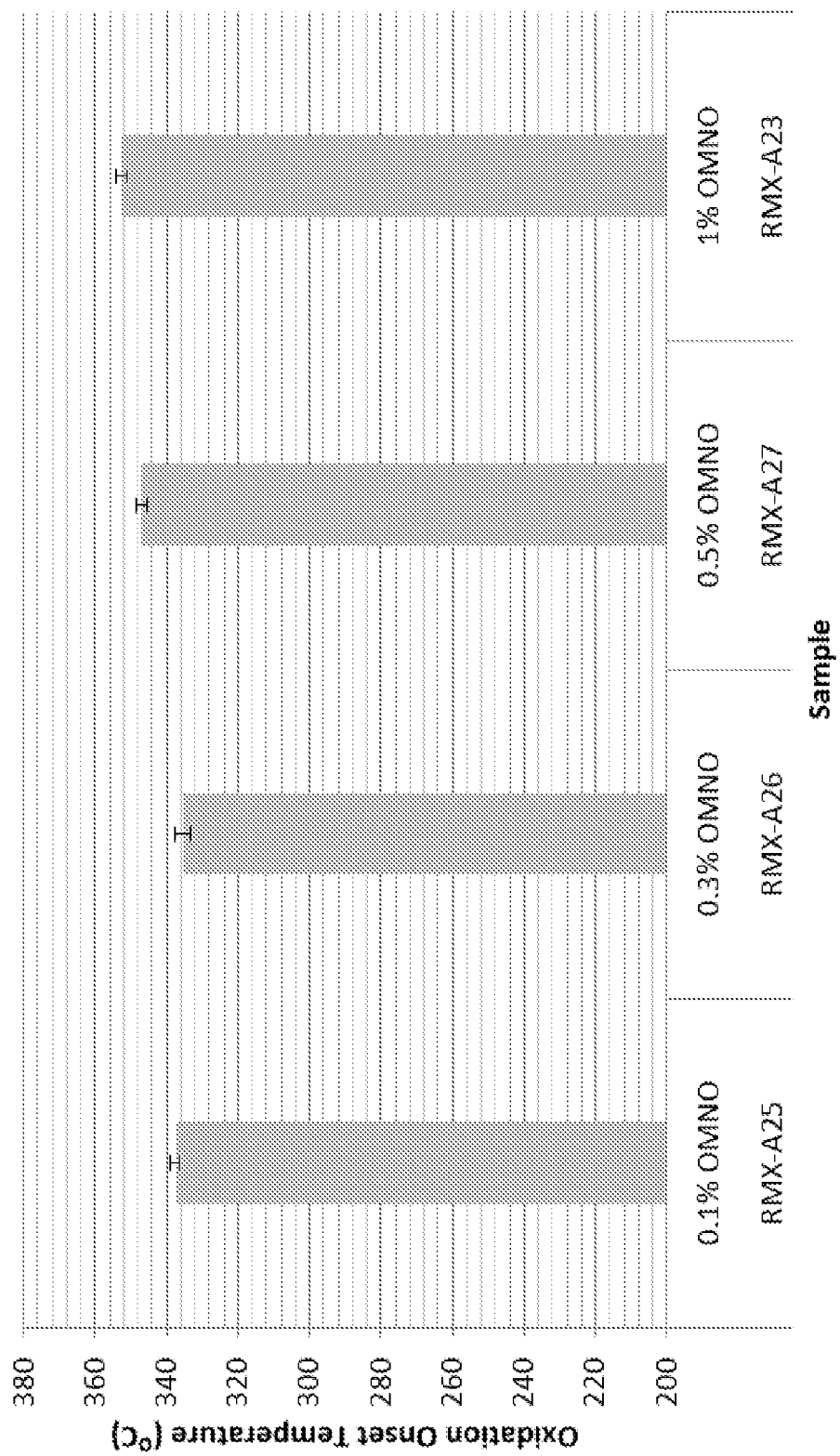

The results of Baseline Oxidation Onset Temperature (OOT) testing on the exemplary compositions is shown in Table 15, Table 16, and FIG. 5.

TABLE 15

| Main Thermoplastic | Description | Identifier | OOT (° C.) | | | | | Avg | StDev |
|---|---|---|---|---|---|---|---|---|---|
|  |  |  | 1 | 2 | 3 | 4 | 5 |  |  |
| Bapolene 4012F | Bapolene | RMX-AO-01 | 202 | 203 |  |  |  | 203 | 0.7 |
|  | 1% OMNO | RMX-AO-02 | 227 | 230 | 229 | 228 | 233 | 229 | 2.3 |
|  | 2% (50/50 OMNO/EBS) | RMX-AO-03 | 220 | 222 | 215 | 219 |  | 219 | 2.9 |

TABLE 15-continued

| Main Thermoplastic | Description | Identifier | OOT (° C.) 1 | 2 | 3 | 4 | 5 | Avg | StDev |
|---|---|---|---|---|---|---|---|---|---|
| | 1% (40/60 OMNO/Irganox 1010) | RMX-AO-04 | 258 | 258 | | 252 | | 256 | 3.5 |
| | 1% (30/70 OMNO/Irganox B225) | RMX-AO-05 | 249 | 255 | 256 | | | 253 | 3.8 |
| | 1% Kraft | RMX-AO-06 | 234 | 230 | | | | 232 | 2.8 |
| | Bapolene (50/50 Fresh/Second Pass) | RMX-AO-07 | 197 | 199 | | | | 198 | 1.4 |
| | 0.1% OMNO | RMX-AO-08 | 215 | 213 | | | | 214 | 1.4 |
| | 0.3% OMNO | RMX-AO-09 | 219 | 219 | 213 | | | 217 | 3.5 |
| | 0.5% OMNO | RMX-AO-10 | 219 | 220 | 219 | | | 219 | 0.6 |
| | 0.2% (50/50 OMNO/EBS) | RMX-AO-11 | 217 | 215 | 217 | 217 | | 217 | 1.0 |
| | 0.6% (50/50 OMNO/EBS) | RMX-AO-12 | 214 | 213 | 210 | | | 212 | 2.1 |
| | 1% (50/50 OMNO/EBS) | RMX-AO-13 | 213 | 214 | | | | 214 | 0.7 |
| | 0.1% (40/60 OMNO/Irganox 1010) | RMX-AO-14 | 227 | 231 | 230 | | | 229 | 2.1 |
| | 0.3% (40/60 OMNO/Irganox 1010) | RMX-AO-15 | 242 | 239 | 242 | 243 | | 242 | 1.7 |
| | 0.6% (40/60 OMNO/Irganox 1010) | RMX-AO-16 | 248 | | 239 | 246 | 246 | 245 | 3.9 |
| | 0.1% (30/70 OMNO/Irganox B225) | RMX-AO-17 | 227 | 222 | 230 | | | 226 | 4.0 |
| | 0.3% (30/70 OMNO/Irganox B225) | RMX-AO-18 | 239 | 233 | 232 | 234 | | 235 | 3.1 |
| | 0.5% (30/70 OMNO/Irganox B225) | RMX-AO-19 | 250 | 244 | 246 | | | 247 | 3.1 |
| | 0.1% Kraft | RMX-AO-20 | 221 | 222 | 223 | | | 222 | 1.0 |
| | 0.3% Kraft | RMX-AO-21 | 228 | 224 | 227 | | | 226 | 2.1 |
| | 0.4% Kraft | RMX-AO-22 | 219 | 220 | 225 | | | 221 | 3.2 |
| Ultramid 8202 | 1% OMNO | RMX-AO-23 | 351 | 353 | 354 | | | 353 | 1.5 |
| | 1% Irganox 1098 | RMX-AO-24 | 344 | 338 | 341 | | | 341 | 3.0 |
| | 0.1% OMNO | RMX-AO-25 | 339 | 337 | 337 | | | 338 | 1.2 |
| | 0.3% OMNO | RMX-AO-26 | 337 | 334 | | | | 336 | 2.1 |
| | 0.5% OMNO | RMX-AO-27 | | 348 | | 346 | | 347 | 1.4 |

TABLE 16

| Sample ID | Identifier | OOT (° C.) 1 | 2 | 3 | 4 | 5 | Avg | StDev |
|---|---|---|---|---|---|---|---|---|
| PP 12 CTRL Extrusion 1st | | 217 | 217 | 218 | | | 217 | 0.6 |
| PP 12 CTRL Extrusion 2nd | | 216 | 213 | 200 | | | 215 | 2.1 |
| PP 12 CTRL Extrusion 3rd | | 213 | 215 | 217 | | | 215 | 2.0 |
| PP 12 CTRL Extrusion 5th | | 205 | 205 | 204 | | | 205 | 0.6 |
| 1000 ppm 1010/500 ppm ZnSt 1st | | 231 | 228 | 232 | | | 230 | 2.1 |
| 1000 ppm Anox20_500 ppm ZnSt 1st | | 261 | 259 | 230 | | | 260 | 1.4 |
| 1000 ppm Anox20_500 ppm ZnSt 2nd | | 230 | 229 | 230 | | | 230 | 0.6 |
| 1000 ppm Anox20_500 ppm ZnSt 3rd | | 230 | 228 | 225 | | | 228 | 2.5 |
| 1000 ppm Anox20_500 ppm ZnSt 4th | | 227 | 226 | 224 | | | 226 | 1.5 |
| 1000 ppm Anox20_500 ppm ZnSt 5th | | 223 | 222 | 222 | | | 222 | 0.6 |
| 1000 ppm lignin_500 ppm ZnSt 1st | | 217 | 214 | 221 | | | 217 | 3.5 |
| 1% lignin_0.5% ZnSt MB#3 | | 213 | 221 | 216 | | | 217 | 4.0 |
| 1% Lignin20/Anox80 0.5% ZnSt MB#4 | | 263 | 264 | 254 | | | 264 | 0.7 |
| 10% MB(1%) in PP12 5th pass | | 220 | 223 | 221 | | | 221 | 1.5 |

TABLE 16-continued

| Sample ID | Identifier | OOT (° C.) 1 | 2 | 3 | 4 | 5 | Avg | StDev |
|---|---|---|---|---|---|---|---|---|
| 10% from 1% MB 3rd pass | | 228 | 226 | 226 | | | 227 | 1.2 |
| 80% Anox_20% Lignin 3rd | | 222 | 221 | 221 | | | 221 | 0.6 |
| 1% from 10% MB in 80/20 lig 500 ppmZnSt | | 225 | 221 | 223 | | | 223 | 2.0 |
| 80% Anox20_20% Lignin 8th | | | 221 | 220 | | | 221 | 0.7 |

8. Example 8

Data corresponding to Baseline Oxidation Onset Temperature (OOT) testing on the exemplary compositions is shown in Tables 17i-xii and corresponds to FIGS. 6A-L, respectively.

TABLE 17I

| Sample | | OOT (° C.) | | | | | Average | StDev |
|---|---|---|---|---|---|---|---|---|
| RMX-A01 | Bapolene | 202 | 203 | | | | 203 | 0.7 |
| RMX-A08 | 0.1% OMNO | 215 | 213 | | | | 214 | 4.2 |
| RMX-A09 | 0.3% OMNO | 219 | 219 | 213 | | | 217 | 3.5 |
| RMX-A10 | 0.5% OMNO | 219 | 220 | 219 | | | 219 | 0.6 |
| RMX-A02 | 1% OMNO | 227 | 230 | 229 | 228 | 233 | 229 | 2.3 |

TABLE 17ii

| Sample | | OOT (° C.) | | | | | Average | StDev |
|---|---|---|---|---|---|---|---|---|
| RMX-A02 | 1% OMNO | 227 | 230 | 229 | 228 | 233 | 229 | 2.3 |
| RMX-A06 | 1% Kraft | 234 | 230 | | | | 232 | 2.8 |

TABLE 17III

| Sample | | OOT (° C.) | | | | | Average | StDev |
|---|---|---|---|---|---|---|---|---|
| RMX-A02 | 1% OMNO | 227 | 230 | 229 | 228 | 233 | 229 | 2.3 |
| RMX-A03 | 2% (50/50 OMNO/EBS) | 220 | 222 | 215 | 219 | | 219 | 2.9 |

TABLE 17IV

| Sample | | OOT (° C.) | | | | Avg. | StDev |
|---|---|---|---|---|---|---|---|
| RMX-A02 | 1% OMNO | 227 | 230 | 229 | 228 | 233 | 229 | 2.3 |
| RMX-A04 | 1% (40/60 OMNO/Irganox 1010) | 258 | 258 | 252 | | | 256 | 3.5 |

TABLE 17V

| Sample | | OOT (° C.) | | | | Average | StDev |
|---|---|---|---|---|---|---|---|
| RMX-A03 | 2% (50/50 OMNO/EBS) | 220 | 222 | 215 | 219 | 219 | 2.9 |
| RMX-A11 | 0.2% (50/50 OMNO/EBS) | 217 | 215 | 217 | 217 | 217 | 1.0 |
| RMX-A12 | 0.6% (50/50 OMNO/EBS) | 214 | 213 | 210 | | 212 | 2.1 |
| RMX-A13 | 1% (50/50 OMNO/EBS) | 213 | 214 | | | 214 | 0.7 |

TABLE 17VI

| Sample | | OOT (° C.) | | | Average | StDev |
|---|---|---|---|---|---|---|
| RMX-A05 | 1% (30/70 OMNO/Irganox B225) | 249 | 255 | 256 | 253 | 3.8 |
| RMX-A04 | 1% (40/60 OMNO/Irganox 1010) | 258 | 258 | 252 | 256 | 3.5 |

TABLE 17VII

| Sample | | OOT (° C.) | | Average | StDev |
|---|---|---|---|---|---|
| RMX-A01 | Bapolene | 202 | 203 | 203 | 0.7 |
| RMX-A07 | Bapolene (50/50 Fresh/Second Pass) | 197 | 199 | 198 | 1.4 |

TABLE 17VIII

| Sample | | OOT (° C.) | | | Average | StDev |
|---|---|---|---|---|---|---|
| RMX-A14 | 0.1% (40/60 OMNO/Irganox 1010) | 227 | 231 | 230 | 229 | 2.1 |
| RMX-A15 | 0.3% (40/60 OMNO/Irganox 1010) | 242 | 239 | 242 | 243 | 242 | 1.7 |
| RMX-A16 | 0.6% (40/60 OMNO/Irganox 1010) | 248 | 246 | 246 | 247 | 1.2 |
| RMX-A04 | 1% (40/60 OMNO/Irganox 1010) | 258 | 258 | 252 | 256 | 3.5 |

TABLE 17VIX

| Sample | | OOT (° C.) | | | Avg. | StDev |
|---|---|---|---|---|---|---|
| RMX-A17 | 0.1% (30/70 OMNO/Irganox B225) | 227 | 222 | 230 | 226 | 4.0 |
| RMX-A18 | 0.3% (30/70 OMNO/Irganox B225) | 239 | 233 | 232 | 234 | 235 | 3.1 |
| RMX-A19 | 0.5% (30/70 OMNO/Irganox B225) | 250 | 244 | 246 | | 247 | 3.1 |
| RMX-A05 | 1% (30/70 OMNO/Irganox B225) | 249 | 255 | 256 | | 253 | 3.8 |

TABLE 17X

| Sample | | OOT (° C.) | | | Average | StDev |
|---|---|---|---|---|---|---|
| RMX-A20 | 0.1% Kraft | 221 | 222 | 223 | 222 | 1.0 |
| RMX-A21 | 0.3% Kraft | 228 | 224 | 227 | 226 | 2.1 |
| RMX-A22 | 0.4% Kraft | 219 | 220 | 225 | 221 | 3.2 |
| RMX-A06 | 1% Kraft | 234 | 230 | | 232 | 2.8 |

TABLE 17XI

Ultramid 8202

| Sample | | OOT (° C.) | | | Average | StDev |
|---|---|---|---|---|---|---|
| RMX-A23 | 1% OMNO | 351 | 353 | 354 | 353 | 1.5 |
| RMX-A24 | 1% Irganox 1098 | 344 | 338 | 341 | 341 | 3.0 |

TABLE 17XII

Ultramid 8202

| Sample | | OOT (° C.) | | | Average | StDev |
|---|---|---|---|---|---|---|
| RMX-A25 | 0.1% OMNO | 339 | 337 | 337 | | 338 | 1.2 |
| RMX-A26 | 0.3% OMNO | 337 | 334 | | | 336 | 2.1 |
| RMX-A27 | 0.5% OMNO | | 348 | | 346 | 347 | 1.4 |
| RMX-A23 | 1% OMNO | 351 | 353 | 354 | | 353 | 1.5 |

While the preferred forms of the invention have been disclosed, it will be apparent to those skilled in the art that various changes and modifications may be made that will achieve some of the advantages of the invention without departing from the spirit and scope of the invention. It is, therefore, intended that the appended claims cover all such equivalent variations as fall within the true spirit and scope of the invention, and the scope of the invention is to be determined by the claims to be appended.

When ranges are used herein for physical properties, such as molecular weight, or chemical properties, such as chemical formulae, all combinations, and subcombinations of ranges of specific embodiments therein are intended to be included.

The disclosures of each patent, patent application, and publication cited or described in this document are hereby incorporated herein by reference, in their entirety.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a composition comprising a thermoplastic polymer and a biomass, wherein the biomass comprises an antioxidant stabilizer comprising lignin, wherein the lignin has an average particle size of from about 2 micrometers to about 8 micrometers, and wherein the composition comprises cellulose and/or hemicellulose in an amount no greater than 20% based on the weight of the biomass, the method comprising the steps of:
   (a) obtaining a lignin by exposing a biomass to a fluid having a temperature of from about 340° C. to about 400° C. and a pressure of from about 225 bar to about 250 bar; and
   (b) combining the lignin with the thermoplastic polymer.

2. The method of claim 1, wherein the thermoplastic polymer has a processing temperature below about 400° C.

3. The method of claim 1, wherein the thermoplastic polymer is polyethylene, polypropylene, or a combination thereof.

4. The method of claim 1, wherein the lignin is a hardwood lignin.

5. The method of claim 1, wherein the lignin is a grass lignin.

6. The method of claim 1, wherein the composition has an oxidation onset temperature of from about 232° C. to about 250° C.

7. A composition comprising a thermoplastic polymer and a biomass, wherein the biomass comprises an antioxidant stabilizer comprising lignin, wherein the lignin has an average particle size of from about 2 micrometers to about 8 micrometers, and wherein the composition comprises cellulose and/or hemicellulose in an amount no greater than 20% based on the weight of the biomass; and wherein the lignin is prepared by exposing a biomass to a fluid having a temperature of from about 340° C. to about 400° C. and a pressure of from about 225 bar to about 250 bar.

8. The composition of claim 7, wherein the thermoplastic polymer has a processing temperature below about 400° C.

9. The composition of claim 7, wherein the thermoplastic polymer is polyethylene, polypropylene, or a combination thereof.

10. The composition of claim 7, wherein the lignin is a hardwood lignin.

11. The composition of claim 7, wherein the lignin is a grass lignin.

12. The composition of claim 7, wherein the lignin comprises a mixture of guaiacyl and syringyl units.

13. The composition of claim 7, having an oxidation onset temperature of from about 232° C. to about 250° C.

14. The composition of claim 7, wherein the polymer is polypropylene and the lignin is present at a level of from about 0.5 wt % to about 1.5 wt %.

15. A coating composition or film comprising the composition of claim 7.

16. A personal care composition comprising the composition of claim 7.

* * * * *